(12) United States Patent
El Naga et al.

(10) Patent No.: US 11,441,586 B2
(45) Date of Patent: Sep. 13, 2022

(54) APPARATUS FOR INJECTING FLUIDS IN NODE BASED CONNECTIONS

(71) Applicant: DIVERGENT TECHNOLOGIES, INC., Los Angeles, CA (US)

(72) Inventors: Eahab Nagi El Naga, Topanga, CA (US); David Brian TenHouten, Los Angeles, CA (US); Eli Rogers, San Pedro, CA (US); Kenneth James Goodstein, Acton, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 1052 days.

(21) Appl. No.: 15/990,522

(22) Filed: May 25, 2018

(65) Prior Publication Data

US 2019/0360509 A1    Nov. 28, 2019

(51) Int. Cl.
*B33Y 80/00*    (2015.01)
*F15D 1/02*    (2006.01)

(52) U.S. Cl.
CPC .............. *F15D 1/02* (2013.01); *B33Y 80/00* (2014.12)

(58) Field of Classification Search
CPC ............ B60J 1/005; B60J 1/006; B62D 65/06
See application file for complete search history.

(56) References Cited

U.S. PATENT DOCUMENTS

| | | | | |
|---|---|---|---|---|
| 2,038,071 A * | 4/1936 | Wilhelm | ............ | B01D 46/0038 96/118 |
| 3,020,977 A * | 2/1962 | Huppke | ............... | B01D 46/525 55/520 |
| 3,070,937 A * | 1/1963 | Bub | ........................ | B01D 45/08 96/121 |
| 3,398,510 A * | 8/1968 | Pennington | ........... | F24F 3/1423 96/115 |
| 3,713,281 A * | 1/1973 | Asker | ...................... | B01J 35/04 96/154 |
| 4,503,907 A * | 3/1985 | Tanaka | ..................... | B05D 7/14 165/133 |

(Continued)

FOREIGN PATENT DOCUMENTS

DE        10128413 C1    12/2002
DE    102014002612 B3     8/2015
(Continued)

OTHER PUBLICATIONS

US 9,202,136 B2, 12/2015, Schmidt et al. (withdrawn)
(Continued)

*Primary Examiner* — Rick K Chang
(74) *Attorney, Agent, or Firm* — ArentFox Schiff LLP

(57) ABSTRACT

An additively manufactured node is disclosed. A node is an additively manufactured (AM) structure that includes a feature, e.g., a socket, a receptacle, etc., for accepting another structure, e.g., a tube, a panel, etc. An additively manufactured node can include a surface with an opening to a feed channel through the node. A second surface of the node can include with a plurality of openings to an array of outlet channels. Each of the outlet channels can extend through the node and can connect to the feed channel. Tortuous paths can be used between channels created by the node surface and adjacent structures as well as node interior surfaces. These tortuous paths can be tuned to allow for optimal fluid flow processes.

25 Claims, 40 Drawing Sheets

(56) References Cited

U.S. PATENT DOCUMENTS

| | | |
|---|---|---|
| 5,203,226 A | 4/1993 | Hongou et al. |
| 5,262,012 A * | 11/1993 | Smith, Jr. .......... B01J 19/30 |
| | | 202/158 |
| 5,645,803 A * | 7/1997 | Steenackers .......... B01J 35/04 |
| | | 422/177 |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,361,588 B1 * | 3/2002 | Moratalla .......... B01D 53/22 |
| | | 55/521 |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,156,159 B2 * | 1/2007 | Lovette .......... F28F 3/12 |
| | | 165/104.33 |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 7,981,199 B2 * | 7/2011 | Burk .......... F25B 35/04 |
| | | 96/154 |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,418,365 B2 * | 4/2013 | German .......... B29C 66/1312 |
| | | 29/890.047 |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,839,519 B2 * | 9/2014 | Altman .......... H05K 7/20645 |
| | | 29/890.043 |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,107,293 B2 * | 8/2015 | Fitz-Patrick .......... B22D 19/04 |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,746,257 B2 * | 8/2017 | Fennessy .......... B22F 10/20 |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |

(56) References Cited

U.S. PATENT DOCUMENTS

| | | |
|---|---|---|
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 * | 1/2019 | Mahalingam ...... H05K 7/20163 |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |

(56) References Cited

U.S. PATENT DOCUMENTS

| | | |
|---|---|---|
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 11,022,375 B2 * | 6/2021 | Bucknell .................. F28F 9/02 |
| 2003/0152488 A1 * | 8/2003 | Tonkovich ............ B01F 5/0614 422/400 |
| 2005/0199372 A1 * | 9/2005 | Frazer ...................... F28F 3/12 165/80.4 |
| 2006/0108783 A1 | 5/2006 | Ni et al. |
| 2008/0018212 A1 * | 1/2008 | Spearing ............ H05K 7/20645 312/236 |
| 2012/0043752 A1 | 2/2012 | McPherson |
| 2014/0277669 A1 | 9/2014 | Nardi et al. |
| 2015/0184688 A1 | 7/2015 | Dobbin et al. |
| 2016/0325796 A1 | 11/2016 | Czinger et al. |
| 2017/0001368 A1 | 1/2017 | Czinger et al. |
| 2017/0050677 A1 | 2/2017 | Czinger et al. |
| 2017/0113344 A1 | 4/2017 | Schonberg |
| 2017/0341309 A1 | 11/2017 | Piepenbrock et al. |
| 2018/0213732 A1 * | 8/2018 | Ensworth ............. A01G 25/023 |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/033149 dated Aug. 7, 2019.
Supplementary European Search Report issued for corresponding European Application No. 19806739.9, dated Feb. 3, 2022, 6 pages.

* cited by examiner

APPARATUS FOR INJECTING FLUIDS IN NODE BASED CONNECTIONS

BACKGROUND

Field

The present disclosure relates generally to fluid injection, and more particularly, to injecting fluids for use in connections between nodes and other structures.

Background

Space frame and monocoque construction are used in automotive, structural, marine, and many other applications. One example of space frame construction is a welded tube frame chassis construction, often used in low-volume and high-performance vehicle designs due to the advantages of low tooling costs, design flexibility, and the ability to produce high-efficiency structures. Space frames in these and numerous other applications can require the structures that make up the chassis to be connected at a wide variety of angles and may require the same connection point to accommodate a variety of structural geometries. Traditional methods of fabricating joint members for connection of such tube frame chassis may result in high equipment and manufacturing costs. Additionally, monocoque design may lead to design inflexibility when using planar elements, or to high tooling costs when shaped panels are incorporated.

SUMMARY

Several aspects of nodes, node-structure connections, and methods will be described more fully hereinafter.

In various aspects, an additively manufactured node can include a first surface with an opening to a feed channel for a fluid to flow through the node. The node can include a second surface with multiple openings to an array of outlet channels for the fluid. Each of the outlet channels can extend through the node and can connect to the feed channel such that the fluid can be delivered to a desired location at the second surface. The node can include a third surface extending from the second surface. The third surface can be positioned closer to a structure than the second surface, in order to create a tortuous path for the fluid, as discussed in more detail below.

In exemplary embodiments, the cross-sectional area of each outlet channel is approximately $\pi/4$ square millimeters, and the openings on the second surface are spaced approximately one-half millimeter apart. In various aspects, the material properties, such as viscosity, etc., of the fluid that is to be injected into the feed channel can be used to effectively tune the characteristics of the feed channel and the outlet channels. For example, the material properties of a particular fluid may be used to tune the feed and outlet channel characteristics, such as the ratio of the feed channel cross-sectional area to the outlet channel cross-sectional area, for example.

In various aspects, an apparatus can include an additively manufactured node including a first surface with an opening to a first channel through the node, a second surface with a plurality of openings to an array of second channels, each of the second channels extending through the node and connecting to the first channel, and a third surface. The apparatus can also include a structure including a fourth surface that opposes the second surface at a first distance, and a fifth surface that opposes the third surface at a second distance that is less than the first distance. The apparatus can also include a fluid extending through the first channel and the second channels. In various embodiments, the fluid can be a sealant that seals the second surface to the fourth surface. In various embodiments, the fluid can be an adhesive that adheres the structure to the node.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of will now be presented in the detailed description by way of example, and not by way of limitation, in the accompanying drawings, wherein.

DETAILED DESCRIPTION

Figure 1:
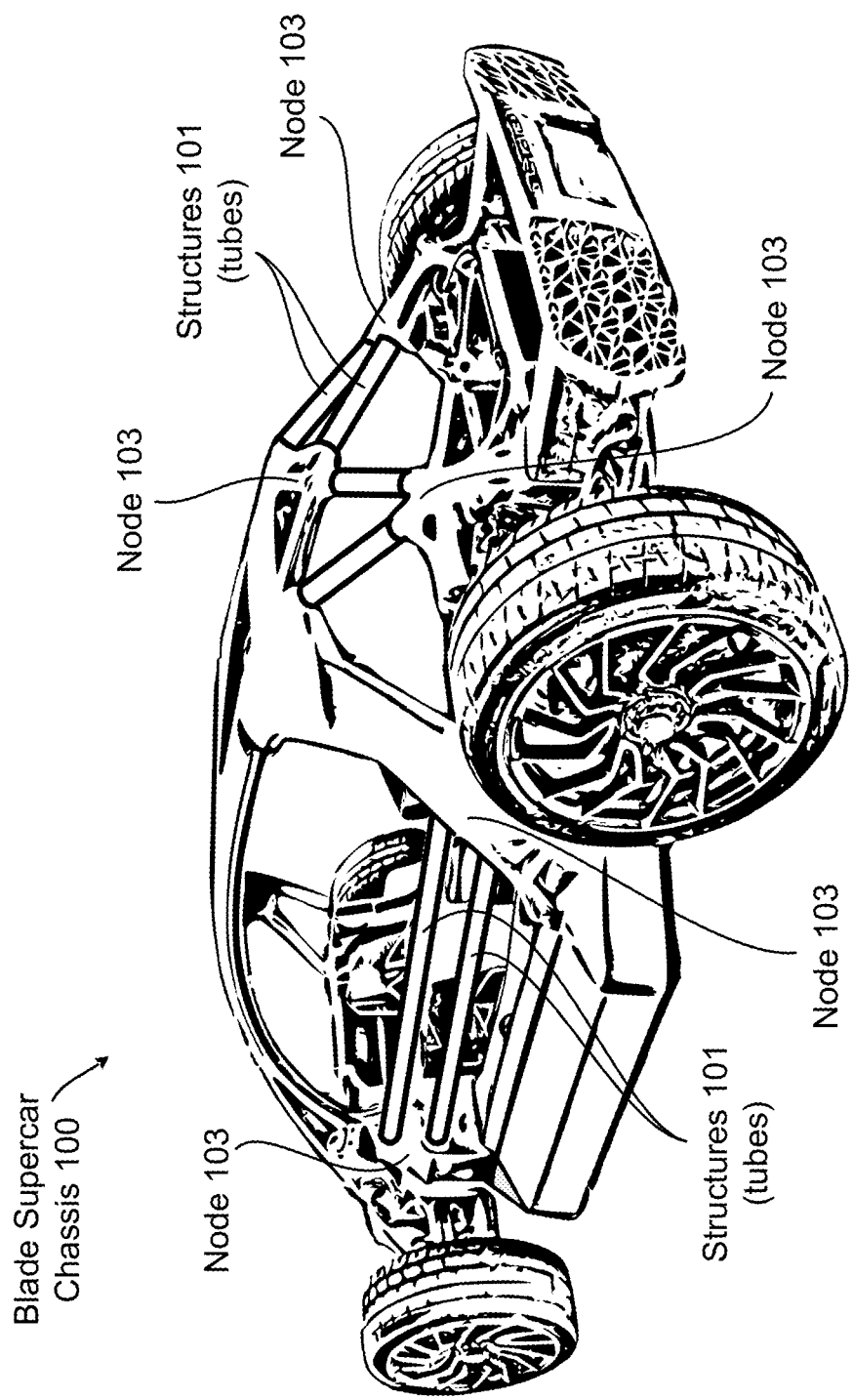
FIG. 1 illustrates an exemplary vehicle chassis, Blade supercar chassis, in which aspects of the disclosure may be implemented.

The detailed description set forth below in connection with the appended drawings is intended to provide a description of various exemplary embodiments of the concepts disclosed herein and is not intended to represent the only embodiments in which the disclosure may be practiced. The terms "example" and "exemplary" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

This disclosure focuses on joint designs utilizing nodes, and in particular, the use of tortuous paths to manage fluid flow within nodes and between nodes and other structures. A node is an additively manufactured (AM) structure that includes a feature, e.g., a surface feature that facilitates sealing, adhering, etc., a socket, a receptacle, etc., for attaching to another structure, e.g., a tube, a panel, etc. In addition to their ability to interconnect different types of structures, nodes can be fabricated to perform a variety of different functions. For example, nodes can be used to route electrical circuitry or to enable fluid flow. Nodes can be formed by fusing a powder material. For example, a 3-D printer can melt and/or sinter at least a portion of the powder material in multiple layers to form the node. Nodes may be formed of one or more metal and/or non-metal materials. The node may be formed of a substantially rigid material. The materials in a node may include a metallic material (e.g. aluminum, titanium, stainless steel, brass, copper, chromoly steel, iron, etc.), a composite material (e.g. carbon fiber, etc.), a polymeric material (e.g. plastic, etc.), a combination of these materials and/or other materials, etc.

Nodes can be particularly useful in joint designs for connecting various parts of complex structures, for example. In some designs, nodes can allow for higher levels of dimensional tolerance acceptance that may be needed when assembling complex structures. Node-based designs can also allow for reduced weight, reduced post-processing, and increased ease of assembly. In addition, nodes can be used as sockets to adjust for tolerance in designs, and nodes can be co-printed with other parts, which takes advantage of a unique benefit of 3-D printing to simplify the assembly process.

In one aspect of the disclosure, 3-D printing can also provide the ability to create complex interior surfaces, such as boundaries of internal channels of various sizes and shapes to manage transport of fluids through a node using tortuous paths. The use of 3-D printing can also provide the ability to create complex exterior surfaces, such as relief surfaces with various depths that can be arranged in proximity to a surface of another structure to manage transport of fluids between the node and the other structure using tortuous paths. A tortuous path may be defined as any path that offers resistance to flow of media as a result of a reduced flow area relative to the desired flow path of that media. A reduction in flow area would make a path more resistant to flow through it. For example, the reduction in flow area may be achieved by arranging two surfaces so that the distance between them provides a tortuous path, such as a portion of a relief surface of a node and a surface of another structure, with a media configured to flow between these two surfaces. Other factors may influence the use of tortuous paths. For example, fluids having different viscosities tend to flow faster or slower. A higher viscosity fluid may increase the effectiveness of a tortuous path. Thus, viscosity is one factor that may be relevant to the application of tortuous paths. Management of fluid flow within and around nodes can be useful for applications such as sealing and adhering nodes with other structures, lubrication, hydraulics, etc.

FIG. 1 illustrates an exemplary car chassis, i.e., Blade supercar chassis 100 built by Divergent Technologies, Inc., that includes nodes and structures connected to the nodes, i.e., connecting structures. Connecting structures can include, e.g., tubes, panels, irregular structures, etc. Automobile chassis, such as Blade supercar chassis 100, are examples of structures in which aspects of the disclosure can be practiced. Although the examples described herein are directed primarily to vehicle structures, such as chassis, crush zones, etc., it should be understood that aspects of the disclosure can be applied to any other transport structures that include node-structure connections. For example, the examples described herein can be applied to aircraft, spacecraft, sea vessels, motorcycles, trucks, trains, trailers, buses, vans, public transport systems, etc.

Blade supercar chassis 100 includes structures 101, which are tubes in this example, connected by one or more nodes 103. Each node 103 can include, for example, a central body and one or more ports that extend from the central body. In various embodiments, a multi-port node may be provided to connect structures, such as structures 101, to form a two or three-dimensional structure. The structure may be a frame, for example. In one example, a structure having tubes with axes in substantially the same plane can be referred to as a planar frame, while a structure having tubes with axes in different planes may be referred to as a space frame. A space frame may define a volume. In some examples, a three-dimensional space frame structure may be a vehicle chassis.

The vehicle chassis may be have a length, width, and height that define a space, such as a passenger compartment of the vehicle.

A vehicle chassis may form the framework of a vehicle. A vehicle chassis may provide the structure for placement of body panels of a vehicle, such as door panels, roof panels, floor panels, or any other panels forming the vehicle enclosure. Furthermore, the chassis may be the structural support for the wheels, drive train, engine block, electrical components, heating and cooling systems, seats, storage space, etc. A vehicle may be a passenger vehicle, a cargo vehicle, etc. Examples of vehicles may include, but are not limited to sedans, trucks, buses, vans, minivans, station wagons, RVs, trailers, tractors, go-carts, automobiles, trains, or motorcycles, boats, submarines, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis.

The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. In some cases, inner supports or components may be provided. The inner supports or components can be connected to the space frame through connection to the one or more joint members of the space frame. Different layouts of multi-port nodes and connecting tubes may be provided to accommodate different vehicle chassis configurations. In some cases, a set of nodes can be arranged to form a single unique chassis design. In some cases, at least a subset of the set of nodes can be used to form multiple chassis designs. In some cases, at least a subset of nodes in a set of nodes can be assembled into a first chassis design and then disassembled and reused to form a second chassis design. The first chassis design and the second chassis design can be the same or they can be different.

The connecting structures may be formed from rigid materials. For example, the structures may be formed of metal, such as steel, aluminum, etc., composite materials, such as carbon fiber, fiberglass, etc., or other materials, such as plastics, polymers, etc. The connecting structures may have different cross-sectional shapes. For example, connecting tubes may have a substantially circular shape, rectangular shape, square shape, elliptical shape, oval shape, hexagonal shape, or an irregular shape. Connecting tube cross-section could be a closed cross-section. Connecting tube cross-section could be an open cross-section, such as a C-channel, an I-beam, an angle, etc.

Various aspects of nodes and node-to-structure connections presented in this disclosure may be suitable for use in a vehicle chassis, such as Blade supercar chassis 100 shown in FIG. 1. The nodes in the chassis 100 may be designed to fit the connecting structure angles dictated by the chassis design. The nodes may be fabricated to desired geometries to permit rapid and low-cost assembly of the chassis. In some embodiments the nodes may be fabricated using 3-D printing techniques. 3-D printing may permit the nodes to be formed in a wide array of geometries that may accommodate different frame configurations. 3-D printing may permit the nodes to be formed based on a computer-generated design file that includes dimensions of the nodes. 3-D printing may substantially reduce the need for complex and expensive dedicated tooling needed to make complex parts. 3-D printing also may reduce the problem of expensive molds, casting and tooling becoming obsolete after their use in a model or in a line of vehicles that has been discontinued. While the Blade supercar chassis 100 presents an excellent example of the types of applications for which the principles of the disclosure are applicable, the supercar is presented for exemplary purposes as a wide variety of vehicle types and corresponding manufacturing processes relevant to fabricating vehicles may be suitable for using the principles described herein.

Fluids can be used with nodes and structures for various purposes, such as creating sealed interfaces between nodes and structures, such as tubes, panels, extrusions, other nodes, etc. In another example, a fluid adhesive can be applied to adhere a node and a structure. In another example, an electrically conductive fluid can be applied to provide an electrical pathway between two or more electrical contacts on a node and/or structure. In another example, a fluid lubricant can be applied to reduce friction between a node and a structure. In various embodiments, the fluids can solidify, e.g., cure, in the final product. In various embodiments, the fluids can remain in a liquid form.

Sealant Injection.

For example, prior to connecting a node to a structure using adhesives, fluid sealant can be applied to create a seal between the node and the structure. Creating a seal between a node and a structure prior to adhering the node to the structure with adhesive can, for example, provide isolation between the node and the structure. For example, the sealant can provide physical isolation by ensuring that the node and the structure do not come into physical contact with each other. Physical isolation can be particularly useful in cases where components made with dissimilar materials are being connected (for example, an aluminum node connected to a carbon fiber reinforced polymer composite tube). One application of the sealant is to isolate the structures to prevent galvanic corrosion. Galvanic corrosion refers to corrosion damage induced when two dissimilar materials are coupled in a corrosive electrolyte. It may occur when the dissimilar materials are brought into electrical contact, such as when they are regularly exposed to an environment that includes conducting elements such as water vapor (e.g., the outdoors). The sealant prevents contact between the materials. The amount of isolation can be controlled such that whatever the application, the required amount of spacing between the components is obtained to ensure that the optimal thickness of a subsequent adhesive bond is obtained.

Creating a seal between a node and a structure prior to adhering the node to the structure with adhesive can, for example, provide a hermetically sealed enclosure for adhesive injection. In this case, the sealant can ensure that an evacuated and hermetically sealed enclosure is provided for adhesive injection when a vacuum is drawn. By first evacuating the sealed enclosure with a negative pressure source (i.e., drawing a vacuum), the adhesive can be applied, e.g., injected, into the evacuated, sealed enclosure and can be drawn into the enclosure. In this way, for example, the ability to draw a vacuum in the enclosure can allow a quicker and more even distribution of adhesive to connect the node and the structure.

Furthermore, a seal between a node and a structure can be a hermetic seal. A hermetically sealed enclosure for a cured adhesive can provide benefits after the adhesive has cured and a bond has been realized. For example, the hermetic seal can protect the adhesive bond from exposure to the environment, thereby reducing contamination, degradation, etc. of the adhesive bond by foreign particles, chemicals, contaminants, etc.

Additively manufacturing the nodes can advantageously provide the geometry to allow complex features to accept and to distribute sealants, adhesives, lubricants, electrically conductive fluids, hydraulics, etc. Therefore, there is an opportunity to develop robust solutions for managing distribution of various fluids through and around additively manufactured components that are connected to other structures.

In various exemplary embodiments, a fluid can be applied, e.g., injected, through a fluid port in a node. For example, the fluid port can be a sealant inlet port for injecting a sealant between the node and the structure. In various embodiments, an adhesive may be subsequently applied to adhere the node and the structure.

In another example, the fluid port may be a sealant inlet port for injecting a sealant, and the sealant inlet port may be separate from an adhesive inlet port for injecting adhesive, which may in turn be separate from a vacuum port for drawing a vacuum. Prior to adhesive injection between the components being assembled, a liquid sealant can be injected through the sealant port. It should be understood that an uncured sealant can be injected as described below in various embodiments. Uncured sealants and uncured adhesives may be referred to herein simply as sealants and adhesives, respectively, herein.

In this example, the sealant can flow through a feed channel that can be included in the node when the node is printed. The sealant can then exit the feed channel through multiple sealant outlet channels that can be included in the node when the node is printed. The use of multiple sealant outlet channels helps to obtain a more even spread of the injected sealant or other fluid. Uneven application of sealant can cause poor isolation that can degrade quickly with time. Similarly, uneven application of adhesive, with excess adhesive in one portion of the node-structure interface and a deficit of adhesive in other portions, can result in a weak bond that is more likely to break over time or as a result of an impact (e.g., a bump in the road for an automobile). Thus, the multiple outlet channels address this concern in part by spreading application of the fluid more evenly over the desired region.

The sealant outlet channels can carry the sealant to a sealant deposition surface. The sealant deposition surface can be in proximity to the connecting structure to which the node is to be adhered. The sealant deposition surface can be part of the node or alternatively, part of the connecting structure. The sealant can exit from the sealant outlet channels and can be deposited between the node and the connecting structure. This can result in sealant introduction enclosing an adhesive bond region between the node part and the connecting structure, in a manner shown and illustrated in greater detail below. The feed tube can have a greater cross-sectional flow area in comparison to each of the sealant channels. The ratio of the cross-sectional flow areas of the feed channel and the sealant outlet channels can be tuned to maintain an even distribution of sealant from each of the sealant outlet channels. In various embodiments, for example, the cross-sectional flow areas can be circular. In various embodiments, the ratio of feed channel cross-sectional flow area to sealant outlet channel cross-sectional flow area can be 49:1. The ratio is tunable as noted, and will vary depending on the application. The cross-sectional flow area can be tuned such that the 3-D printer can print the relevant features in a manner that minimizes, or altogether eliminates, the need for support material.

Once the sealant is injected into the feed channel through the sealant port, the sealant can flow through the feed tube, and then can flow through multiple sealant outlet channels. The sealant can exit the multiple sealant outlet channels at approximately the same time into a blending trough, so that the sealant can form a contiguous seal around an adhesive bond area between the node and the structure. A release gap can be provided on one side of the blending trough, opposite to the side of the adhesive bond area. The release gap can provide an outlet for the sealant to bleed once it has been injected. The release gap can ensure that the volume of sealant that flows into the adhesive bond area is much less than the volume of the sealant in the blending trough, as the gap would provide a lesser torturous path for the sealant to bleed, in comparison to the path of the sealant bleeding into the adhesive bond area.

The adhesive bond area can be used as a conduit to apply an adhesive such as a glue, an epoxy, a thermoplastic, a thermoset, etc., between the node and the structure. The seal created by the sealant can prevent the adhesive from leaking out of the adhesive bond area, which may allow a connection between the node and the structure to be formed more efficiently and may provide a cleaner-looking connection. In addition, the seal can keep the node and the structure separated at a desired distance while the adhesive cures. The distance created by the seal between the node and the structure can be designed to prevent or reduce a reaction between the node and the structure, such as galvanic corrosion. The seal can remain after the adhesive cures to help protect the cured adhesive from the environment, e.g., air, water, etc., which may reduce damage or degradation of the adhesive caused by environmental factors. Depending on the composition and design of the seal, the seal may provide other benefits, such as adding rigidity, flexibility, durability, etc., to the connection.

FIGS. 2-15 illustrate an exemplary node and node-structure arrangement that provides a system of channels that manage fluid flow by creating tortuous paths within the node and between the node and the structure. This example illustrates two fluid management systems using tortuous paths, i.e., a system that creates a tortuous path within the node to manage the fluid flow within the node, i.e., to multiple fluid outlet channels (best illustrated in FIGS. 2, 4-8, 10, 12, and 14), and a system that creates a tortuous path between the node and the structure to manage the fluid flow between the node and the structure (best illustrated in FIGS. 3, 9, 11, 13, and 15). It should be noted again that, while the example below is provided in the context of sealant injection, the principles of the disclosure are applicable to any fluid used in the construction of a transport structure such as a vehicle.

Figure 2:
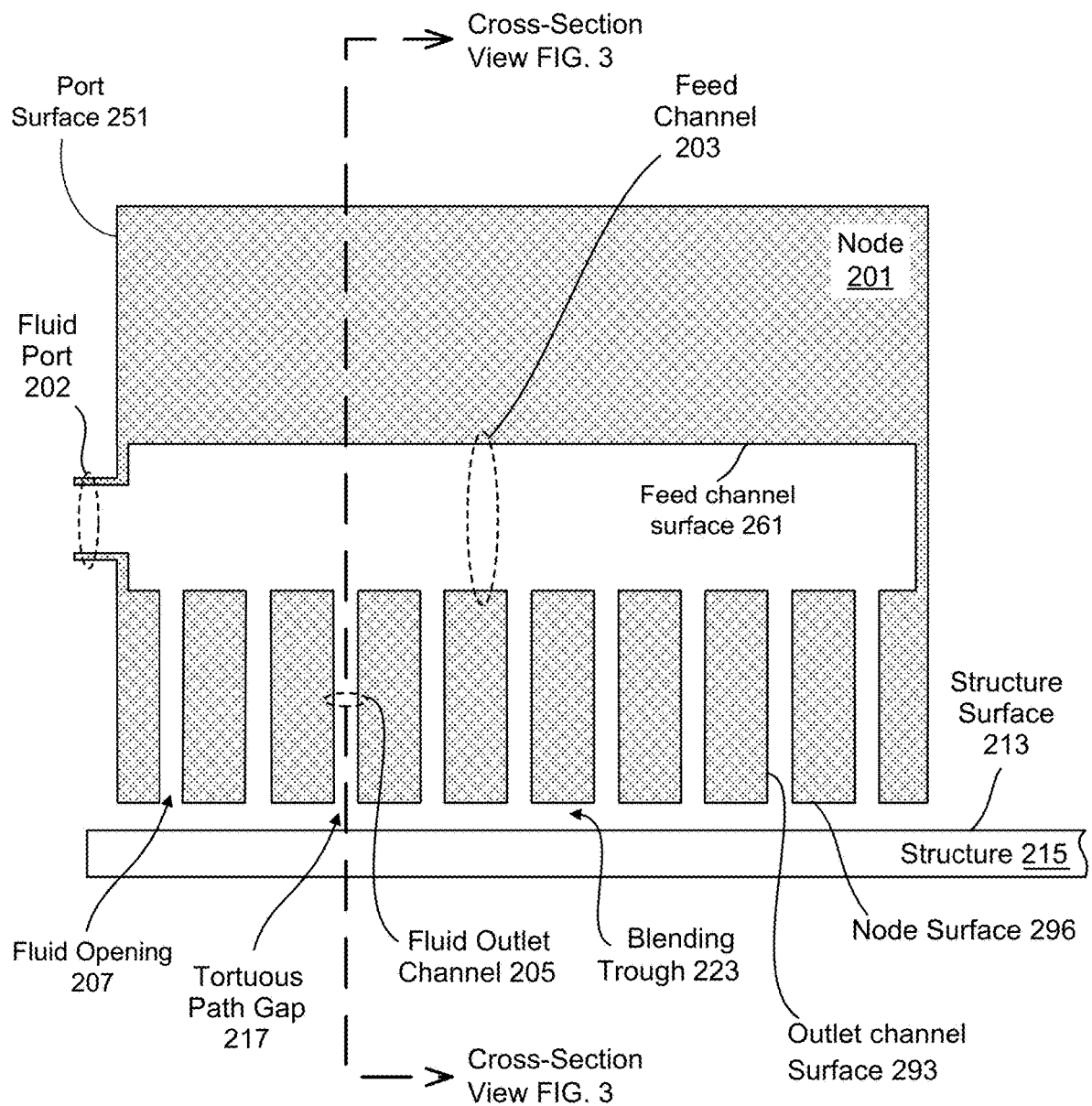
FIG. 2 illustrates a cross-sectional view of a node including an injectable fluid system according to various embodiments.
Figure 4:
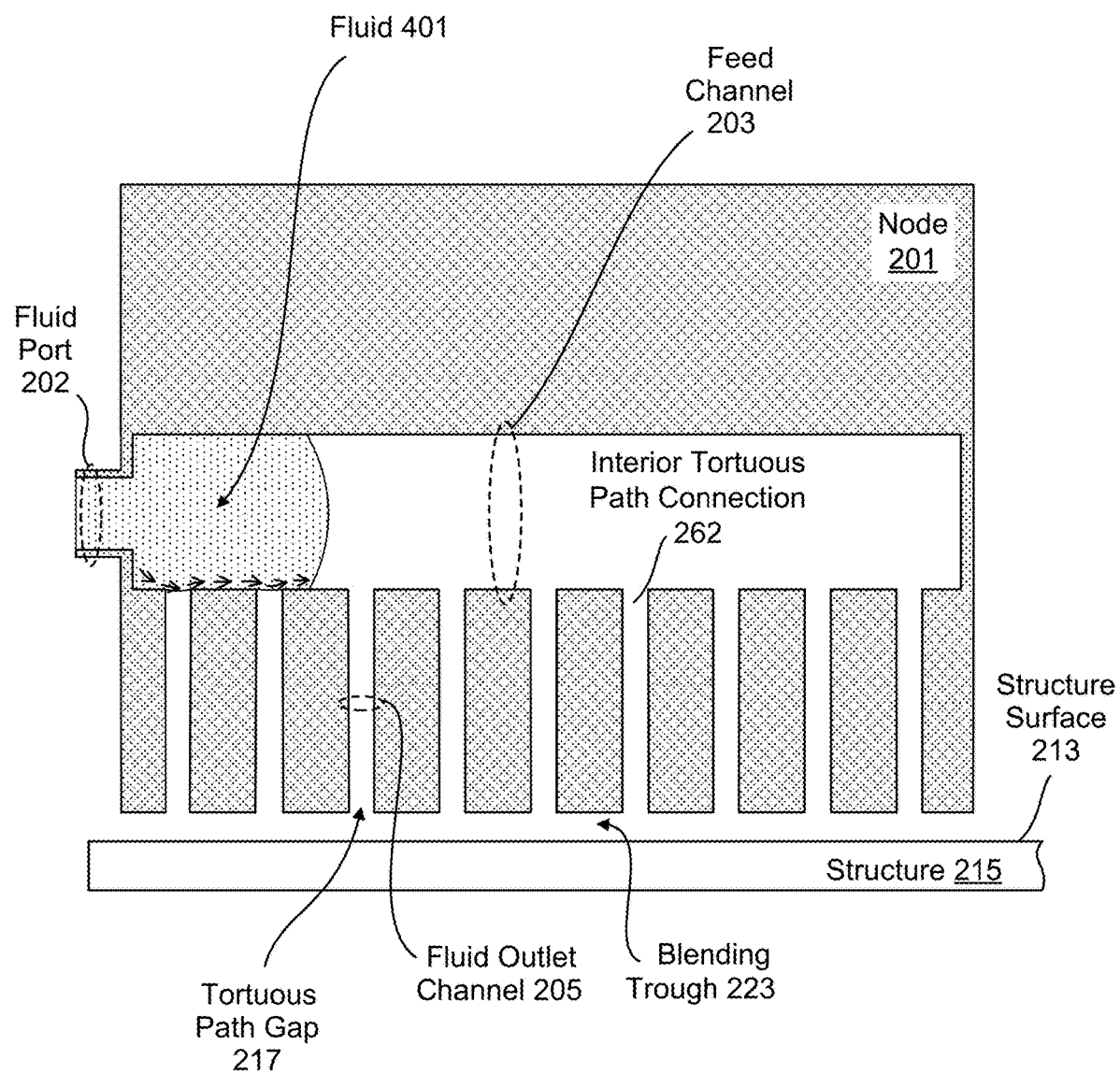
FIG. 4 illustrates a cross-sectional view of the node of FIG. 2 after a fluid has been injected.
Figure 5:
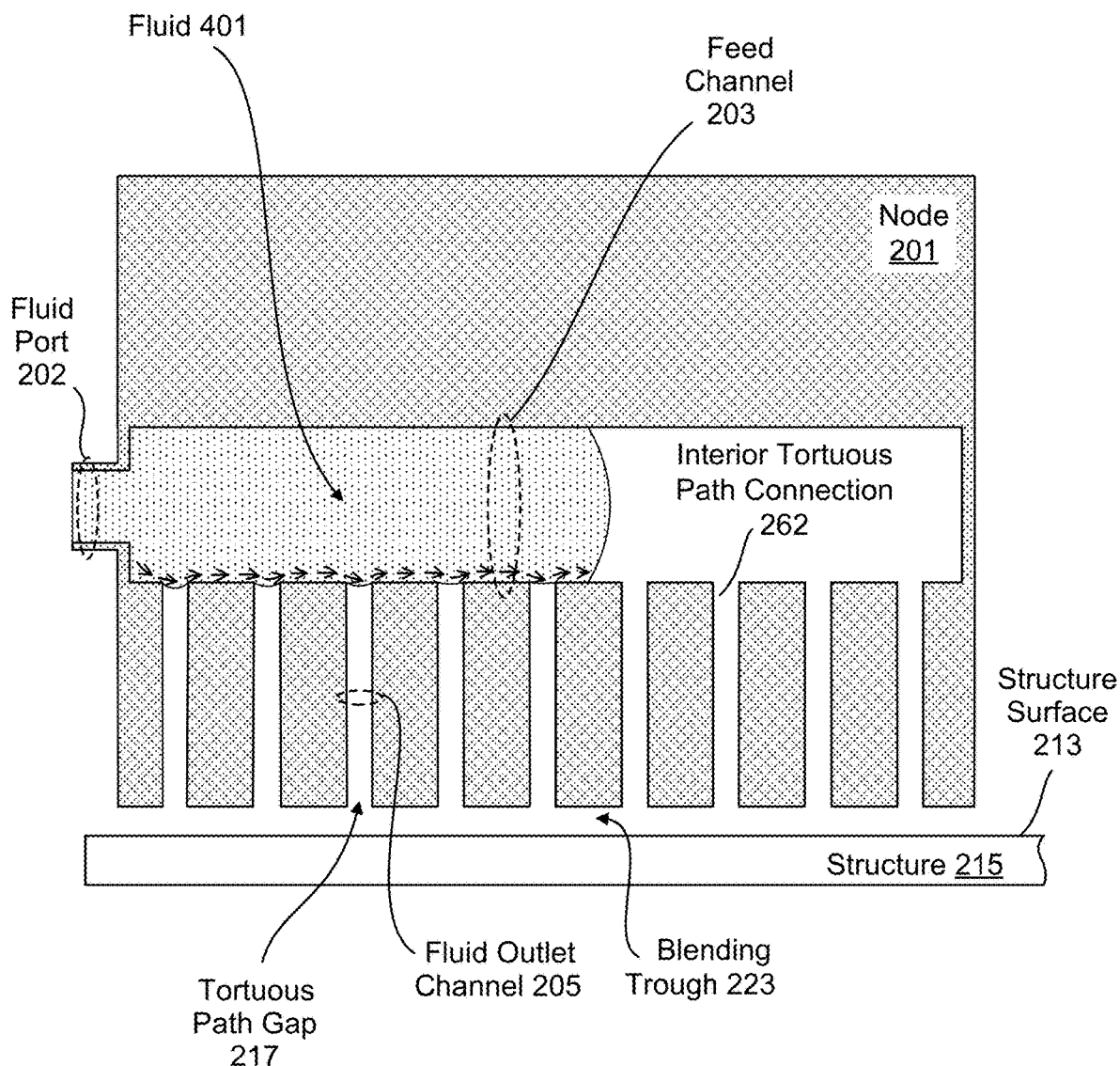
FIG. 5 illustrates a cross-sectional view of the node of FIG. 2 after time has elapsed such that the fluid has traversed about half the distance through the feed channel.
Figure 6:
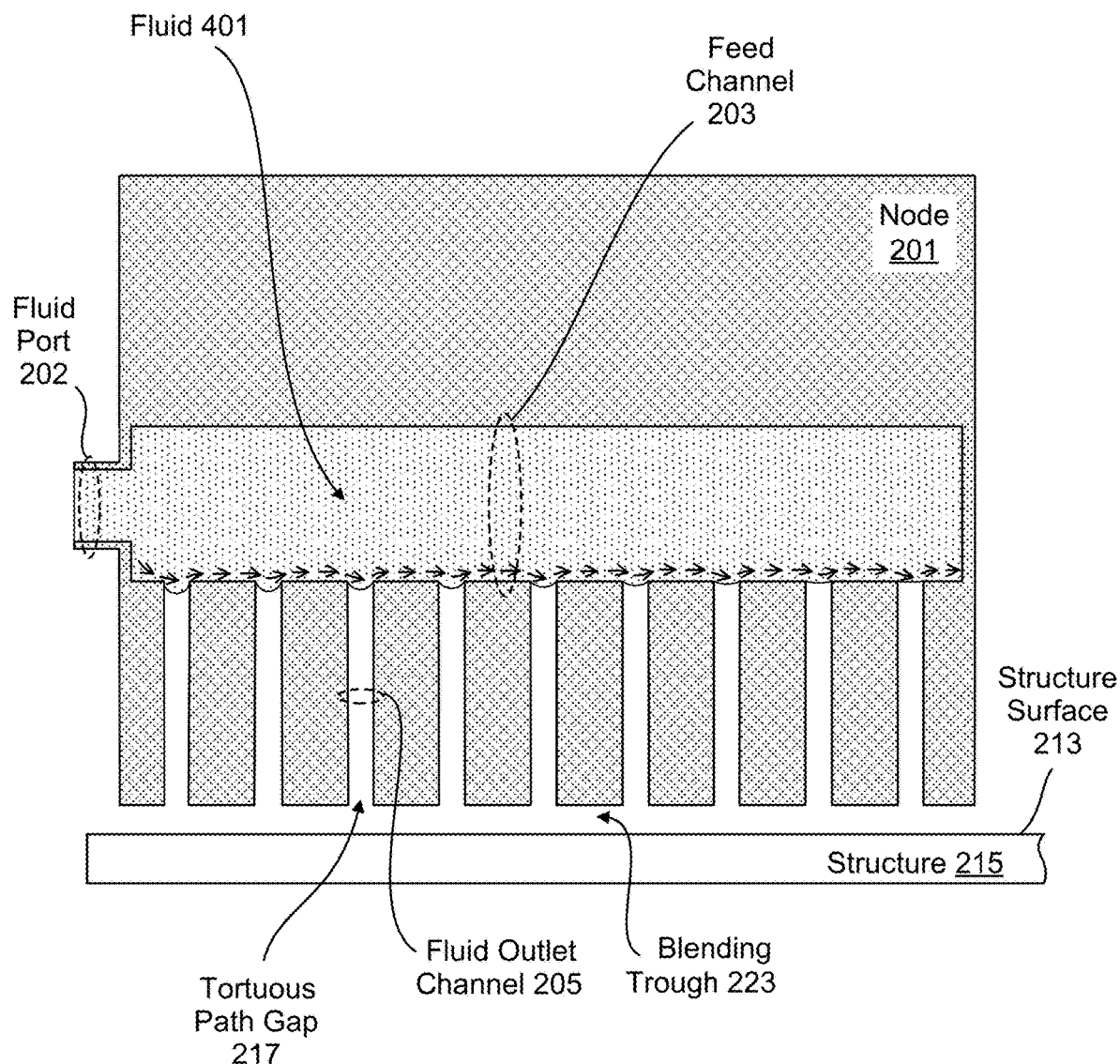
FIG. 6 illustrates a cross-sectional view of the node of FIG. 2 after further time has elapsed such that the fluid has reached the end of the feed channel.

FIG. 2 illustrates a cross-sectional view of a node 201 including a fluid flow management system using tortuous paths within the node to manage fluid flow within the node according to various embodiments. FIG. 2 shows a port surface 251 of node 201. Port surface 251 includes a fluid port 202 into which a fluid can be injected. Node 201 can further include a feed channel surface 261 internal to node 201 that provides one of the boundaries for a feed channel 203 to traverse the node. Fluid port 202 leads to feed channel 203. Feed channel 203 can carry a fluid through node 201. The fluid can be, for example, a sealant, an adhesive, a lubricant, an electrically conductive fluid, etc. FIG. 2 shows multiple fluid outlet channels 205 and corresponding fluid openings 207 arranged in a regularly spaced array. For example, node 201 can include multiple fluid outlet channels 205, each beginning at a tortuous path connection 262 in the interior of node 201 and ending at a fluid opening 207 at an exterior surface of the node. More specifically, each fluid outlet channel 205 can provide an interior tortuous path for the fluid. As illustrated in FIGS. 4-6, the interior tortuous path connection 262 is tuned such that the fluid 401 flows through the entire length of feed channel 203 before flowing through any of the fluid outlet channels. The flow of a fluid 401 within a node 201 can be managed using a system of one or more tortuous paths (e.g., as illustrated in FIGS. 4-6) within node 201. In particular, this example restricts the fluid 401 from flowing through each fluid outlet channel 205 before the fluid 401 flows the entire length through feed channel 203. Therefore, the fluid 401 can be restricted from flowing in fluid outlet channels 205 until the fluid 401 has flowed through the entire length of feed channel 203 (as illustrated in FIGS. 4-6). In this way, for example, the flow within node 201 can be managed such that the fluid exits fluid outlet channels 205 at approximately the same time (as illustrated in FIGS. 7, 8, 10, 12, and 14). This process in turn is one of the methods disclosed herein that helps ensure an even distribution.

Figure 3:
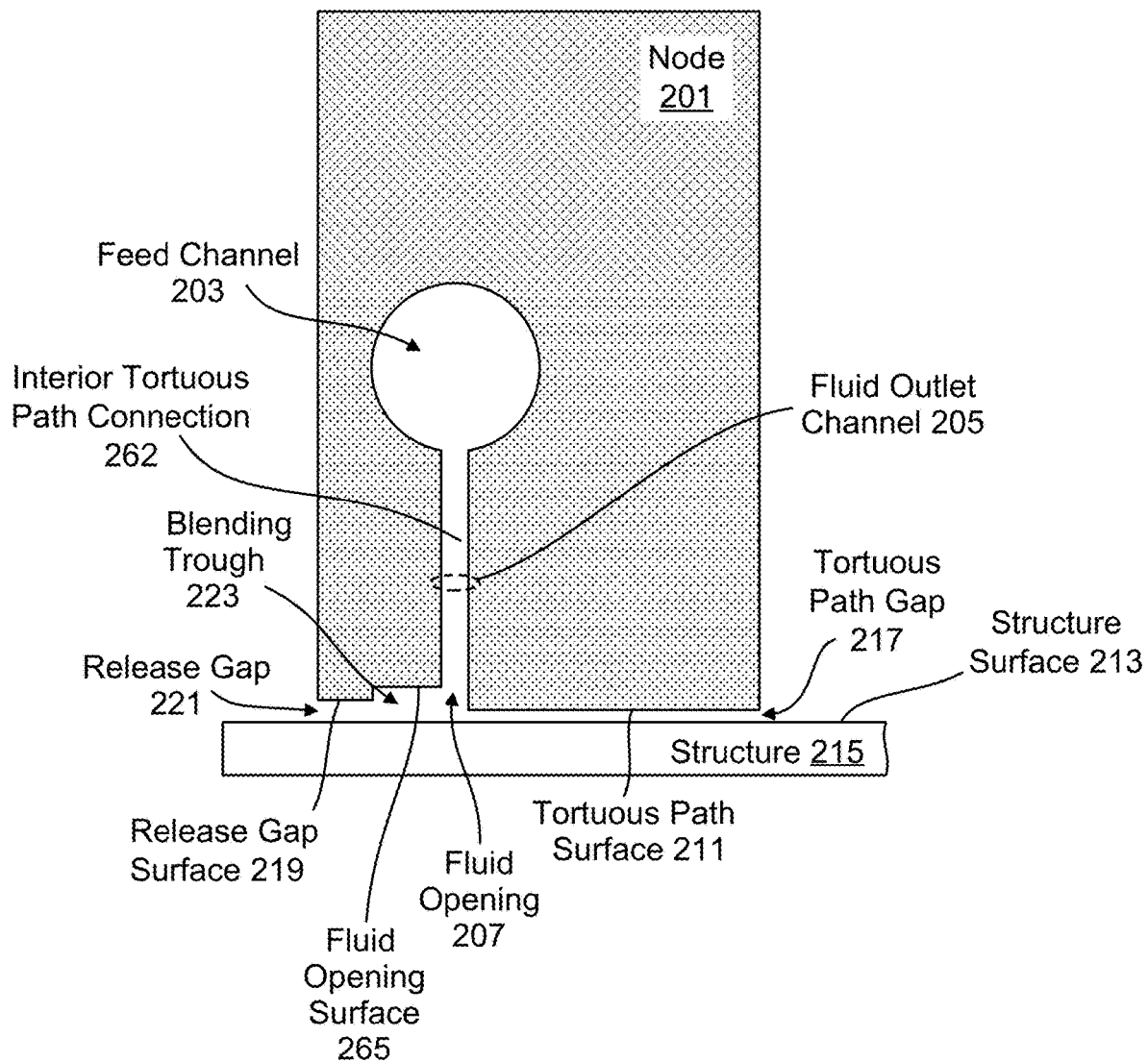
FIG. 3 illustrates another cross-sectional view of the node of FIG. 2.

FIG. 2 also shows a structure 215 with a structure surface 213 in close proximity to node 201. Structure 215 can, for example, be the structure or one of the structures to which node 201 is designed to adhere. The proximity of structure surface 213 can create one or more spaces between node 201 and structure 211. For example, the space between structure surface 213 and a fluid opening surface 265 (FIG. 3) can create a blending trough 223. Fluid flowing out of fluid openings 207 can be distributed between node 201 and structure 215 in blending trough 223. FIG. 3 is a cross-sectional view taken along the plane orthogonal to the page and defined by the line shown in FIG. 2. FIG. 3 illustrates a fluid management system that uses a tortuous path between node 201 and structure 215. FIG. 3 illustrates a blending trough 223 built into a fluid opening surface 265, with the region adjacent a release gap 221 defined by a release gap surface 221.

As described in greater detail below, node 201 also can include a surface with a witness hole configured to enable an observer or equipment to verify completion of the fluid injection operation being conducted. In an exemplary embodiment, the witness hole can be connected by a witness hole channel to feed channel 203. The witness hole and its channel can be configured geometrically such that fluid from feed channel 203 reaches the witness hole at approximately the same time the fluid injection process reaches a desired end. In an exemplary embodiment, the witness hole channel can have the same cross-sectional area as fluid outlet channel 205, but the witness hole channel can be longer than each fluid outlet channel, for example.

Referring back to FIG. 3, the figure illustrates a cross-sectional view of node 201 taken along the plane shown in FIG. 2. FIG. 3 illustrates a fluid flow management system using a tortuous path between node 201 and structure 215 to manage the fluid flow between the node 201 and the structure 215 according to various embodiments. Node 201 can include a release gap surface 219. Together, release gap surface 219 and structure surface 213 can form a release gap 221. Node 201 can also include a tortuous path surface 211. Together, tortuous path surface 211 and structure surface 213 can form an external tortuous path gap 217.

Figure 9:
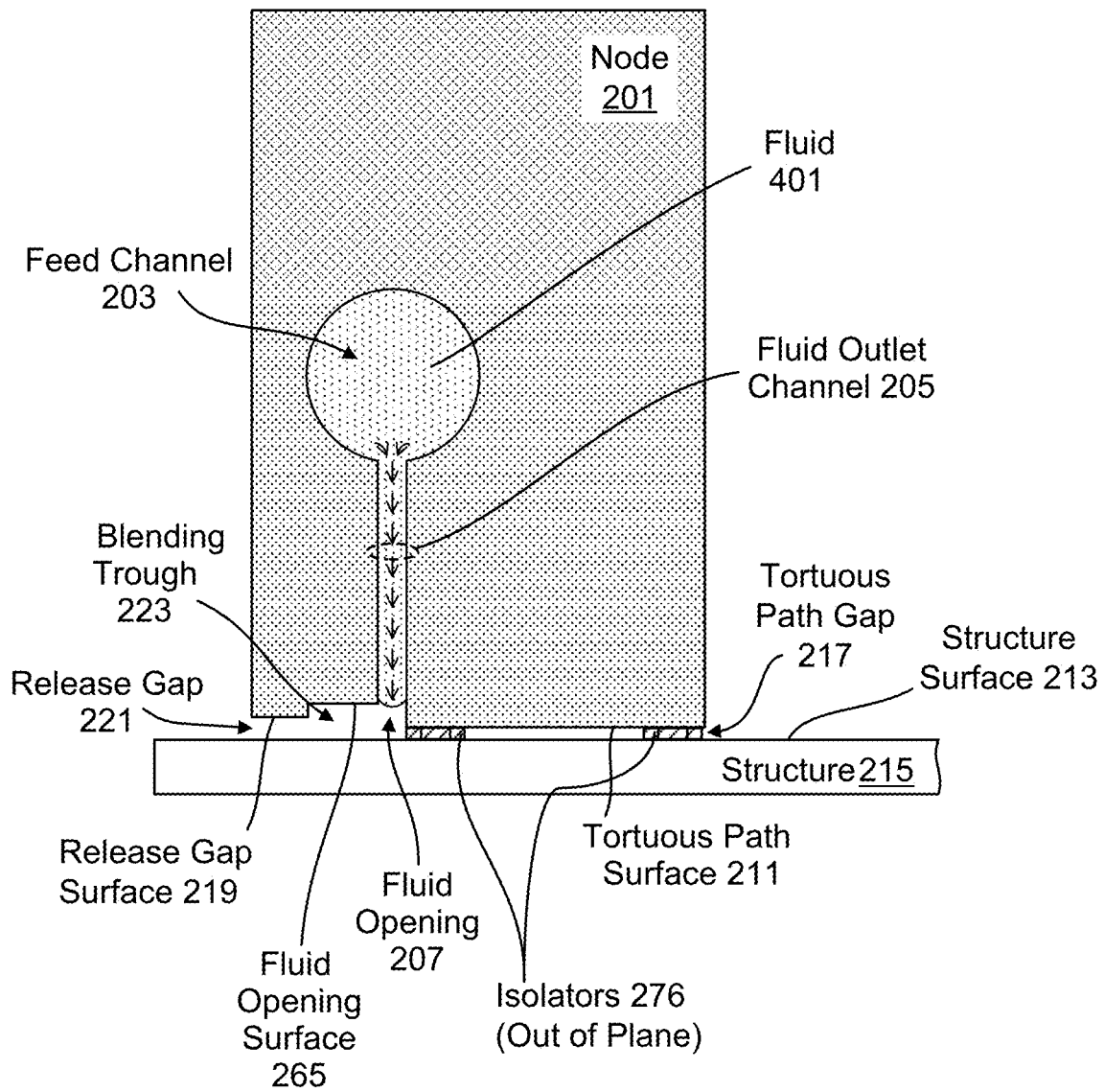
FIG. 9 illustrates a cross-sectional view of the node of FIG. 2 at the time of FIG. 8 and taken along the dashed line of FIG. 8.

While both FIGS. 2 and 3 appear that the node 201 is physically separated from the structure 215 by a gap, it will be seen in FIG. 9 that at other regions in the node-structure interface not included in these planes of view, one or more spacers, isolators, or other structures may be located between node 201 and structure 215. In addition, while the relatively modest cross-sectional areas of node 201 intimate that the node 201 is small and in proportion to the structure 215, no such requirements exist and in fact, the node 201 may be large and extend out substantially in most directions, leaving in some embodiments a relatively small area for the fluid connection relative to the node size. The same applies for structure 215, which may in various embodiments be larger than the node 201. The node 201 and structure 215 may also be shaped differently than from what is illustrated.

Referring to FIG. 3, tortuous path gap 217 can be tuned relative to the distance between fluid opening surface 265 and structure surface 213, or the distance between release gap surface 219 and structure surface 213, to inhibit flow of the fluid towards the right in the picture view and encourage flow to the left. Use of this technique, among other benefits, enables a desired positioning of fluid between the node-structure interface even if manufacturing tolerance variations cause minor geometrical differences of the node 201 or structure 215 (e.g., fluid opening surface 265 is positioned slightly inward relative to its nominal position, or release gap protrudes inward from the nominal position, etc.). Use of this technique also protects the node and structure from direct contact, if desired, which may result in contamination and subsequent corrosion, especially where dissimilar materials are involved.

Referring back to FIG. 2, an array of fluid outlet channels 205 provide multiple fluid openings 207 to facilitate fluid flow through feed channel 203 in node 201. Thus, FIG. 2 shows multiple fluid openings and fluid outlet channels in a perspective view. In the cross-sectional view of FIG. 3, only a single fluid opening 207 and a single corresponding fluid outlet channel 205 are shown. However, each of fluid outlet channels 205 in FIG. 2 can extend through node 201 and can connect feed channel 203 to the blending trough 223. Referring to FIG. 3, as noted, node 201 can include a release gap surface 219 that extends from fluid opening surface 265 to a first edge of node 201. Node 201 can further include a tortuous path surface 211 that extends from fluid opening 207 to a second edge of the node 201. Tortuous path surface 211 can be positioned closer (i.e. vertically, relative to a plane of the drawing) to a structure surface 213 of a structure 215 than fluid opening surface 265, in order to create the tortuous path gap 217 for the fluid, as discussed in more detail below with respect to FIG. 4. While FIG. 3 references a specific geometric configuration identifying multiple openings and a particular arrangement of surfaces and edges of node 201, these numbers and configurations may vary substantially and a large number of geometric configurations are possible. For example, the disclosure is not limited to a specific number of channels, and the numbers and shapes of the surfaces and edges of the node and the structure may vary for different embodiments of the tortuous path. Also, the fluid injected may be a sealant or another fluid.

Still referring to FIG. 3, the release gap surface 219 extends from fluid opening surface 205 to create a release gap 221 between structure surface 213 and the release gap surface. The distance between release gap surface 219 and structure surface 213 can be greater than the distance between extending surface 211 and the structure surface 213. Therefore, release gap 221 can be a lesser tortuous path for fluid flow than tortuous path gap 217. In addition, release gap surface 219 can create a blending trough 223 that can allow a larger amount of fluid to be deposited. Together, these configurations help guarantee that excess fluid (e.g., due to a longer-than-necessary fluid injection) will remain in the blending trough and/or extend through and if necessary, escape from, the release gap 221 rather than extending through the tortuous path 211, e.g., to an adhesive bond region.

As noted above, the relative sizes of the structures in node 201 can vary. In an exemplary embodiment, the cross-sectional area of each fluid outlet channel 205 can be approximately $\pi/4$ square millimeters, and fluid openings 207 can be spaced approximately one-half millimeter apart. In another embodiment, the material properties, such as viscosity, etc., of the fluid that is to be injected into feed channel 203 can be used to tune the characteristics of the feed channel 203 and fluid outlet channels 205. For example, the material properties of a particular sealant may be used to tune feed channel 204 and sealant outlet channel 205 characteristics, such as the ratio of the feed channel cross-sectional area to the sealant outlet channel cross-sectional area, for example. Sealant in this example can be injected into port 202, and the sealant can travel through feed channel 203 much quicker than the sealant travels through fluid outlet channels 205. Therefore, even though the sealant traveling through feed channel 203 reaches a first of sealant outlet channels 205 before reaching a last of the sealant outlet channels, the ratio referenced above (that essentially creates an internal tortuous path) and the viscosity are such that the sealant has not travelled too far through the first sealant outlet channel before the sealant reaches the last sealant outlet channel. In this way, for example, sealant injected into port 202 will flow through feed channel 203 and fluid outlet channels 205 to arrive at fluid openings 207 at approximately the same instant, which can allow a more even distribution of sealant over a greater area while using a single sealant injection port.

In various embodiments, the length of each of the outlet channels can be the same. In various embodiments, to facilitate a generally even distribution of fluid output onto a structure surface 213, the cross-sectional area of each of the fluid outlet channels can be less than the cross-sectional area of the feed channel. For example, the ratio of the cross-sectional area of each sealant outlet channel to the cross-sectional area of the feed channel can be approximately 1:50.

FIG. 4 illustrates node 201 and structure 215 after a fluid 401, such as a sealant, has been injected into fluid port 203 and has begun to travel through feed channel 203. As illustrated by the small arrows proximate the fluid outlet channels which in this case serve as interior tortuous path connections 262, the fluid 401 remains almost exclusively in the feed channel 203, with a proportionately insignificant amount protruding into the interior tortuous path connections 262 associated with each fluid outlet channel 205. This behavior of fluid 401 is due to the large ratio in cross-sectional area of feed channel to fluid outlet channel maintaining the fluid initially within, and contributing to a comparatively faster movement of the fluid 401 in the direction of, the feed channel 203. This behavior of the fluid can also result from the viscosity of the fluid 401 which is higher in some embodiments than in others, with both considerations of channel geometry and fluid properties tending to dominate over other forces (gravitational or otherwise) that would otherwise cause the fluid 401 to move into the fluid outlet channels 205 faster and in greater amounts.

FIG. 5 illustrates node 201 and structure 215 after the fluid 401 has traveled across five of the nine tortuous path connections 262. As compared with the leftmost fluid outlet channel 205/tortuous path connection 262 where the force vectors of the fluid 401 entering fluid port 203 have not yet completely stabilized in a right horizontal direction associated with the feed channel 203 of this embodiment, the amount of fluid protrusion into the subsequent fluid outlet channels becomes less significant in view of the momentum buildup of the fluid 401 in the direction of the feed channel and the increased tendency to flow in one uniform direction where the cross-sectional area is significantly greater. This trend can be visualized by the "straightening" out of the lower surface of fluid stream 401 rightward.

Figure 7:
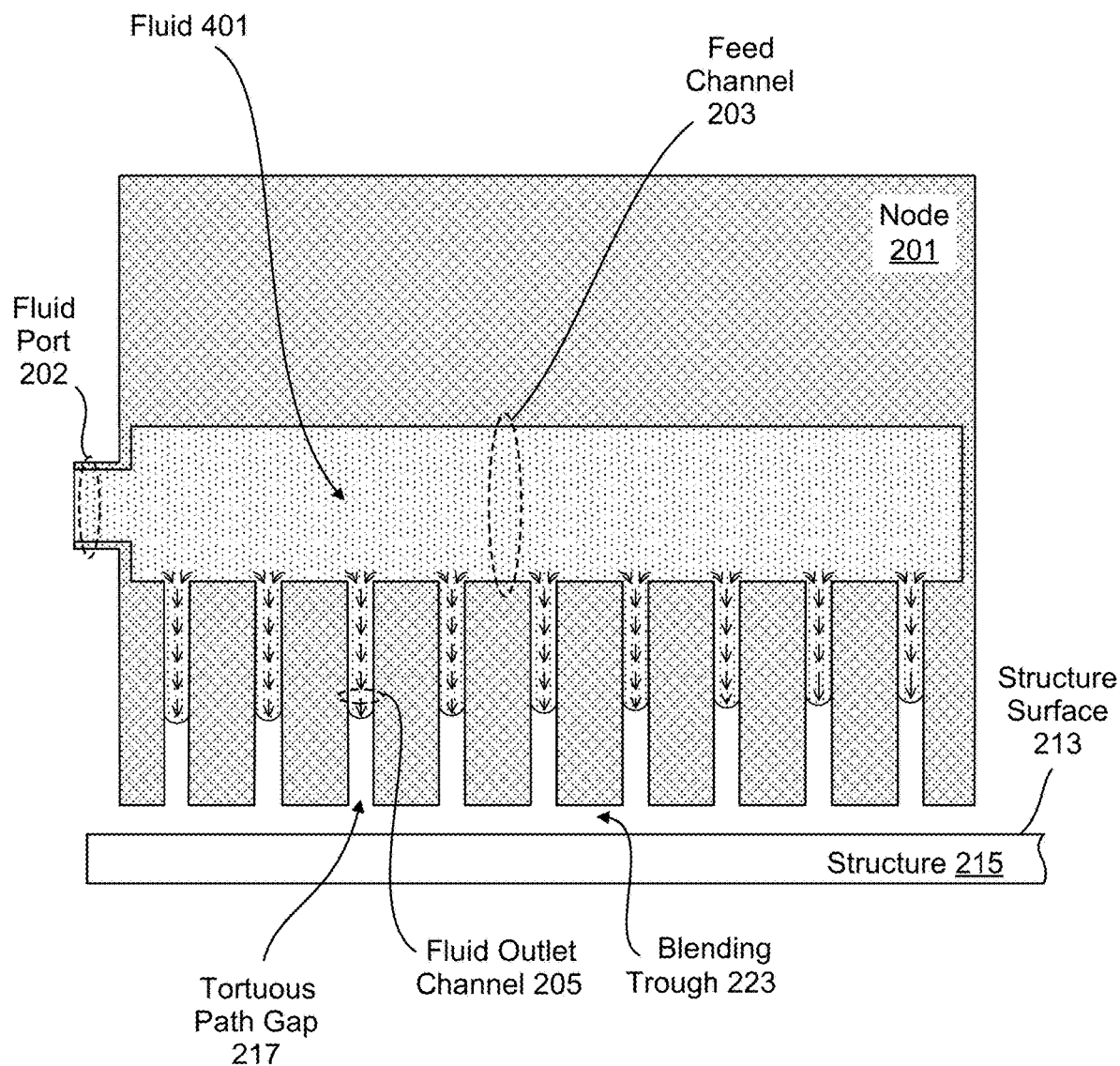
FIG. 7 illustrates a cross-sectional view of the node of FIG. 2 after further time has elapsed such that the fluid has reached from slightly more to slightly less than half-way down the fluid outlet channels.

FIG. 6 illustrates node 201 and structure 215 at the precise time the fluid 401 has filled the feed channel 203. As noted above, the protrusions into the fluid outlet channels 205 become progressively less pronounced as the momentum of the fluid 401 in the direction of the feed channel 203 concomitantly increases, which phenomenon is even more pronounced by a higher viscosity fluid). At this point, the flow pressure remains, but the fluid now has nowhere else to go. This means that generally, fluid 401 such as a sealant will begin its path down the respective fluid channels 205 at approximately the same time. This is because the feed channel 203 is full and the fluid pressure and gravitational forces are substantially the same at the opening of each fluid outlet channel 205. In FIG. 7, the fluid 401 has reached approximately the half-way point down the fluid outlet channels 205, traveling slightly greater than halfway in about four of the channels 205, about halfway in one channel 205, and slightly less than halfway in the remaining four rightmost channels 203. Subsequently, as shown in FIG. 8, the fluid 401 reaches approximately the end of the fluid outlet channels 205, traveling slightly greater than the length of the channels 403 on the left, approximately even in the middle, and slightly less than the length of the channels 403 on the right.

Figure 8:
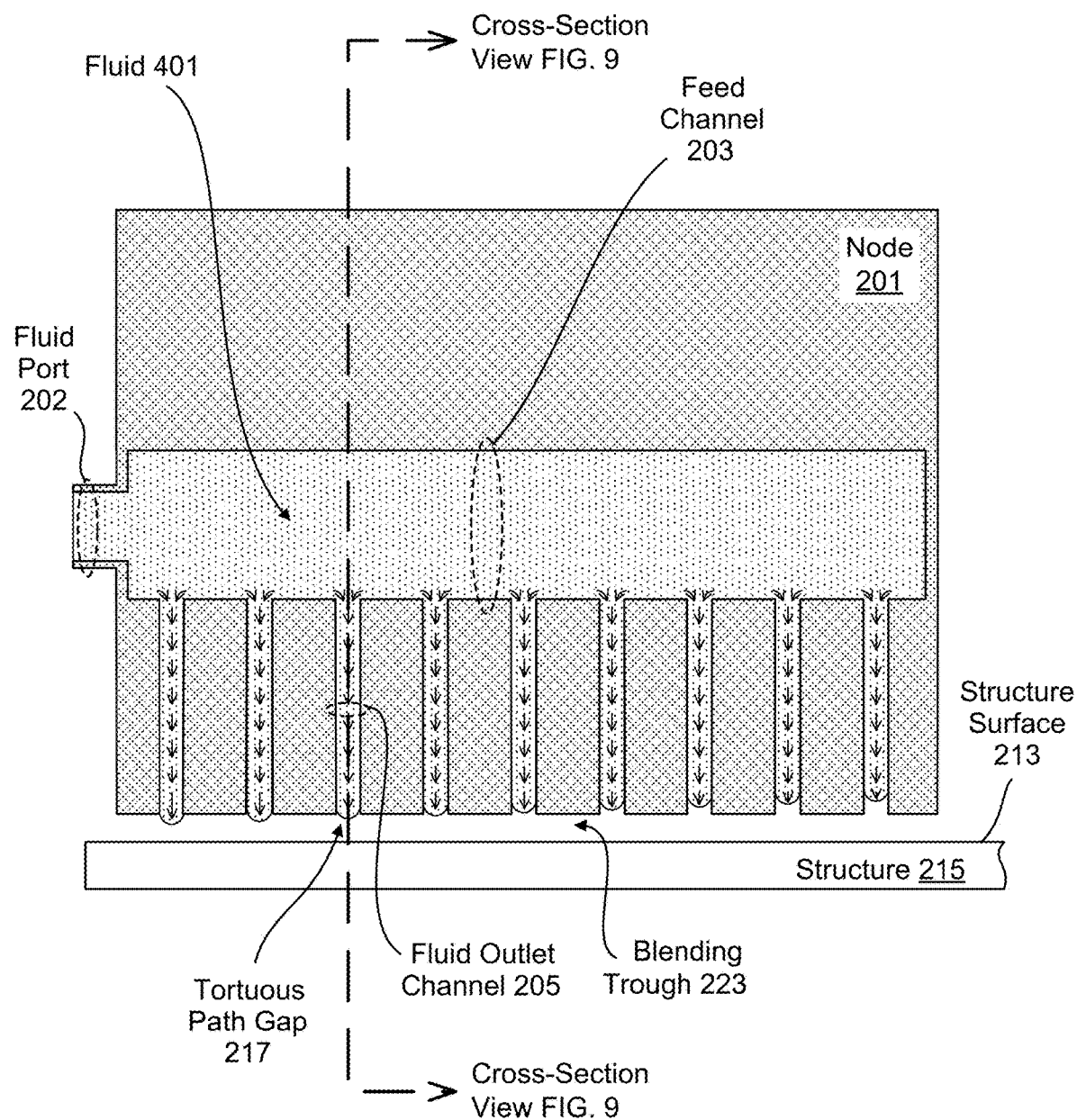
FIG. 8 illustrates a cross-sectional view of the node of FIG. 2 after further time has elapsed such that the fluid has reached from slightly more to slightly less than the full way of the fluid outlet channels.

FIG. 9 illustrates a cross-sectional view of the node of FIG. 2 at the time of FIG. 8 and taken along the dashed line of FIG. 8. In this example, one of the fluid outlet channels 205 is viewable, such that the fluid 401 has traveled approximately to the end of the channel. As discussed in greater detail below, the fluid opening 207 is adjacent a fluid opening surface 265 that is part of node 202, and a release gap surface 219. The combination of these elements along with the structure surface 213 define a blending trough 223.

FIG. 9 also shows two isolators 276. The purpose of the isolators 276, also known a spacers, is to prevent node 201 and structure 215 from contacting each other. Contact may be undesirable for a variety of reasons, but it is particularly undesirable in certain specific cases where the materials in node 201 and structure 215 are dissimilar such that they tend to cause galvanic corrosion over time. The isolators prevent the possibility of contact. The isolators 276 are delimited "out of plane" which means that they are not in the region of the tortuous path and other channels shown in FIG. 9. Rather, the isolators 276 may be located at a region of the node-structure interface which is farther into or out of the page, such that they leave the channels and gaps undisturbed. The same is true for the other illustrations such as FIG. 2, where the isolators, although not explicitly shown, are also placed to avoid interfering with fluid flow.

The isolators may be shaped differently and may be made of different materials. In an embodiment, nylon washers are used to isolate the node 201 and structure 215. However, any type and shape of isolator may be implemented.

Figure 10:
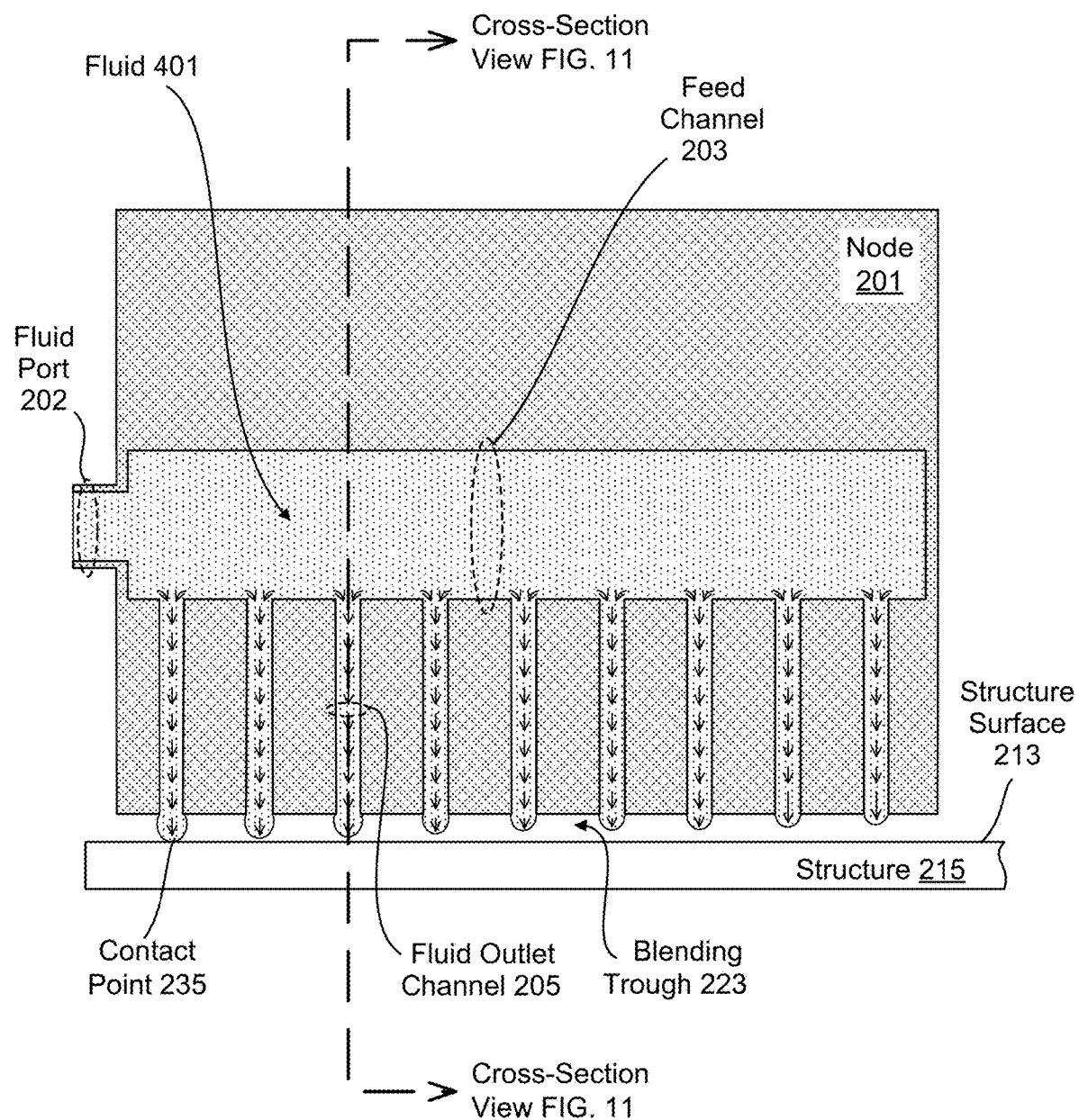
FIG. 10 illustrates a cross-sectional view of the node of FIG. 2 after further time has elapsed such that the fluid from one of the fluid outlet channels has contacted the structure.

Continuing now from the cross-sectional view of FIG. 8, FIG. 10 illustrates a cross-sectional view of the node of FIG. 2 in which further time has elapsed after the event of FIG. 8 such that the fluid 401 from one of the fluid outlet channels 205 has made physical contact with the structure surface 213, shown by contact point 235. As is evident from the illustration, approximately three other of the channels 205 to the right of contact point 235 have almost reached the surface, with the fluid 401 from the remainder of channels slightly lagging. In spite of this relatively small lag time between the leftmost and rightmost fluid outlet channels 205, the difference between them is sufficiently small as to enable a generally even application of fluid 401, such as a sealant or an adhesive, onto the relevant surface 213 of the structure 215 to build up and fill the sealant gap between the structure 215 and the node 201.

Figure 11:
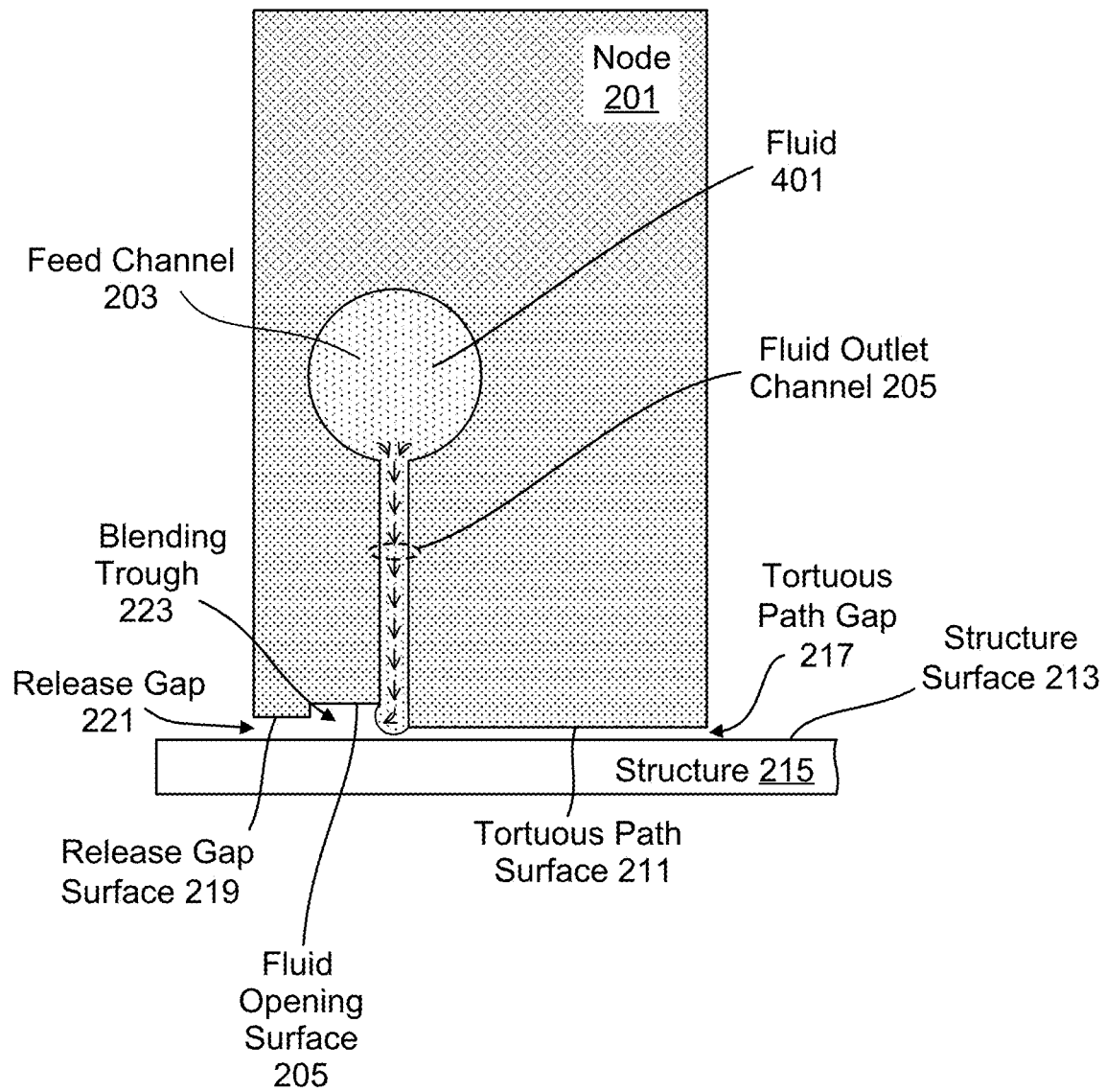
FIG. 11 illustrates a cross-sectional view of the node of FIG. 2 at the time of FIG. 10 and taken along the dashed line of FIG. 10.
Figure 12:
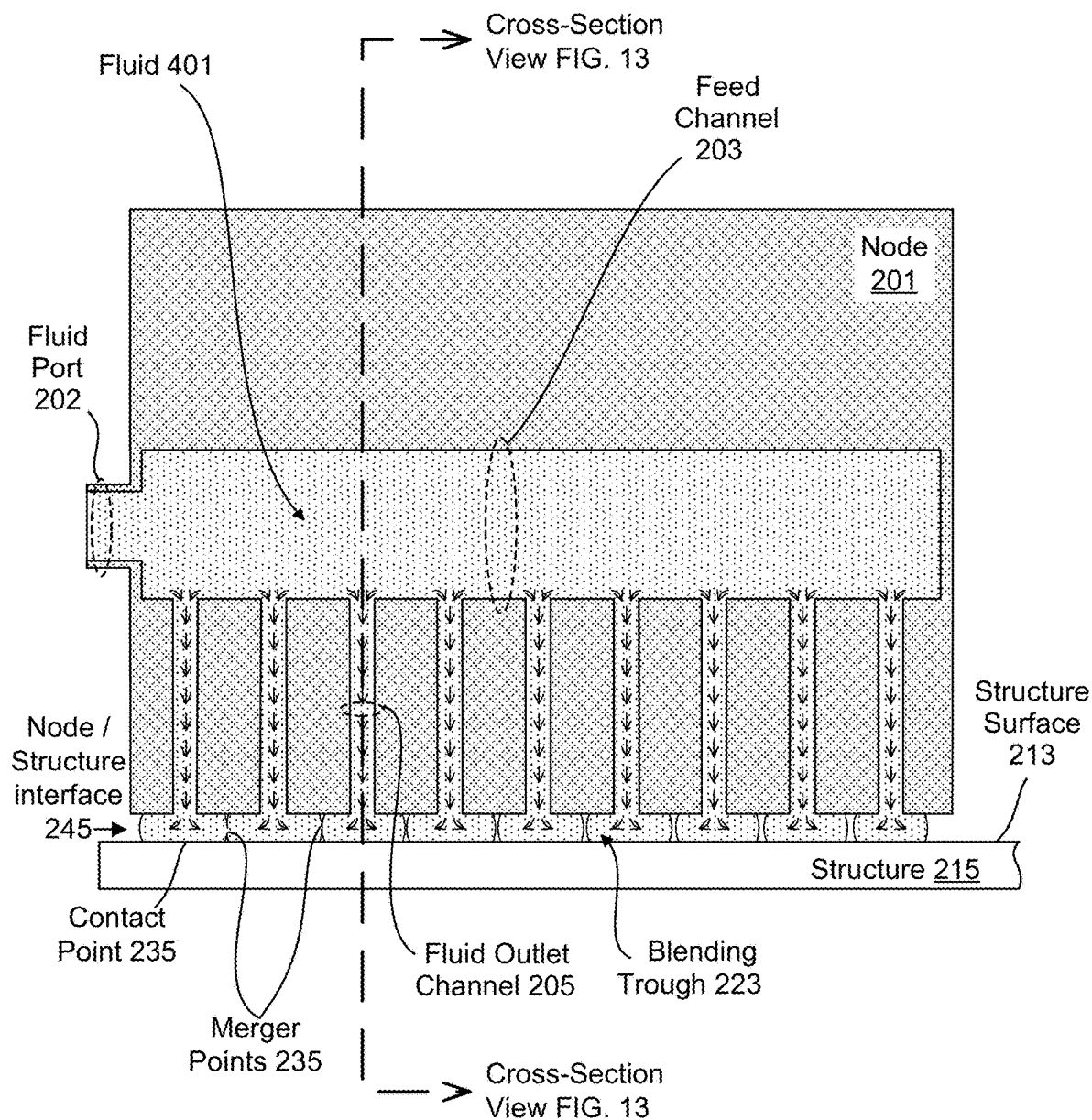
FIG. 12 illustrates a cross-sectional view of the node of FIG. 2 after further time has elapsed such that the fluid has contacted the structure from all fluid outlet channels and is beginning to amalgamate in the blending trough.

FIG. 11 illustrates a cross-sectional view of the node of FIG. 2 at the time of FIG. 10 and taken along the dashed line of FIG. 10. The fluid 401 has traveled through the fluid outlet channel 205 and is beginning to enter into the right side of the blending trough 223 area. FIG. 12 illustrates a cross-sectional view of the node of FIG. 2 after further time has elapsed such that the fluid has contacted the structure 215 from all fluid outlet channels 205 and is beginning to amalgamate in the blending trough. Here it is noted that in one exemplary embodiment, the blending trough 223 is a singular region that extends across the openings of each of the fluid outlet channels 205 that feed it. Thus, as the fluid 401 is outlet into the blending trough 223, it is "blended" in the sense that it is combined into a single region of fluid between the node-structure interface. In addition to contacting the surface at contact point 235, the fluid exiting from different outlet channels 205 is also beginning to merge together at the node/structure interface 245, such as at merger points 235. The merger points associated with all of the channels may not occur identically in time, but they are closely related and occur at approximately the same time relative to a fluid injection process. For example, even at the far right of the node/structure interface 245, the fluid is spaced closely together and will merge shortly after occurrence of the merger points 235. In short, as a consequence of the slight lag time between the transport of fluid 401 through the array of fluid outlet channels 205, it can be seen that the fluids from at least the three leftmost fluid outlet channels 205 are in contact at merger points 235, and that the remaining fluid 401 from the other channels 205 are nearing a point of contact at node/structure interface 245 as well, but are not yet in direct contact. It can also be noted that, as a result of the same time lag, the fluid 401 in the node-structure interface 245 is slightly closer to the left edge of the interface 245 than the right edge because the fluid from the leftmost channel 205 has had more time to flow in the interface 245 than the fluid from the rightmost channel 205. These unavoidable discrepancies, however, will not adversely affect the nature of the fluid contact if the tuning is performed as disclosed herein, e.g., a sealant or an adhesive will for any practical purpose be almost perfectly evenly applied.

Figure 13:
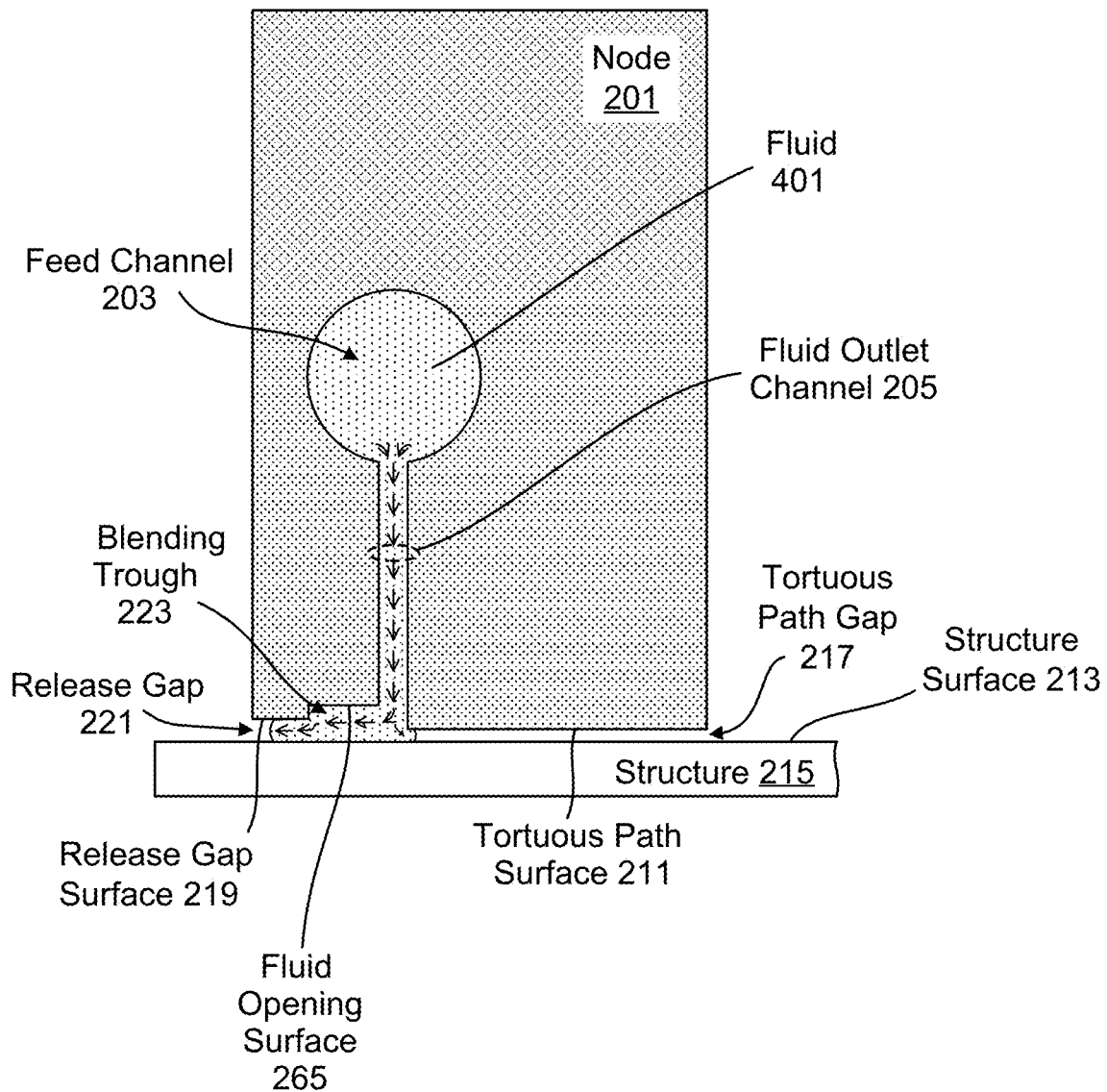
FIG. 13 illustrates a cross-sectional view of the node of FIG. 2 at the time of FIG. 12 and taken along the dashed line of FIG. 12

FIG. 13 illustrates a cross-sectional view of the node of FIG. 2 at the time of FIG. 12 and taken along the dashed line of FIG. 12. The fluid 401 from this fluid outlet channel 205 has contacted the structure surface 213. At this point in time, the fluid 401 has filled blending trough 223 and the two remaining possibilities related to fluid flow are that the fluid 401 can either go left or right. In accordance with an aspect of the disclosure, a tortuous path gap 217 is defined by a tortuous path surface 211 on the node 201 and the surface 213 of the structure 215. In an exemplary embodiment, the tortuous path gap 217 can be made very small relative to the thickness of the blending trough 223 between the fluid opening surface 265 and the structure surface 213. In addition, a release gap 221 may be included proximate the blending trough 223, which may also have a thickness smaller than the blending trough 223 but markedly larger than that of the tortuous gap 217. Similar to the fluid outlet channels 205 acting as internal tortuous paths relative to feed channel 203 of node 201 to enable an even distribution of fluid 201, the tortuous path gap 217 can be tuned relative to the blending trough 223 and release gap 221 to control the overall directional flow of fluid 201. As is evident from FIG. 13, only a small amount of fluid 401 breaches the tortuous path gap in comparison to the total amount of fluid 401, most of which flows into the blending trough 223 and subsequently the release gap 221.

In an exemplary embodiment, the tortuous path gap 217 can be adjusted to account for process variations and manufacturing tolerances, e.g., geometrical or positional variations caused by the alignment accuracy between the node and the structure, or caused by the 3-D printer that printed node 201 or more generally by the process that manufactured node 201 or structure 215. When node 201 is secured proximate to structure 215 to add a sealant, for example, the tortuous path surface and/or the structure surface 213 may have slight positional variances due to manufacturing tolerances. The tortuous path gap 217 width can be selected to accommodate the expected process variations and may itself vary, e.g., where there is some margin of misalignment between the node 201 and structure 215. As long as the gap 217 is within its acceptable margin which can advantageously be calculated in advance of the procedure, sealant can still be added as described above even if manufacturing variations result in slightly different gap widths. More generally, the node 201 and structure 215 need not come into direct contact when connecting the two components using the technique described herein. Further, the width of the tortuous gap can be tuned to position the fluid 301 between the components 201 and 215 as desired, and manufacturing tolerances can be taken into account to maximize or render perfect the number of successful fluid injections.

The unique shape of the blending trough 223, characterized in this example by a slight protrusion between the release gap surface 219 and the fluid opening surface 265, may cause some of the fluid to change direction to the adjacent channels until the pressure from the overall flow sends it back to the left. This activity may result in a blending of the fluid 401 at the node-structure interface, which may be desirable in some embodiments. This may help ensure a uniform bond, e.g., for a sealant traveling across a periphery of an object.

Figure 14:
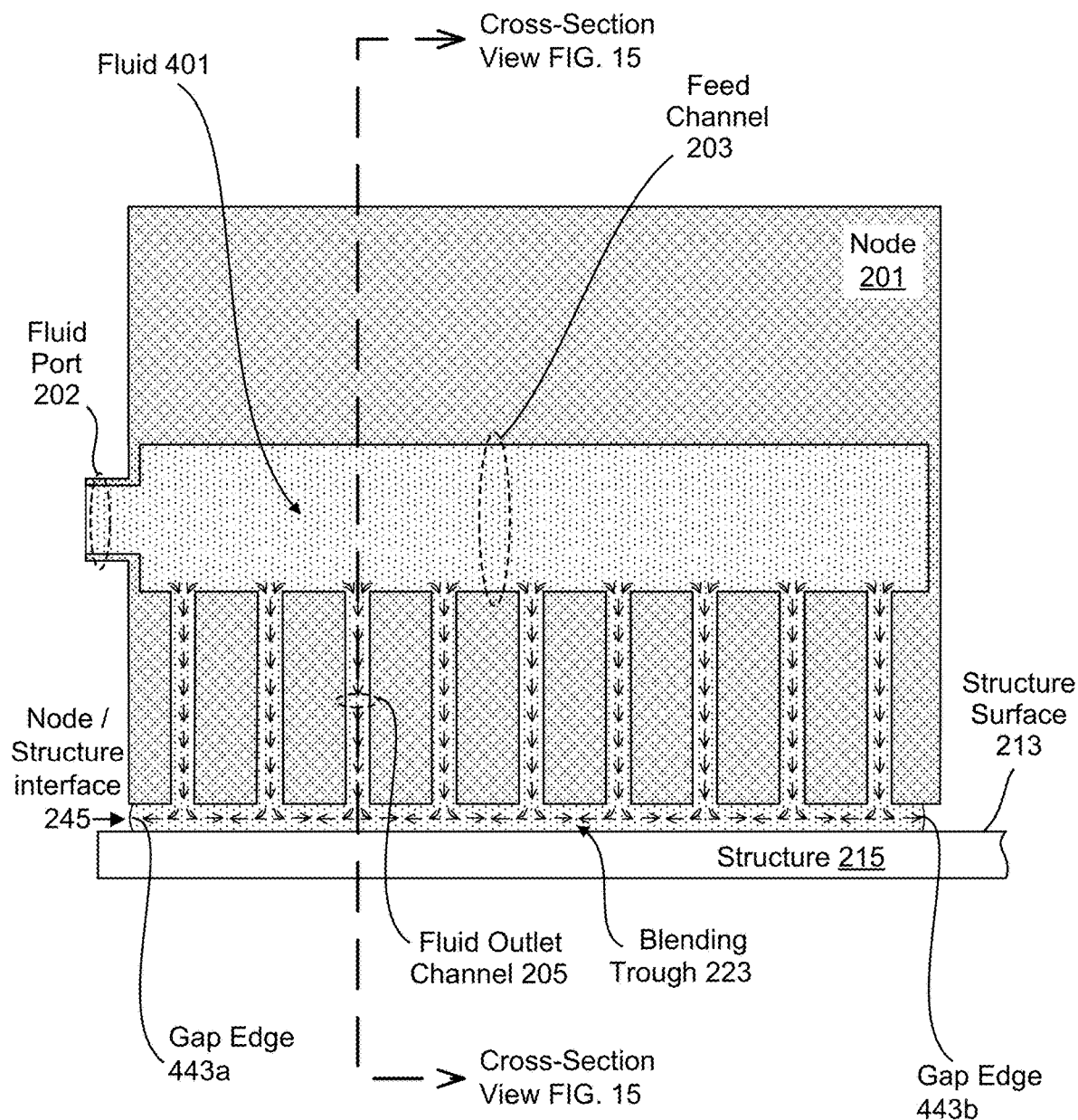
FIG. 14 illustrates a cross-sectional view of the node of FIG. 2 after further time has elapsed such that the fluid has amalgamated in the blending trough between the node and the structure surface.
Figure 15:
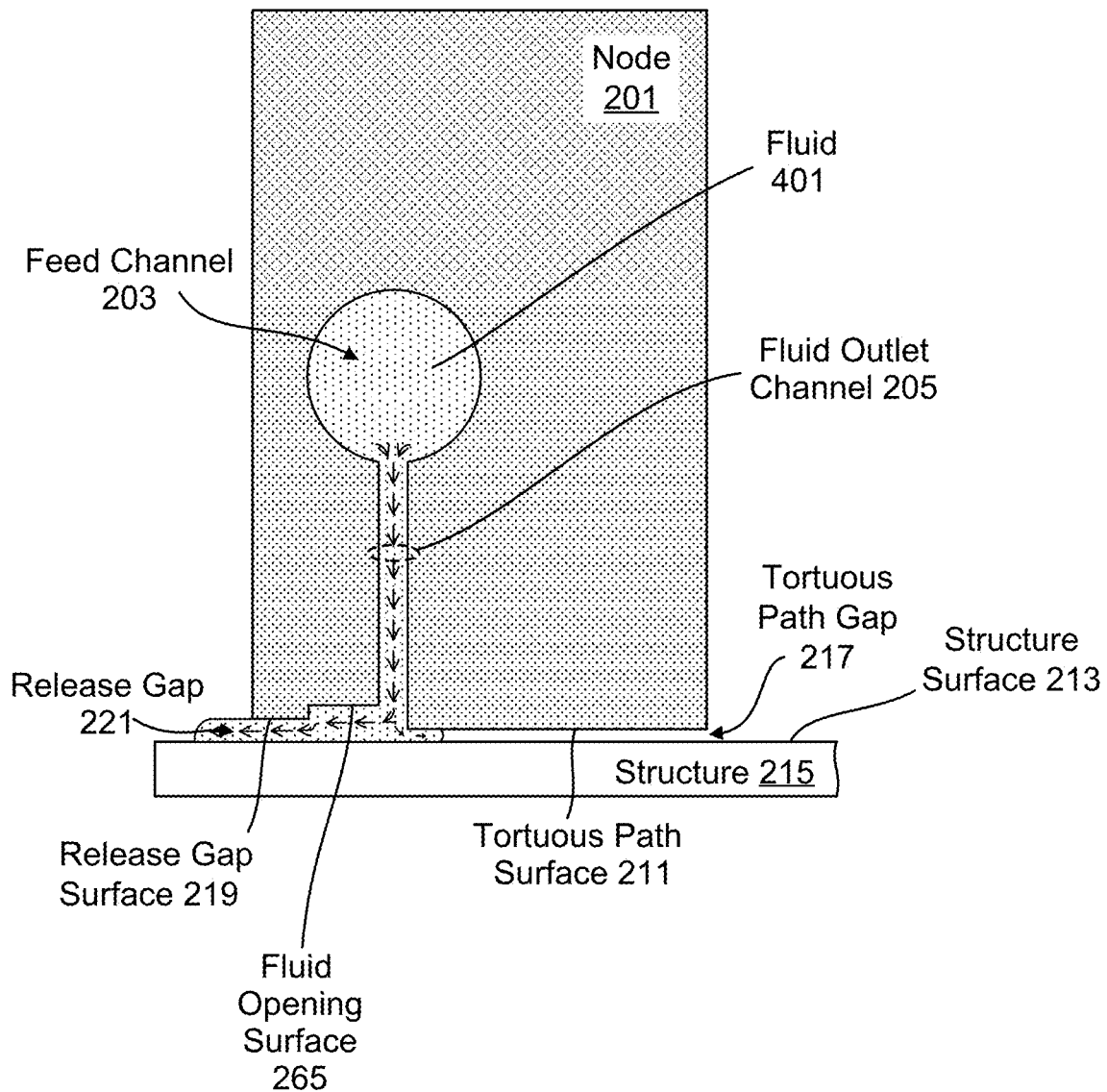
FIG. 15 illustrates a cross-sectional view of the node of FIG. 2 at the time of FIG. 14 and taken along the dashed line of FIG. 14.

FIG. 14 illustrates a cross-sectional view of the node 201 of FIG. 2 after further time has elapsed such that the fluid 401 has amalgamated in the blending trough between the node 201 and the structure surface 213. Along the relevant section of the node structure interface 245, the fluid 401 is continuous and at this particular time, edges slightly closer to gap edge 443a than to gap edge 443b for the reasons discussed above with respect to FIG. 12. FIG. 15 illustrates a cross-sectional view of the node 201 of FIG. 2 at the time of FIG. 14 and taken along the dashed line of FIG. 14. The fluid has traveled through the blending trough 223 in the region associated with that fluid outlet channel 205. Some protrusion of the fluid 401 is evident into the tortuous path gap 217, but most of the excess fluid veers left and bleeds out of the release gap 221. The release gap 221 may serve to provide an area for excess fluid to flow as noted above (and thereby minimize bleeding into the tortuous path gap 217) and in some embodiments, to indicate to the manufacturer when the fluid delivery process is complete. At the point in FIG. 14, the delivery of the fluid 401 may be stopped. The time to terminate the flow of fluid 401 may be evident based on the bleeding of the fluid into the release gap 401 and beyond the node 401. In an alternative embodiment discussed below, a witness hole may be used to ascertain when fluid delivery is complete. Still other methods are possible using automated equipment.

Because the tortuous path gap 217 depends on the distance between the node 201 and the structure 215, it will be appreciated that the node 201 and structure 215 should be positioned securely and precisely relative to one another. Dedicated equipment can be used to ensure this placement, and precise measurements should be made to ensure that the structures have not shifted or otherwise compromised such that the expected gaps vary unintentionally. A variety of measures as known in the art may be used for securely positioning the devices during fluid injection processes. This equipment typically publishes its known tolerances and alignment variations, all of which may be taken into account at the CAD process when the designer is assessing the most suitable configurations for the nodes and their internal features relevant to fluid injection.

In an exemplary embodiment, fluid 401 is a sealant which is used to contain a subsequently-added adhesive and to preserve the integrity of the bond made between the adhesive and the node-structure interface. This embodiment is described in greater detail below. It is apparent in FIG. 15 that, since the bleeding of the fluid 401 into tortuous path gap 217 is minor and the integrity of the cured bond is consistent across the relevant portion of the node surface, there remains plenty of room for an adhesive bond area to be built into the node 201 in an area to the right of the fluid 401 in tortuous path gap 217—which for purposes of these examples means that adhesive channels will be disposed in an interior of the node-structure combination relative to the sealant bonds created near the node-structure edges. These details an configurations may vary (e.g., where the bonds are located, in what orientation, etc.) and the present disclosure is not so limited to the examples presented herein.

In sum, in the embodiments herein, a fluid 401 such as a sealant has been injected into port 202 and has traveled through feed channel 203, sealant outlet channels 205 and into its associated region of the blending trough 223. The sealant may have also bled into release gap 221 such that it becomes apparent to the system or observer (in some cases, an automated system or an autonomous mechanism such as a robot) that the fluid fill (e.g., sealant) is complete. Thereupon, if the fluid 401 is a sealant that cures with time, the manufacturing process may be suspended until the sealant cures. In other embodiments, heat may be applied to the fluid 401 via the port 203, the release gap 221, or another structure built into the node 201 for treating fluid 401.

Figure 16:
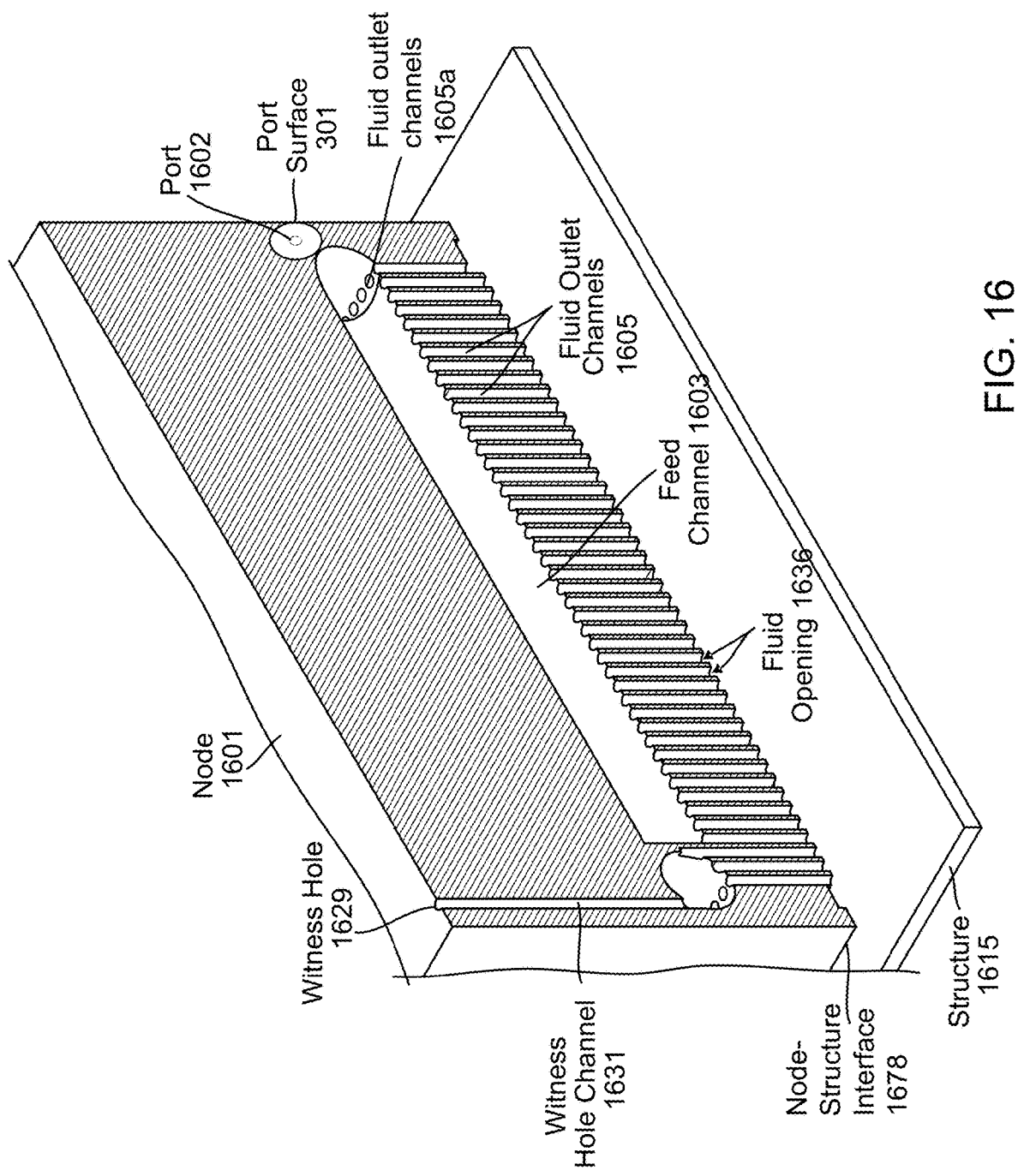
FIG. 16 illustrates a partial cross-sectional perspective view of a node-structure combination and interface using a witness hole in the node.

FIG. 16 illustrates a partial cross-sectional perspective view of a node-structure interface using a witness hole 1629 and witness hole channel 1631 in the node, with a cutout of a portion of the node 1601 to reveal the internal fluid channels. As before, the node includes a port 1602 that leads to a relatively large feed channel 1603, that in turn leads to a plurality of comparatively small fluid outlet channels 1605. Fluid can thereby exit fluid openings 1636 to occupy a region between the node 1601 and structure 1615. As illustrated in this embodiment, the fluid outlet channels 1605a extend to form an array of multiple rows of channels served by the feed channel 1603 to form a strong and even bond between the node 1601 and structure 1615. In some embodiments, multiple adjacent feed channels may be used, each of which serve one or more rows of fluid outlet channels to form a network of such channels. In other embodiments, a single feed channel may be coupled to a single row of fluid outlet channels. A number of variations are possible using the principles herein.

A witness hole 1629 that leads to a witness hole channel 1631 is additively manufactured with node 1601. The witness hole channel 1631 may lead to the feed channel 1603. The witness hole 1629 may serve to identify when the desired fill of fluid from the fluid openings 1636 into the node-structure interface has completed. In an exemplary embodiment, the nature of the fluid outlet channels as tortuous paths relative to the feed channel 1603 means that the feed channel substantially fills with liquid prior to significant flow of fluid via the fluid outlet channels towards the fluid openings 1636. Thus, when the feed channel 1603 fills, a pressure can build in the feed channel 1603 such that fluid in the feed channel begins to exit through the witness hole channel 1631. In an exemplary embodiment, the length and cross-sectional area of channel 1631 are selected such that the fluid fill from openings 1636 into the node-structure interface is complete at the same time the fluid reaches a surface of the node 1601 at the witness hole. Therefore, for example, when the upward fluid flow from witness hole channel 1631 is sensed or recognized, it is deduced that a uniform and even mix of fluid is present at the node-structure interface and that the fluid flow into port 1602 can be terminated. This procedure can occur manually, or it can be automatic, e.g., by using an instrument to sense the upward fluid pressure from the witness hole 1629. Use of the witness hole 1629 can advantageously prevent inadvertent fluid overflow, can prevent fluid waste, and can maximize manufacturing speed by minimizing the time between steps.

Certain adhesive connections between additively manufactured nodes and other structures, including extrusions, tubes, panels, and other additively manufactured components, may be designed without sealant systems. Using a suitable part preparation process on the additively manufactured part, such as E-Coating, may aid in mitigating galvanic corrosion without requiring isolators, such as sealants, between the dissimilar material materials being connected. Furthermore, the part preparation processes may also render the usage of environmental seals unnecessary. In some cases involving connections between similar materials, or for connections intended for locations that would have limited or no environmental exposure, sealants and isolators might not be needed. In this event, fluid 401 may be an adhesive or a lubricant, for example.

Figure 17:
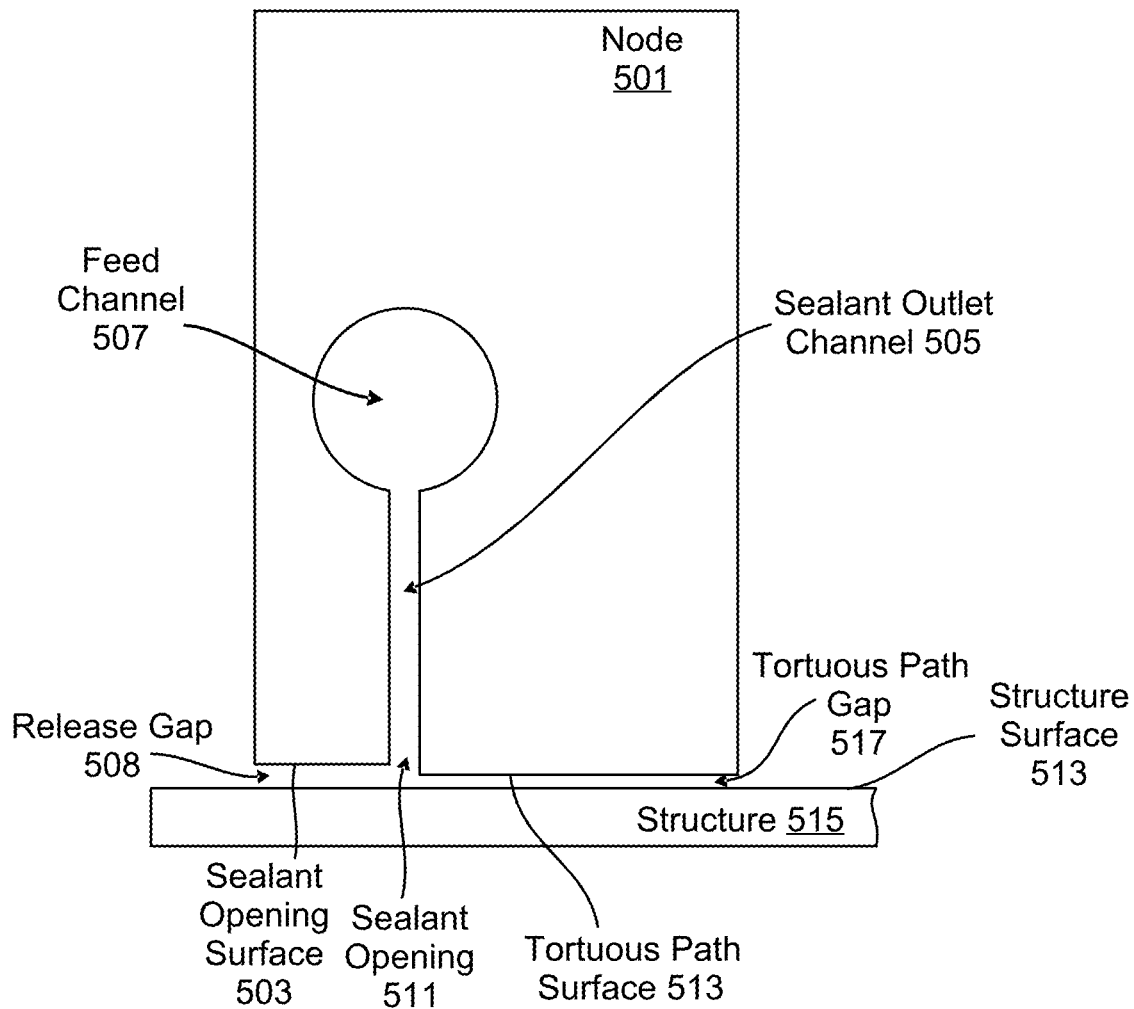
FIG. 17 illustrates a cross-sectional view of a node-structure combination having a release gap and tortuous path therebetween in accordance with another embodiment.
Figure 18:
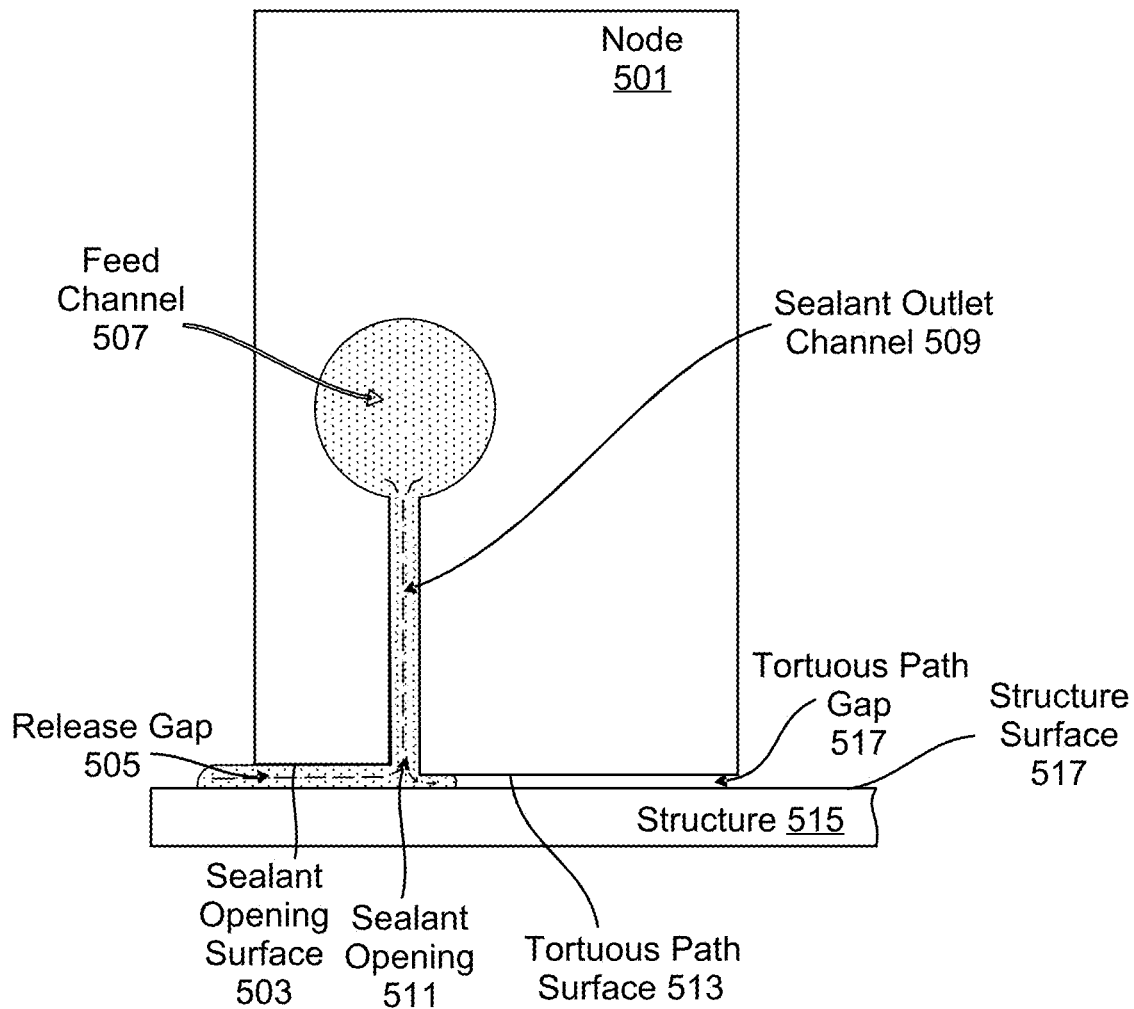
FIG. 18 illustrates a cross-sectional view of the node-structure combination of FIG. 17, after a sealant has been introduced into the feed channel and has flown through the sealant outlet channel into a release gap and a portion of the tortuous path.

While the various examples above describe the use of a blending trough 223 and a protrusion between release gap surface 219 and fluid opening surface 265, these configurations are exemplary in nature, and a number of different geometrical configurations are possible. For example, FIG. 17 shows a cross section of a node 501 relative to structure 515 for sealant delivery. Node 501 has a smooth sealant opening surface 503 adjacent sealant opening 511, without the protrusion and blending trough used in previous embodiments. FIG. 18 is a similar cross section of node 501 as sealant is delivered from a port (not shown) through feed channel 507 and sealant outlet channel 509, out sealant opening 511 and through release gap 505, with a small portion of sealant protruding into tortuous path gap 517 between the tortuous path surface 513 of node 501 and the surface 517 of the structure 515.

Figure 19:
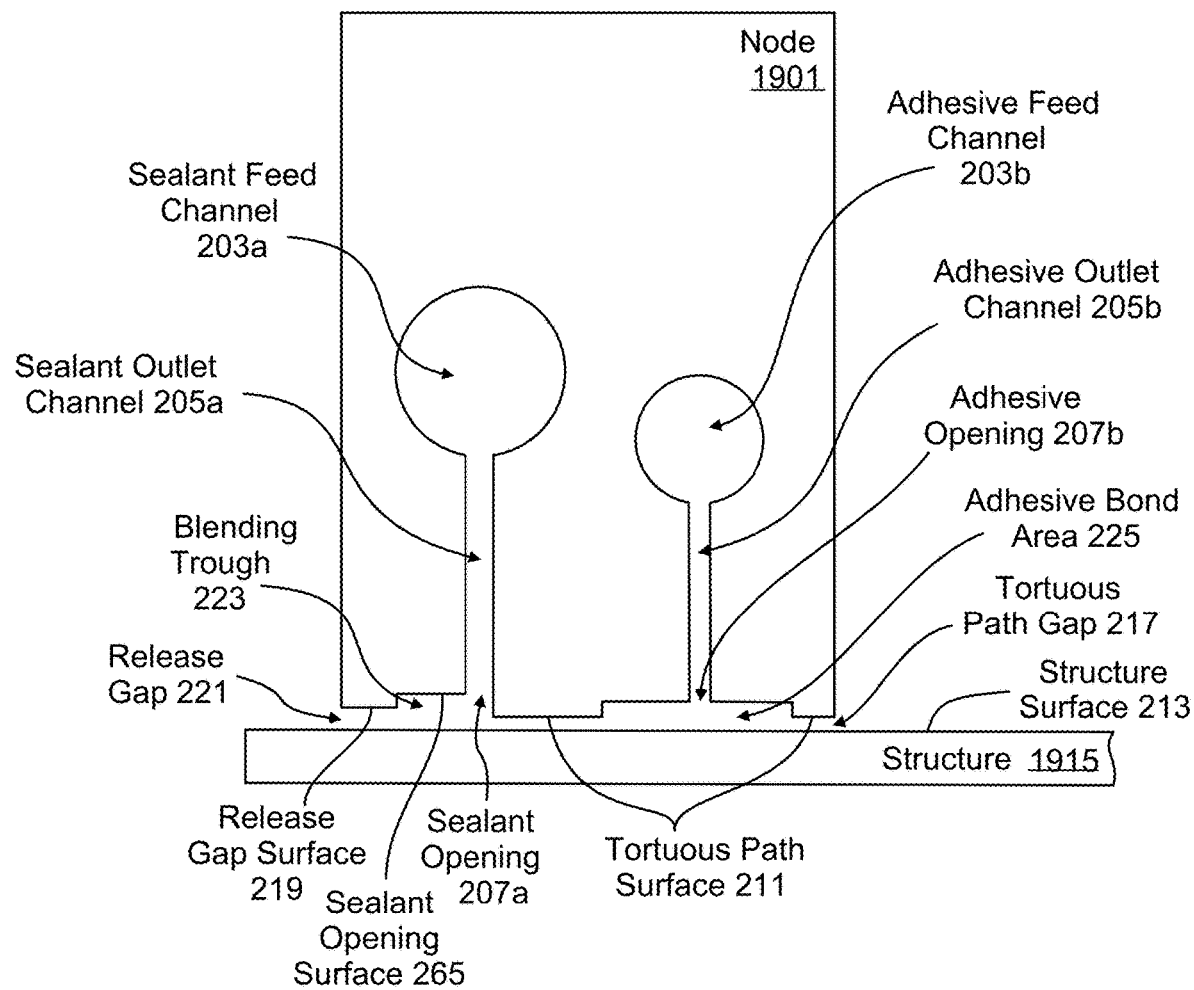
FIG. 19 illustrates a cross-sectional view of a node including both sealant and adhesive feed channels for injecting both adhesive and sealant for use in connecting to a structure.

In another exemplary embodiment, multiple channels and/or arrays of channels may be used for carrying different types of fluids to a node-structure interface while using tortuous paths to effect a specific manufacturing result. FIG. 19 illustrates a cross-sectional view of a node including both sealant and adhesive feed channels for injecting both adhesive and sealant for use in connecting to the illustrated structure. The general structure of FIG. 19 may be similar in its other views to the perspective cross-sectional view of FIG. 16 in which arrays of fluid outlet channels are visible, and/or to the cross-sectional view of FIG. 12 showing a feed channel feeding one row of fluid outlet channels 205. In FIG. 19, the sealant and adhesive feed channels 203*a-b* may be adjacent one another and in some embodiments, may form an interspersed array of outlet channels 205*a-b*. In other embodiments, two parallel feed channels 203*a-b* may be additively manufactured across each side of a node. In other embodiments, more than two feed channels may be implemented. In an embodiment, a single feed channel includes a single row of outlet channels. In other embodiments, a single feed channel may include a plurality of rows of outlet channels. The plurality of rows may be used to supply the same fluid or a different fluid. In short, a wide variety of geometrical configurations of FIG. 19 and prior embodiments are possible and are considered to be within the scope of the present disclosure.

Referring back to FIG. 19, a sealant feed channel 203*a* is additively manufactured across a border region of the node 1901 adjacent an additively manufactured adhesive feed channel 203*b*. Each channel 203*a-b* feeds a row of sealant and adhesive outlet channels 205*a-b*, respectively. In this embodiment, each sealant outlet channel 205*a* is disposed near an edge of the node 1901 and corresponds to one adhesive outlet channel 205*b* arranged next to the sealant outlet channel 205*a*. In an embodiment, the sealant and adhesive outlet channel run along a perimeter of a large node (not shown) with a substantial interior region, with the sealant outlet channel arranged closer to the edge of the large node adjacent another structure to which the node will be bonded and with the adhesive outlet channel being arranged next to the sealant outlet channel and closer to the interior region of the node. In this latter embodiment, the sealant from the sealant outlet channel acts at the edge of the node-structure interface to protect the integrity of the adjacent adhesive bond, to isolate the adhesive bond, and to keep the node 1901 separated from structure 1915.

The sealant outlet channel 205*a* may form an internal tortuous path relative to sealant feed channel 203*a*, as discussed in embodiments above. Similarly, the corresponding adhesive outlet channel 205*b* may form an internal tortuous path relative to adhesive feed channel 203*b*. As described above, the use of these tortuous paths enables a substantially even flow of sealant/adhesive across the relevant sections of node 1901.

The sealant outlet channel 205*a* ends at sealant opening 207*a*. Node 1901 is positioned such that sealant opening 207*a* ends on one side at sealant opening surface 265 and the other side at external tortuous path surface 211. A release gap surface 219 is arranged at the edge of the node 1901 and protrudes closer to the structure surface 213 than the adjacent sealant opening surface 265, which is situated next to sealant opening 207. A blending trough 223 is formed adjacent the sealant opening 207 by the sharp gradient between release gap surface 219 and sealant opening surface 265, by the adjacent tortuous path surface 211 that juts out closer to the structure 1915 than sealant opening surface 265, and by the structure surface 213. A release gap 221 is present in the node-structure interface at the edge of the node 1901. As discussed in embodiments above, the tortuous path surface 211 may be tuned relative to the distance between sealant opening surface 265 and structure surface 213 (and/or the distance between release gap surface 219 and structure surface 213) to achieve the desired amount of inhibition of sealant egress towards the adhesive bond area 225 through tortuous path gap 217.

The adhesive feed channel 203b and associated structures of FIG. 19 are similar to the sealant feed channel 203a. The adhesive feed channel feeds a plurality of adhesive outlet channels 205b, each outlet channel in this embodiment positioned adjacent a corresponding sealant outlet channel 205a and interior to the sealant outlet channel 205a relative to the border of node 1901. An adhesive opening 207b feeds an adhesive bond area 225, which is vertically inset by some amount from the tortuous path surface 211. An amount of inset of tortuous path gap 217 can be tuned relative to the tortuous path surface 211 by a ratio that controls the amount of excess adhesive that enters the tortuous path gap 217. It will be appreciated that the tuning of the adhesive will also be influenced by the amount of adhesive injected in the adhesive injection process, especially in cases where the volume of injected of adhesive substantially exceeds the adhesive bond area. As noted above, the viscosity of a fluid such as the adhesive is also a relevant factor in determining the behavior of the adhesive. In an embodiment, one or more of these factors can be tuned to optimize the placement of adhesive in or near the adhesive bond area 225.

While the structure of node 1901 may become more complex than structures described above due to the addition of one or more separate fluid channels, and the complexity may further increase where these features are provided at additional edges of the node and/or are provided in complex arrays throughout the node, the node 1901 can advantageously be additively manufactured to obtain the requisite levels of complexity while avoiding expensive tooling associated with traditional manufacturing processes.

Figure 20:
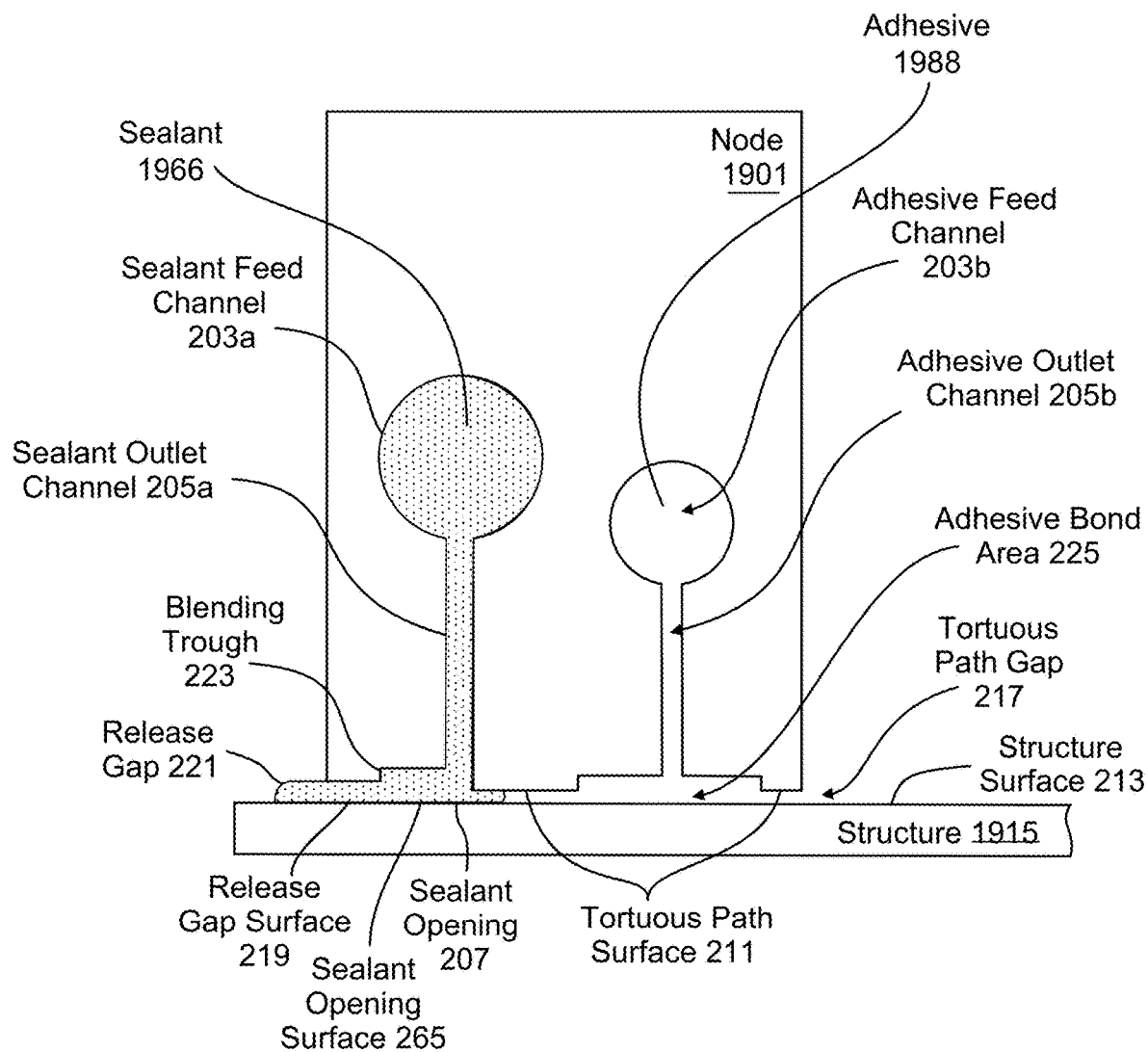
FIG. 20 illustrates a cross-sectional view of the node-structure combination of FIG. 19, after a sealant has been injected into the sealant feed channel and has flown down the sealant outlet channel and into the blending trough, release gap and tortuous path.

In an exemplary embodiment, the sealant is first introduced. Referring to the cross-sectional view of FIG. 20, the sealant 1966 is injected via an injection port into the sealant feed channel 203a and flows into the node-structure interface area (i.e., the blending trough 223, release gap 221 and tortuous path 211) via the sealant outlet channel 205a in a manner described above with reference to previous embodiments. In an embodiment, the sealant 1966 is an agent that cures, i.e., solidifies after time. In other embodiments, the sealant 1966 may require a heat treatment or other procedures to solidify, which may in turn require additional structures within and outside of the node 1901 and structure 1915. These structures are omitted for clarity and to avoid unduly obscuring the concepts in this disclosure.

Figure 21:
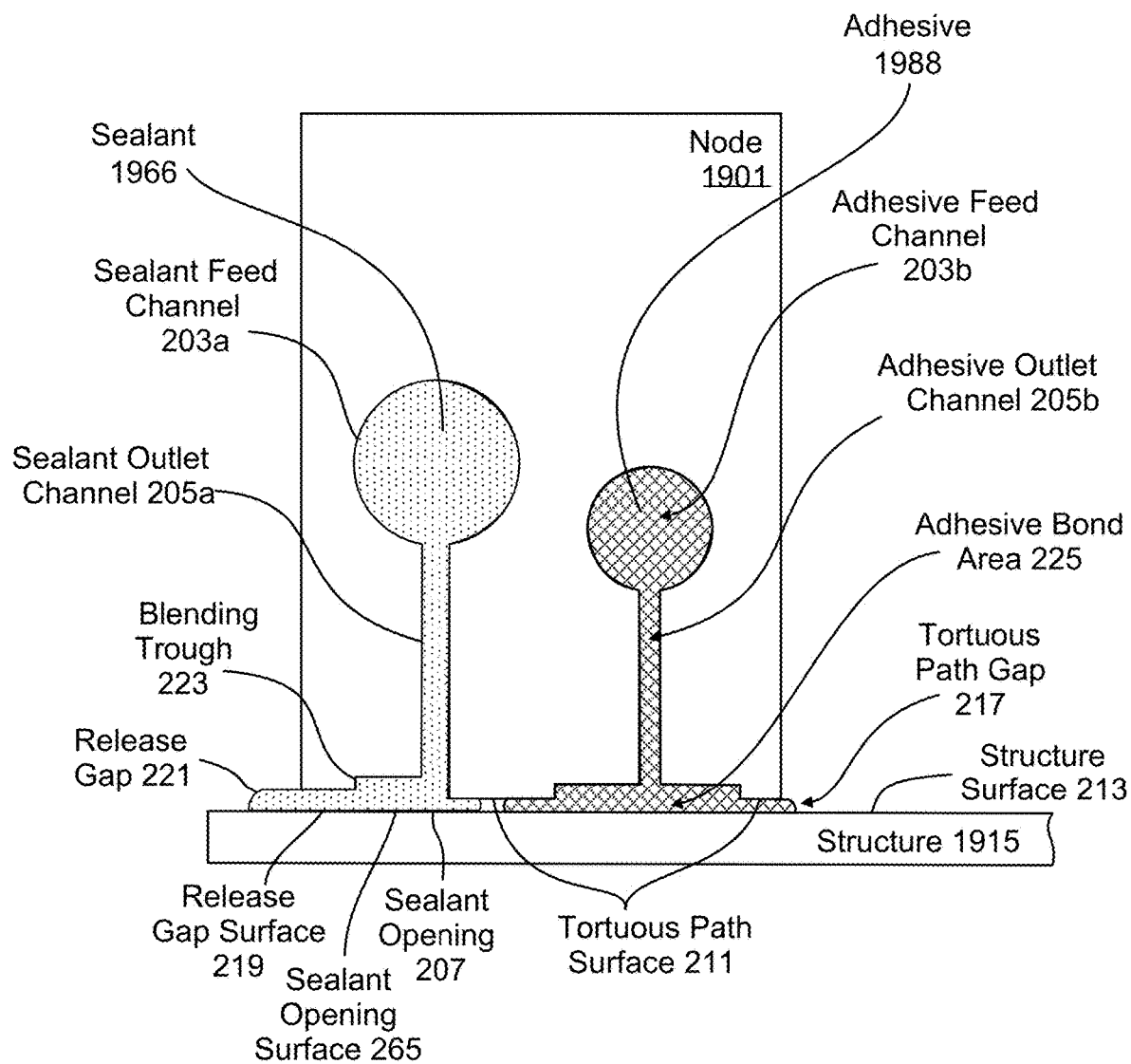
FIG. 21 illustrates a cross-sectional view of the node-structure combination of FIG. 19, at a time after an adhesive has been injected into the adhesive feed channel and has flown down the adhesive outlet channel into the adhesive bond area and tortuous paths.

After the sealant 1966 is applied and is given time to cure into a solid form, adhesive 1988 can then be applied via a separate inlet port to the adhesive feed channel 203b, as shown in more detail in cross-sectional view FIG. 21. The adhesive 1988 (FIG. 21) may flow through the adhesive outlet channel 203b, which may be configured as an internal tortuous path relative to adhesive feed channel 203b and that is appropriately tuned relative to feed channel 203b to ensure a generally even flow of adhesive across the length of the feed channel 203b. The adhesive 1988 may thereafter flow through the adhesive outlet channels 205b to an adhesive bond area 225 into which each of the adhesive outlet channels 205 are fed. (In an alternative embodiment, each adhesive outlet channel is associated with a single adhesive bond area.) The adhesive 1988 may then spread across the adhesive bond area 225 until it fills the rectangular region associated therewith, and spreads slightly into the adjacent tortuous path gaps. In some embodiments, a witness hole and associated channel are used to determine when the adhesive is full. In other embodiments, the node may include a transparent portion to enable a view of the adhesive bond area 225. In still other embodiments, the tortuous path gap may be observed to identify a uniform overflow indicative of completion of the adhesive application process. In yet other embodiments, a fixed amount of adhesive is applied to each part due to considerations of the volume of the adhesive bond area 225, the ratio of the internal and external tortuous gaps, the maximum possible tolerance variations of the additively manufactured features, and the like. In still other embodiments, the adhesive injection is completed when the adhesive exceeds a certain pressure measured, e.g., at the inlet port. The solidified sealant on the left side relative to the drawing can serve as a boundary through which the adhesive cannot penetrate. The solidified adhesive also can serve as a further support to enable the application of adhesive between the node-structure interface in spite of geometrical variations of features of the node or structure due to tolerance fluctuations in manufacturing. In future use, the sealant can also serve to protect the adhesive from contamination and can assist in maintaining separation between the node 1901 and structure 1915 to avoid long term corrosion.

The examples of FIGS. 2-21 may involve a number of different channels and surfaces that define such channels and may lend themselves to a wide variety of applications above and beyond those illustrated. Thus, in other exemplary embodiments, the channels and/or surfaces that create fluid openings and tortuous paths may be implemented in other contexts and use different types of fluids than the ones identified above. There also may be different numbers of channels and types of channels, as well as different shapes of surfaces that may define the channels.

For example, each feed channel 203 in node 201 may include a feed channel surface 261 (FIG. 2), and the related fluid outlet channels 205 to which the feed channel 203 is coupled may include an internal outlet channel surface 293 (FIG. 2). Fluid may then flow from feed channel 203 through outlet channels 205, and then fluid openings 207, into the channels created collectively by the node surface 296 of node 201, and the structure surface 213 of structure 215.

Node surface 296 in FIG. 2 may be partitioned into or otherwise configured to include a plurality of additional surfaces, as more fully shown in FIG. 3. For example, node surface 296 may include fluid opening surface 265, release gap surface 219, and tortuous path surface 211 as more fully shown in the alternative view of the node and structure of FIG. 3. Similarly, although structure surface 213 is shown as a straight line for simplicity, structure surface 213 may also be configured to vary as a plurality of surfaces, in which case the tuning process may take these variances into account.

In an embodiment, tortuous path surface 211 (FIG. 2), together with structure surface 213, are positioned to create tortuous path gap 217. That is, tortuous path gap 217 in this embodiment may have a width that can tuned to some small magnitude relative to the cross-sectional area(s) of the outlet channels 205. Tortuous path surface 211 and structure surface 213 together may create a channel (i.e., tortuous path gap 217) for enabling the limited flow of fluid while restricting rapid and excessive fluid flow as described in more detail in this disclosure. In an embodiment, fluid opening surface 265, release gap surface 219, and structure surface 213 (FIG. 3) create one or more channels for enabling fluid to flow more freely and blend together as illustrated herein (See, e.g., FIG. 13). As noted above, fluid opening surface 265, release gap surface 219, and tortuous path surface 211 of FIG. 3 are all portions of node surface 296 in FIG. 3; however, this need not be the case as other embodiments may have different structures, surfaces and channels for establishing a tortuous path. In addition, the node surfaces described herein may extend well beyond the node-structure interface, as described above. These features are omitted for clarity.

Figure 22:
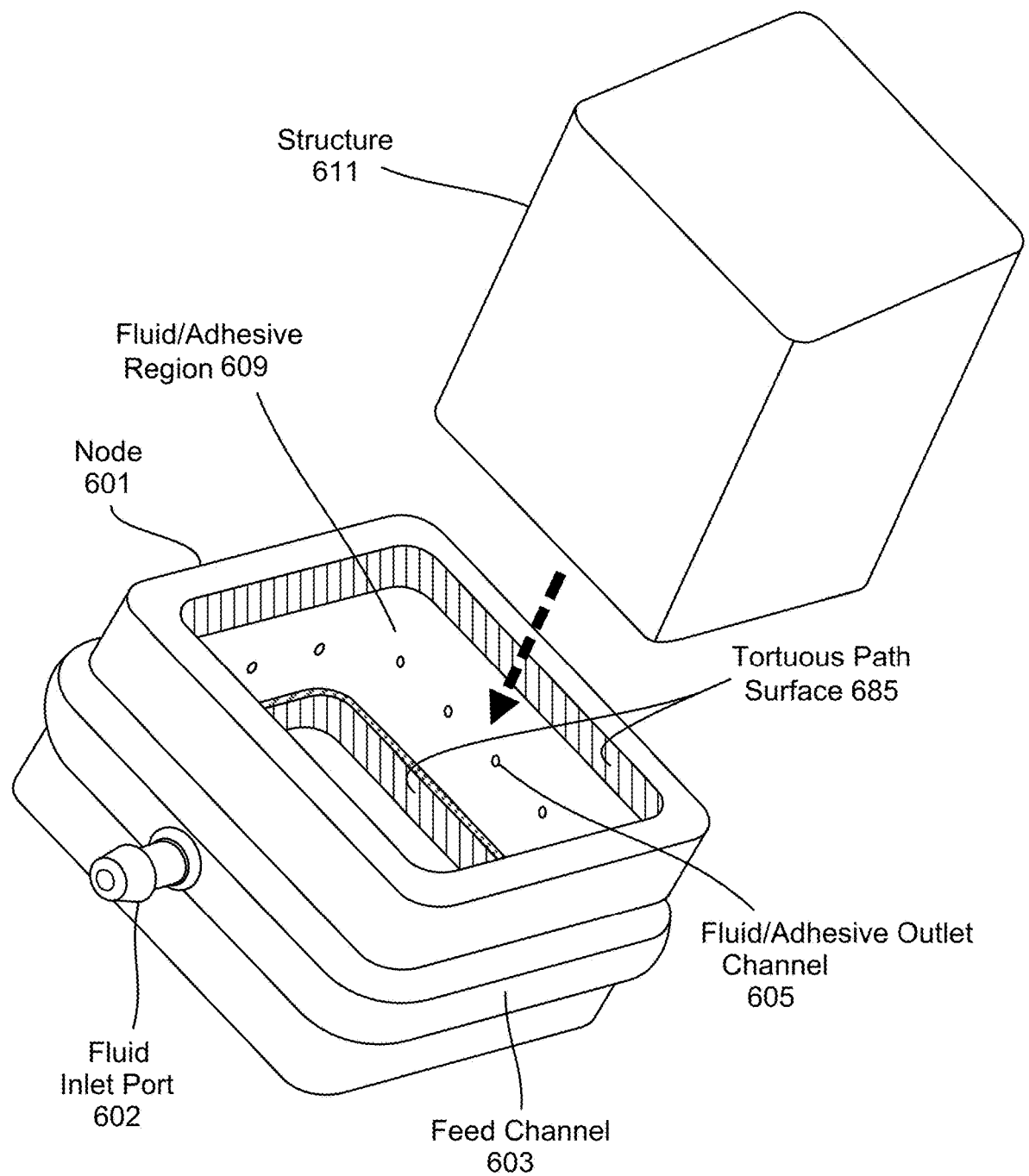
FIG. 22 illustrates a perspective view of an exemplary node with an injectable fluid/adhesive system and a structure being inserted into the node.
Figure 23:
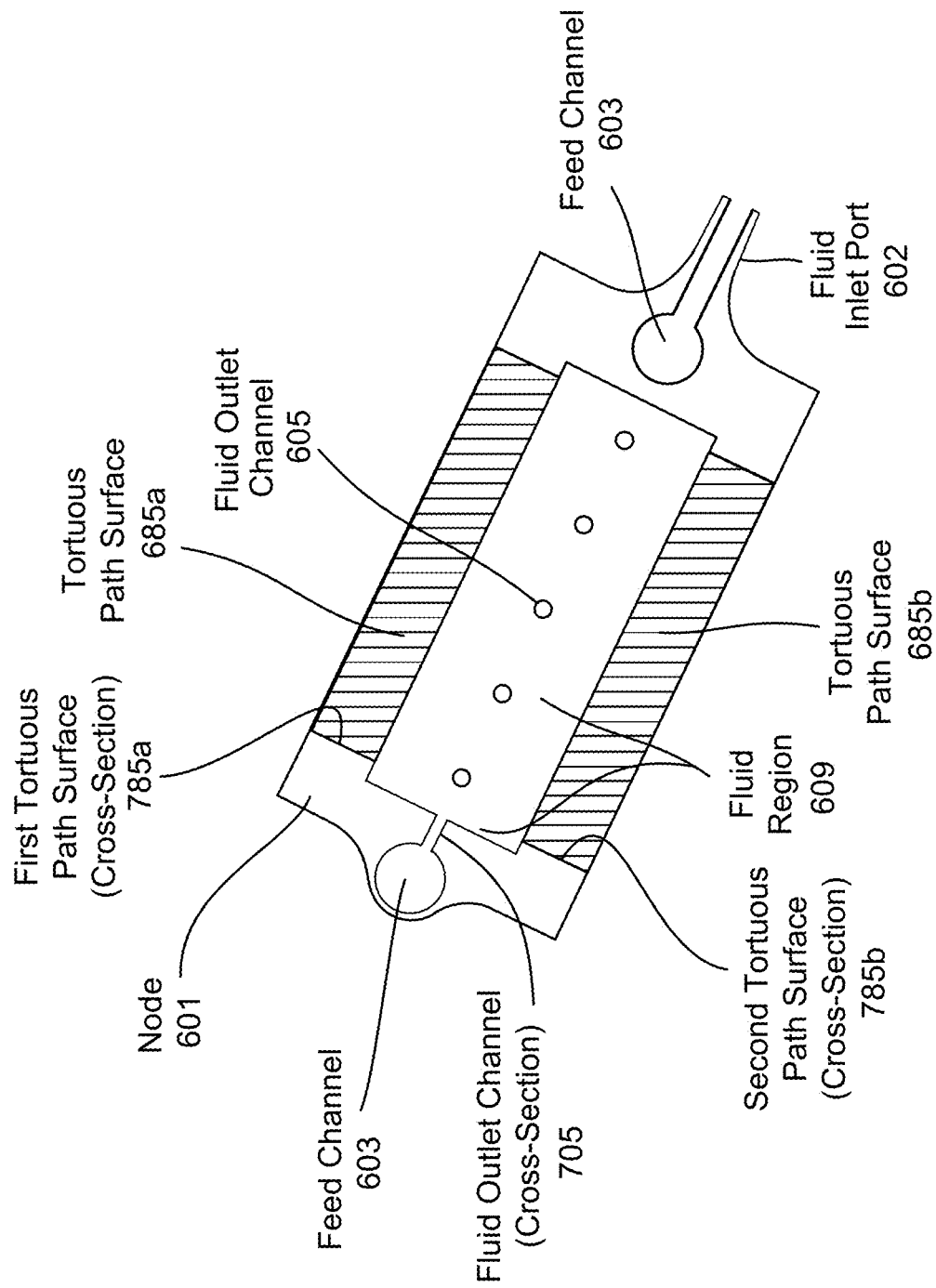
FIG. 23 illustrates a cross-sectional view of the node of FIG. 22 including the structure inserted therein.

FIGS. 22 and 23 illustrate an exemplary node 601 that includes an injectable fluid/adhesive system according to various embodiments. While the examples of FIGS. 22 and 23 can apply to any type of fluid as well as multiple fluid types, an adhesive is used as an example. FIG. 22 illustrates a perspective view of node 601. Node 601 can include a fluid inlet port 602 connected to a feed channel or tube 603, which can each be manufactured as part of the node. Feed channel 603 can be connected to multiple adhesive outlet channels 605, such that the feed channel 603 can channel an adhesive from fluid inlet port 602 to the multiple adhesive outlet channels 605. Adhesive outlet channels 605 can each carry the adhesive from feed tube 603 to a fluid/adhesive region 609, which can be on an interior surface of node 601, for example. Fluid/adhesive region 609 can reside on a side of the node 601 between tortuous path surfaces 685. As discussed in greater detail below, after structure 611 is inserted into node 601 as indicated by the arrow, tortuous path surfaces 685 can be configured to be much closer to a surface of structure 611 than fluid/adhesive region 609. This way, fluid can be substantially contained in fluid/adhesive region 609 without the node 601 and structure 611 making physical contact once the fluid injection process has begun.

The structure 611, for example an extrusion, can be inserted into node 601 as illustrated in FIG. 22, such that the structure is adjacent adhesive region 609. Once structure 611 has been inserted into node 601, an adhesive can be injected into adhesive inlet port 602. The adhesive can flow through feed channel 603 and adhesive outlet channels 605 to adhesive region 609. Feed channel 603 and adhesive outlet channels 605 can be configured such that the injected adhesive reaches the openings of the multiple adhesive outlet channels 605 to fluid/adhesive region 609 (e.g., adhesive bond region) at approximately the same time. In this way, for example, the adhesive can be applied more evenly at fluid region 609, which may, among other benefits, reduce or eliminate the need to include seals and/or sealants to contain the flowing adhesive in the fluid/adhesive region 609.

FIG. 23 is a cross-sectional view of node 601 to more clearly illustrate the configuration of fluid inlet port 602, feed tube 603, fluid outlet channels 605, and fluid (adhesive) region 609. In various embodiments, the feed tube 603 can have a greater cross-sectional flow area in comparison to the fluid outlet channels 605 to maintain even distribution at the outlets. In various embodiments, the flow areas of the feed tube 603 and the fluid outlet channels 605 can be circular; however any geometry can be possible. In various embodiments, the ratio of feed tube flow area to fluid outlet channel flow area can be 7:1. In various embodiments, node 601 can include an adhesive outlet port (not shown) on an opposite side of fluid inlet port 602, which can be configured to be connected to a vacuum source to draw negative pressure in the internal channel network of the node 601 for subsequent adhesive injection. In other embodiments, the vacuum source can be connected to the fluid inlet port 602, after which an adhesive is applied via the fluid inlet port 602. The spacing of the adhesive outlet channels 605 can ensure an even spread of the adhesive between the node and the structure that is to be adhered to the node. A cross sectional view of one of the fluid outlet channels 705 can be seen towards the upper left of the drawing, adjacent the feed channel 603 on the left, the latter of which is circular in the perspective drawing.

While the embodiments illustrated above demonstrate the connection between two flat components, this may be extended to connections with virtually any geometry. Once the injectable sealant has cured (where used), adhesive may be introduced into the adhesive bond area using techniques described herein—some example processes include drawing a vacuum and injecting a liquid adhesive, and then allowing the assembly to cure.

Referring back to FIG. 23, the first tortuous path (cross section) edge 785a is shown. This edge corresponds to a side of the node 601 orthogonal to the plane of the drawing. The first tortuous path (cross section) 785a is slightly off-plane relative to the second tortuous path (cross section) edge 785b. Stated differently, the tortuous path surface 685a has a slightly different length than the tortuous path surface 685b. This difference can be seen better in FIG. 24, which is another cross-sectional view of the node 601 with a structure 801 inserted therein. An edge 805a of the structure 801 provides a frame of reference for comparing the relative positions of the first tortuous path (cross section) 785a and the second tortuous path (cross section) 785b. As is evident from the edge 801a of structure 801, there is a small difference in position between the first tortuous path cross-section surface 785a and the second tortuous path cross-section surface 785b. In the example shown, this geometrical difference may result from various issues. One reason that may cause the difference is that there is a tolerance variation associated with the alignment of structure 801 into node 601. Even with sophisticated positioning equipment holding structure 801 in place during the fluid injection process, the alignment may not be 100% accurate. Instead, node 801 may be slightly crooked, which may account for different distances between the two surfaces. The equipment use to position the structure 801 may specify a manufacturing tolerance which describes average or maximum positional variations. This information can be used by the designer in the current embodiment when designing the relevant ratio values for the tortuous gaps.

The difference in the positions of the tortuous path may also result, such as in this embodiment, from manufacturing variations inherent in the node 601. For example, the surfaces of the node may be 3-D printed by a device that has within a specified tolerance particular to the device (e.g., the manufacturer's specified tolerances for a PBF printer, etc.). In an embodiment, manufacturing differences are taken into account when a ratio of a cross-sectional area of the fluid channels 605, 705 to a cross-sectional area of feed channel 603 is tuned. In this embodiment, the manufacturing differences taken into account are those tolerances specific to the structures being manufactured. In another embodiment, manufacturing tolerances are also taken into account when determining a nominal ratio of a tortuous gap between the node 601 and structure 801 on one hand, and a distance in a fluid region 609 abutting the tortuous path surface (e.g., 685b) between the surface of the fluid region 609 (FIG. 23) and structure 801, on the other hand.

Figure 24:
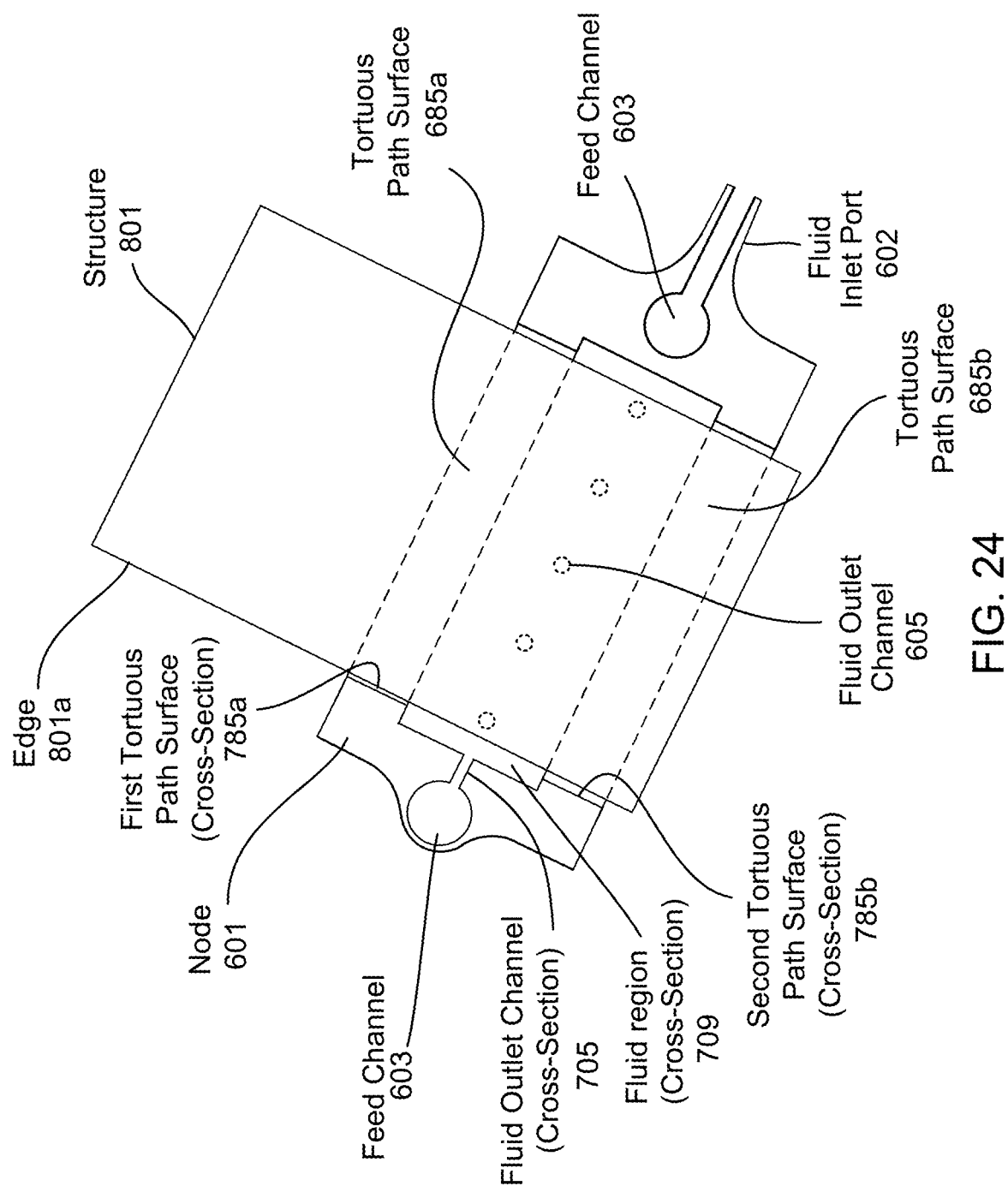
FIG. 24 illustrates another cross-sectional view of the node of FIG. 22 including the structure inserted therein.

By way of example, a nominal gap between the tortuous path surface 685a,b and a surface of the structure 801 may be used to tune the ratio of the expected tortuous path gap to the gap in the adjacent fluid region 609. The ratio can be chosen such that, even where manufacturing tolerances result in geometrical variations between the actual and expected tortuous path gaps versus other similar tortuous path gaps (as in FIGS. 23 and 24) or versus the actual and expected gaps in an adjacent fluid region, or geometrical variations between the actual and expected cross-sectional areas of feed and fluid outlet channels, a generally even flow of adhesive or other fluid can still be assured because the magnitudes of those expected variations can be predicted in advance based on an analysis of the tolerance variations of any given manufacturing process. This includes, for example, tolerance variations in various additive manufacturing processes that may be used to construct the node 601 or the structure 801. In the example of FIG. 24, the second tortuous cross-sectional path surface 785*b* has a slightly wider tortuous path gap relative to edge 801*a* of node 801 than the tortuous gap defined by the first tortuous cross-sectional path surface 785*a*. This means that, all else being equal, more fluid from the cross-sectional fluid region 709 will breach the tortuous gap defined by surface 785*b* than the gap defined by surface 785*a*. However, in an embodiment, the calculated ratio takes these variations into account, and ensures that the node is structured such that the widest manufacturing variations will be within acceptable limits. In an embodiment, a processing system may be used with appropriate programming to take these factors into account when designing the structures.

Figure 25:
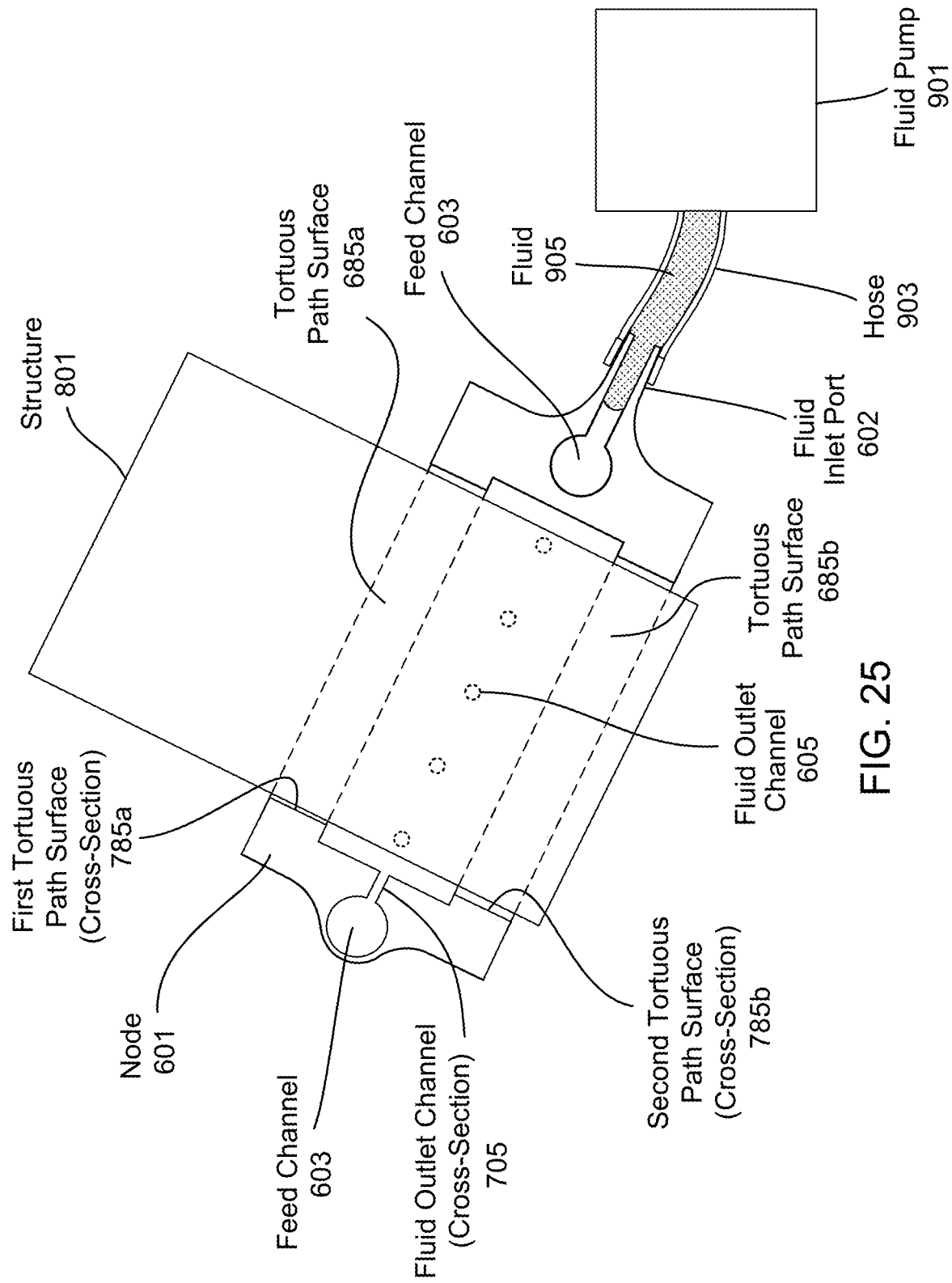
FIG. 25 illustrates a cross sectional view of the node of FIG. 22, including the structure inserted therein, while fluid is injected from a feed pump.
Figure 26:
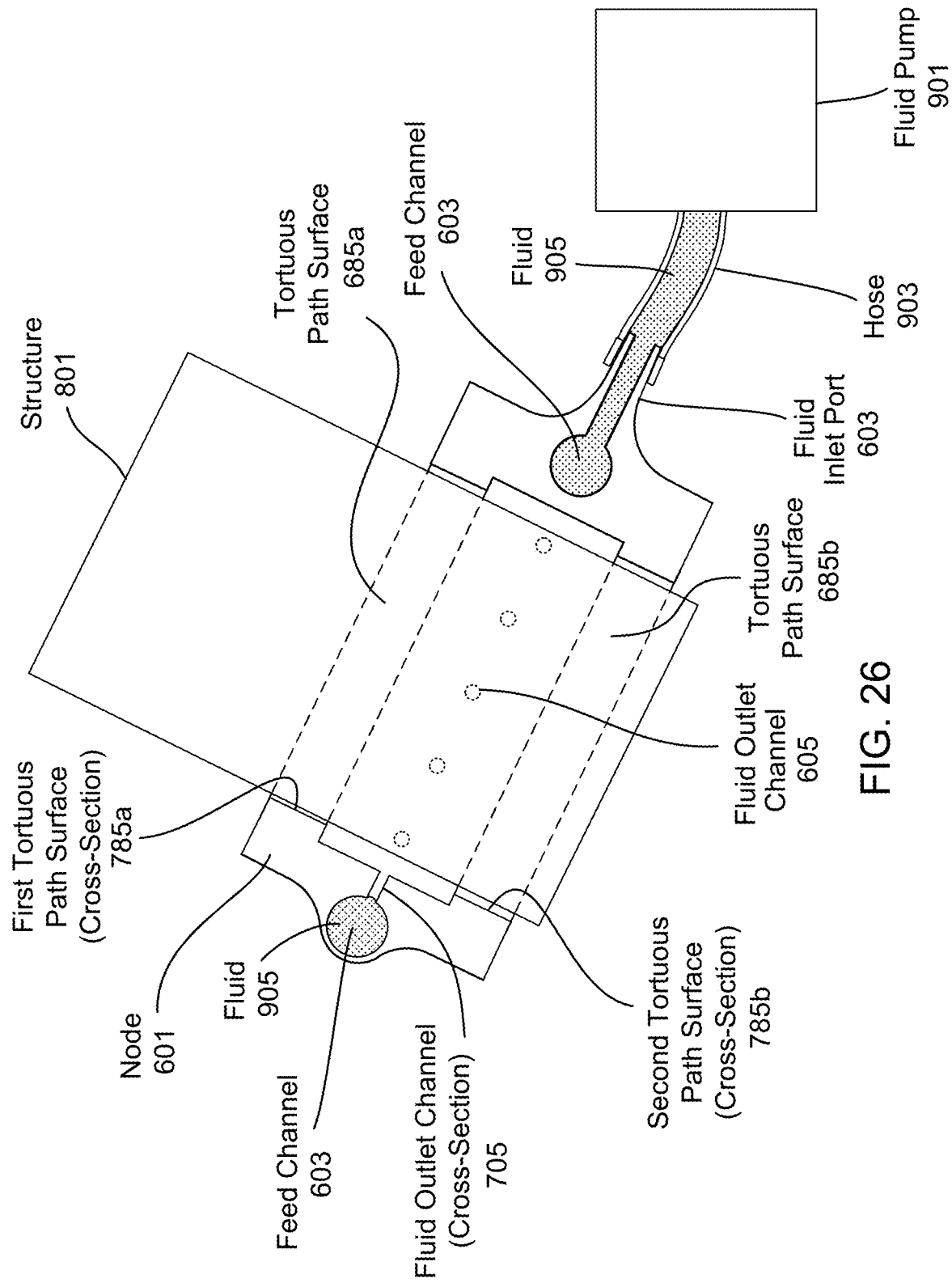
FIG. 26 illustrates a cross-sectional view of the node of FIG. 22, including the structure inserted therein, at a time when the injected fluid flows through the feed channel.

FIG. 25 illustrates a cross sectional view of the node 601 including structure 801 inserted therein, while fluid 905 is injected from a fluid pump 901 and travels via a hose 903 and the fluid inlet port 602 towards feed channel 603. In an embodiment, the fluid is an adhesive. The fluid pump 901 provides the adhesive via hose 903 to fluid inlet port 602. FIG. 26 is a cross-sectional view of the node 601 at a time when the injected adhesive has reached the feed channel 603 and has circulated around a perimeter of the node 601 to fill the feed channel 603. In some embodiments, the feed channel 603 may extend around the entire periphery of the node and reconnect at the initial entry point near the fluid inlet port 602. In other embodiments, the feed channel 603 will only extend a portion of the way, or one-half or three-quarters of the way, or some other value depending on the extent to which fluid coverage across the structure is desired for that channel. In the embodiment shown, the feed channel 603 extends around the periphery of the node 601 in order to ensure coverage of adhesive in all four adhesive bond areas defined in this example by the four respective edges of the rectangular structure 801 and the four corresponding fluid regions (e.g., 609 (FIG. 23), 709 (FIG. 24), 809 (FIG. 27)) of node 601. Once the feed channel 603 is full, pressure will begin to build and the adhesive may enter the fluid outlet channels (e.g., 605, 705).

Figure 27:
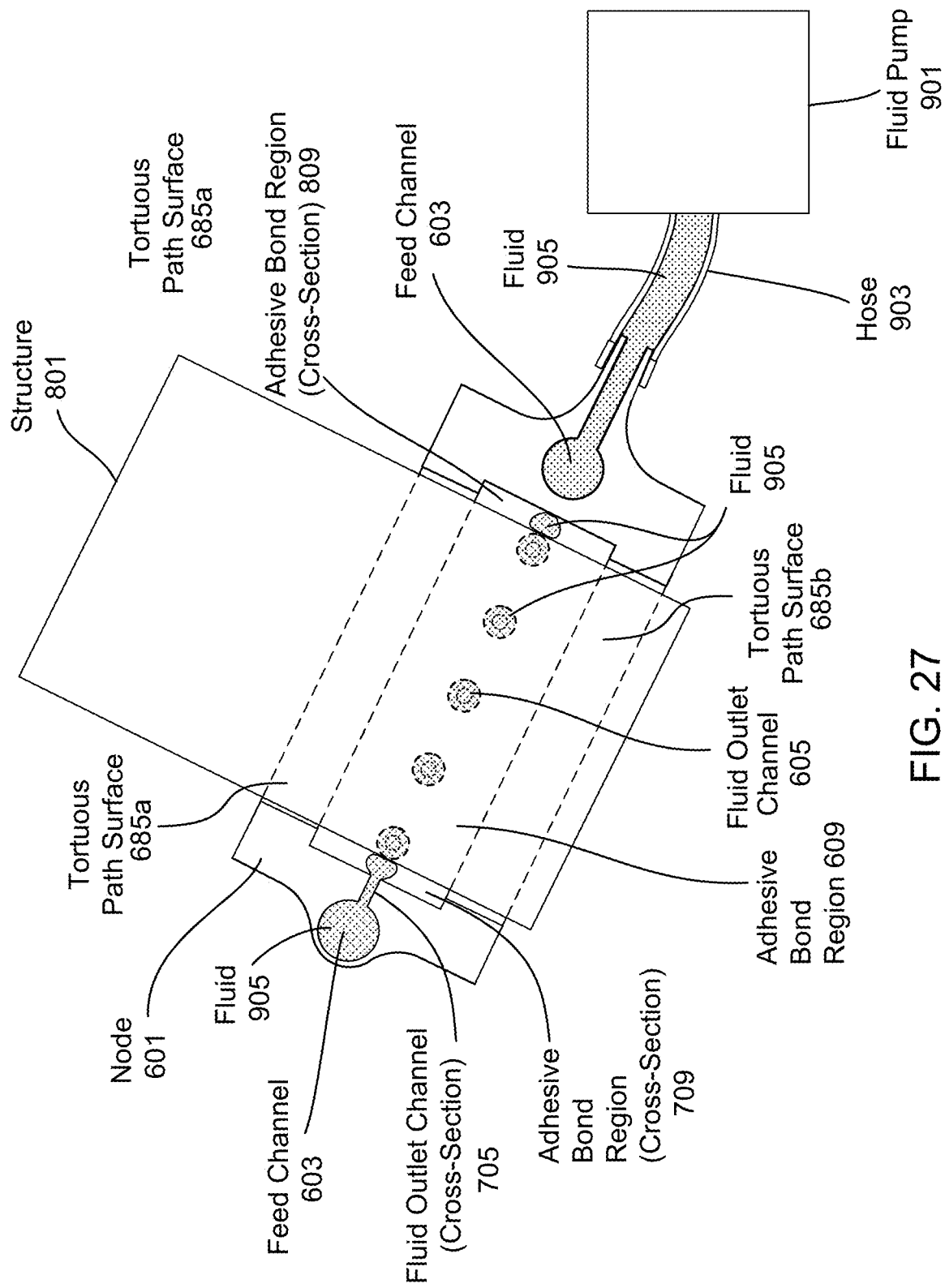
FIG. 27 illustrates a cross-sectional view of the node of FIG. 22, including the structure inserted therein, at a time when the fluid flows through an end of the fluid outlet channels.

FIG. 27 is a cross-sectional view of the node 601 including structure 801 inserted therein, at a time when the fluid 905 flows through an end of the fluid outlet channels 605 and into the adhesive bond regions (609, 709, 809). For example, the flow can be seen in the fluid outlet channel (cross section) 705 seeping into the adhesive bond region (cross section) 709, the latter being the portion of the adhesive bonding region orthogonal to the drawing and corresponding to the upper left surface of the structure 801. A similar flow of adhesive can be seen entering adhesive bond region (cross-section) 809 corresponding to the lower right surface of the structure. Additionally, the circular dashed lines around fluid outlet channels 607 correspond to adhesive beginning to flow into the adhesive bond area 609 closest the viewer and in the plane of the drawing. It will be noted that a fourth adhesive bond area corresponding to the fourth edge facing an opposite side of structure 801 is obscured from view but functions in the same manner.

Figure 28:
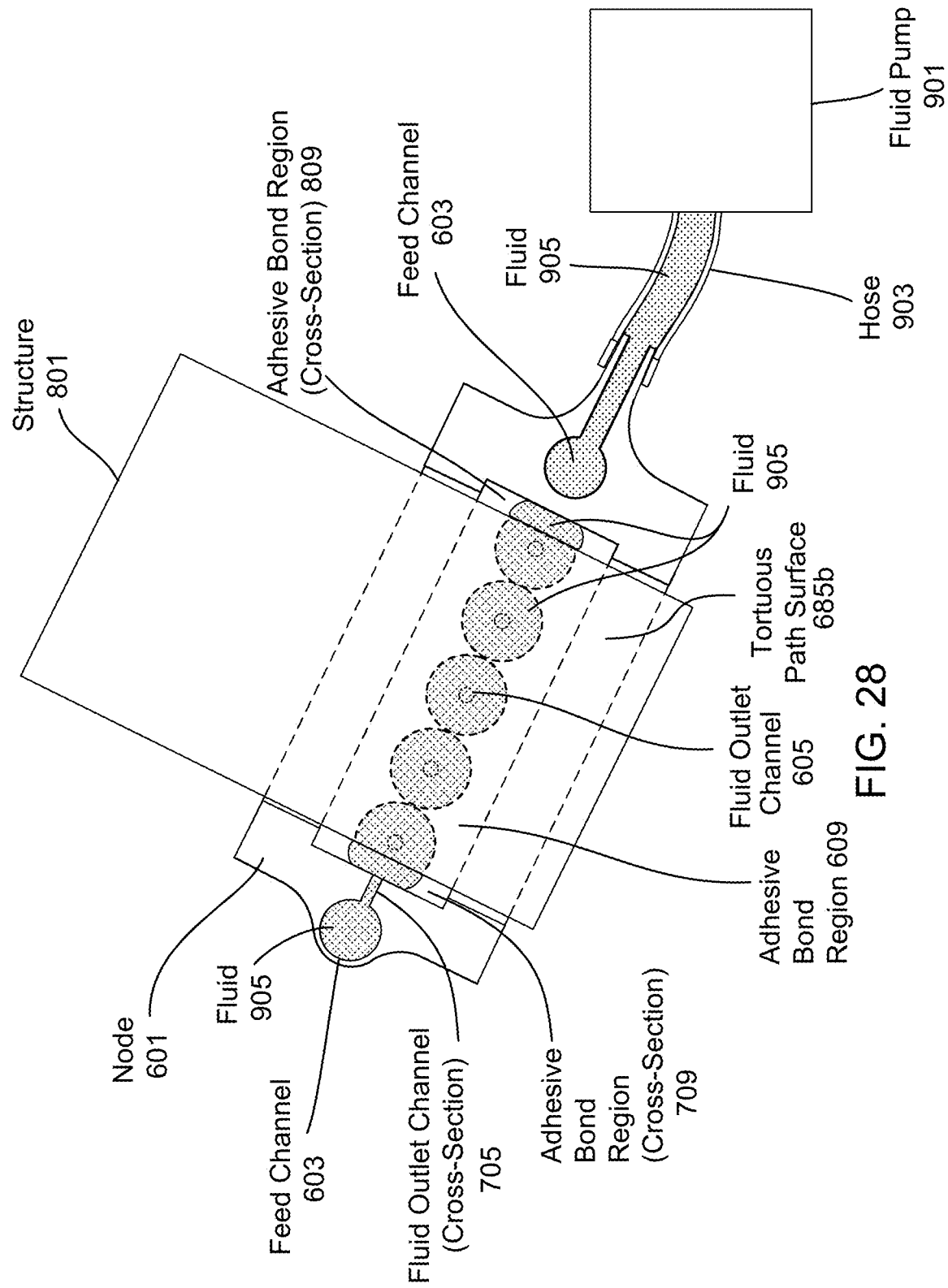
FIG. 28 illustrates a cross sectional view of the node of FIG. 22, including the structure inserted therein, at a time when the fluid begins to amalgamate in the fluid region between the node and structure surfaces.

FIG. 28 is a cross sectional view of the node 601 including structure 801 inserted therein, at a time when the fluid begins to amalgamate in the fluid region between the node and structure surfaces. Similar to the above embodiments, the flow in the adhesive bond region 609 is generally even as the circular pools of fluid being ejected from the adhesive/fluid outlet channels are similar in size and shape. Likewise, the ejected adhesive present in adhesive bond regions 709 and 809 are approximately the same size to indicate a uniform dispersion of the adhesive.

Figure 29:
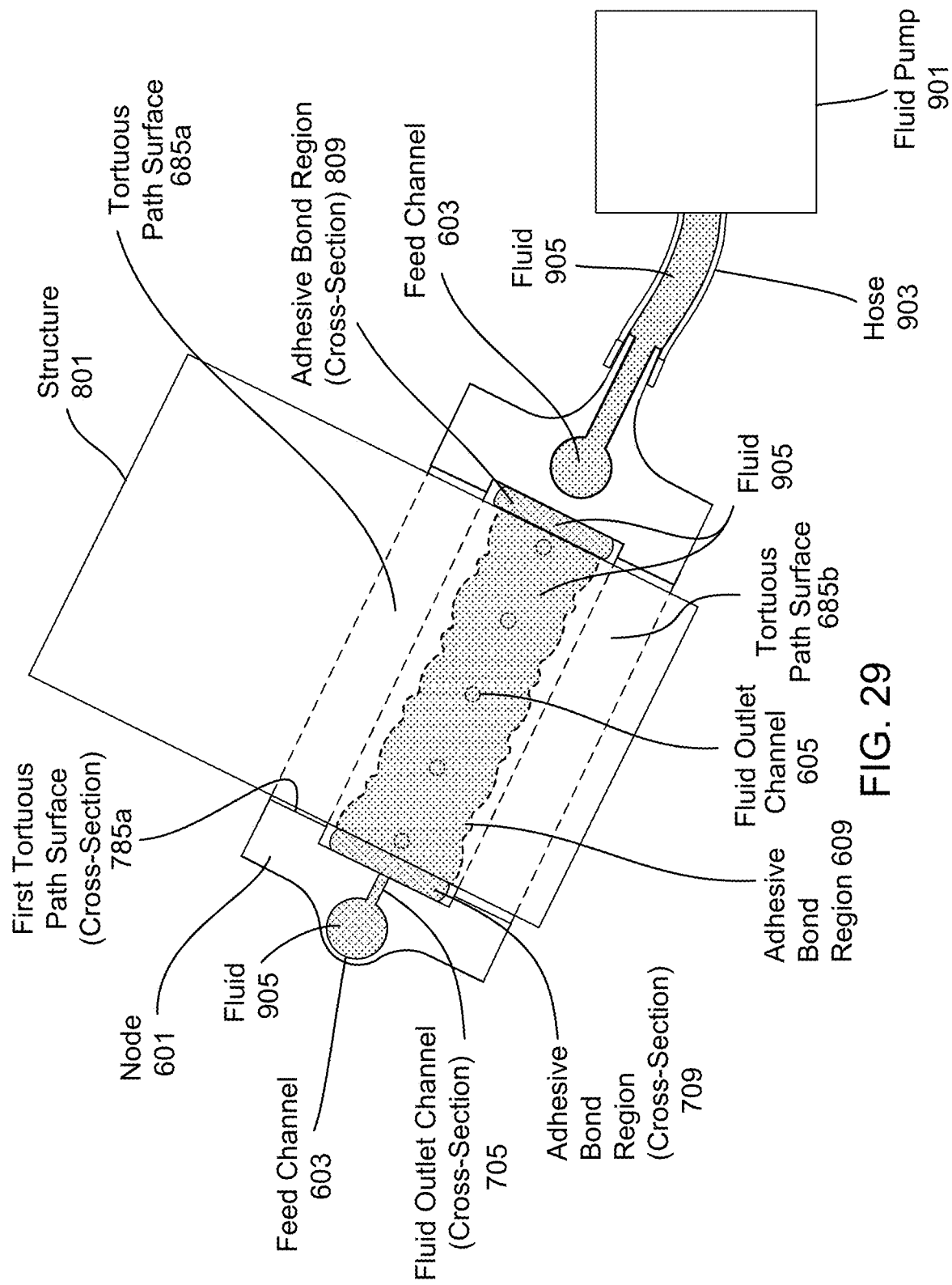
FIG. 29 illustrates a cross-sectional view of the node of FIG. 22, including the structure inserted therein, at a time when the injected fluid has amalgamated in the fluid region and is spreading outward along the node wall.

FIG. 29 is a cross-sectional view of the node of FIG. 22, including the structure 801 inserted therein, at a time when the injected adhesive has amalgamated in the fluid region and is spreading outward along the node wall. As is evident from the illustration, the adhesive is continuing to spread across adhesive bond regions 609, 709 and 809 in a generally uniform manner.

Figure 30:
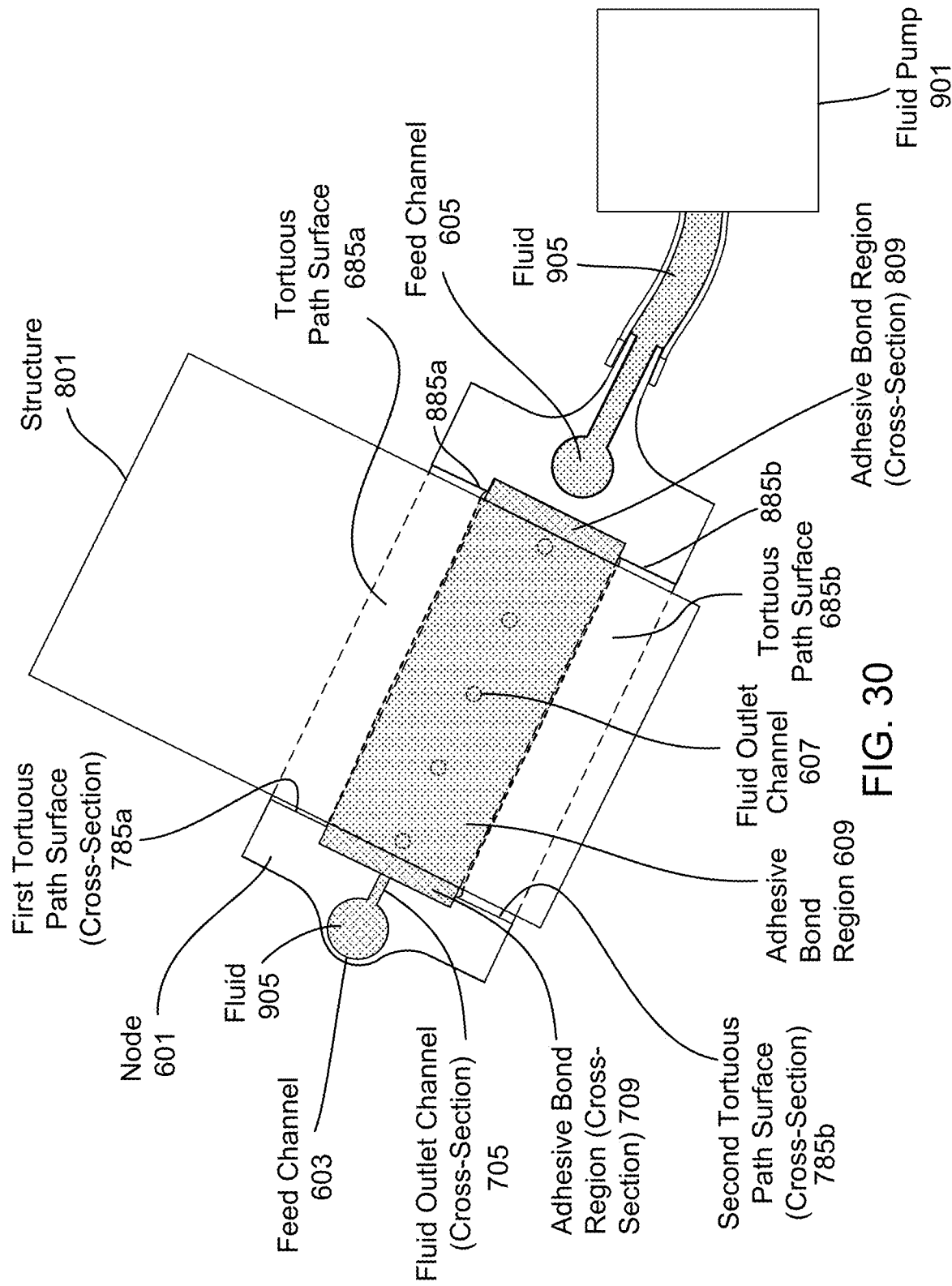
FIG. 30 illustrates a cross-sectional view of the node of FIG. 22, including the structure inserted therein, at a time when the spreading fluid reaches the border area between the fluid region and tortuous path region.

FIG. 30 is a cross-sectional view of the node of FIG. 22, including the structure 801 inserted therein, at a time when the spreading fluid reaches the border area between the adhesive bond regions 609, 709, 809 (and the unseen fourth region) on one hand, and the respective tortuous path region on the other hand. The flow of fluid from outlet channels 605 and 705 is generally uniform, as noted. The gap between the node 601 and structure 801 that defines adhesive bond regions 609, 709 and 809, etc. can be tuned to be much larger than the corresponding tortuous path gaps defined by the distance between each of surfaces 685*a-b*, 785*a-b*, and 885*a-b* from the corresponding edge of the structure 801. For these reasons, it is expected that the adhesive will fill the rectangular adhesive bond regions 609, 709, 809, and the fourth region on each of the four sides of the node-structure interface before making any substantial ingress into the much smaller tortuous path gaps defined by surfaces 685*a-b*, 785*a-b*, and 885*a-b* and the fourth unseen surface. In this embodiment, as the ratio of the adhesive bond region gap (i.e., the distances between node 601 and structure 801 on each of the four adhesive bond regions adjacent the tortuous gaps) to the tortuous gaps (as defined above) increases, the more pressure that will be required for adhesive flow into the tortuous gaps. Accordingly, the fluid 905 may tend to stay approximately within the rectangular border. It should be noted that while this embodiment uses uniformly rectangular/cubic adhesive bond areas and linear tortuous path gaps for clarity, other more complex embodiments may use shapes and sizes of fluid areas and tortuous gaps that are uneven, curved, or arbitrarily shaped. The principles of the disclosure are equally applicable to such configurations. While the tuning calculations for optimal fluid fills may be more intricate with correspondingly complex geometries, sophisticated commercially-available processing systems running CAD software or other specialized applications are generally well-suited for use in producing optimal ratios for these complex cases.

Figure 31:
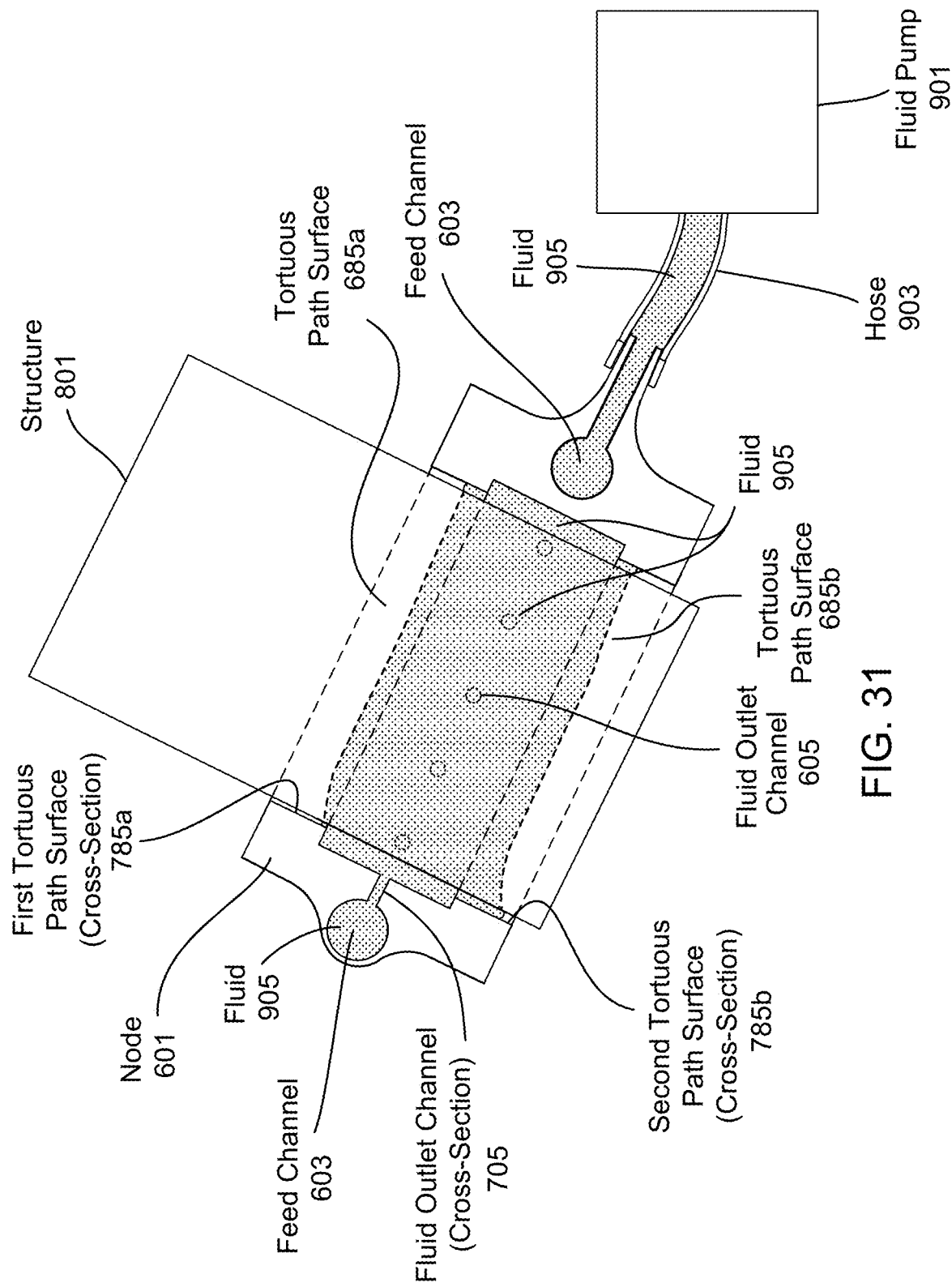
FIG. 31 illustrates a cross-sectional view of the node of FIG. 22, including the structure inserted therein, at a time when the spreading fluid has entered into the tortuous path region.

FIG. 31 is a cross-sectional view of the node of FIG. 22, including the structure 801 inserted therein, at a time when adhesive injection has completed. In a manner similar to earlier embodiments, the pressure from the flow has caused the adhesive to bleed into portions of the tortuous path gaps. These include, for example, the gaps defined by the distances between tortuous path surfaces 685*a-b* and the corresponding surfaces of structure 801, 785*a-b* and the corresponding surfaces of structure 801, and 885*a-b* and the corresponding surfaces of structure 801 (FIG. 30). The excess adhesive may be a result of tolerance variations or adhesive flow that was maintained for longer than necessary. However, in some embodiments, the excess adhesive may be used to ensure a strong fit and to assist in ensuring that contaminants cannot enter into the interior of the node-structure interface.

The illustration in FIG. 31 shows that, because the tolerance variations in this embodiment (e.g., slightly offset inner node surfaces) produces a tortuous gap at surface 785*b* that is larger than the tortuous gap at 785*a*, the adhesive encroaches further into the tortuous gap at surface 785*b* than it does at surface 785*a*. As the illustration shows, the bleeding at the gap defined by surface 785*b* reaches near the edge of the node. By contrast, the bleeding at the gap defined by surface 785*a* is minimal. This bleeding with reference to surface 785*b* may represent, for example, that the manufacturing deviance has reached a maximum value of its tolerance variation based on the specifications conveyed for the manufacturing process at issue. Regardless, the tuning of the ratio of bond region width to tortuous gap was such that the encroachment still remained within, and did not seep out of, the newly bonded structure at edge 785*b*. This illustration emphasizes the potential importance of taking manufacturing tolerance variations into consideration with respect to certain embodiments.

While the above embodiments used an adhesive as an example, it should be understood that the above processes may apply equally to other fluids, and other combinations of fluids. For example, in one embodiment of FIGS. 22-31, a sealant is first introduced in the fluid channel, after which an adhesive is introduced in the same channel. The process may be designed such that when the flow is complete, the sealant resides principally in the tortuous path regions and the adhesive in the adhesive bond region. The manufacturer in this embodiment can use fluids with different viscosities to tune the process to achieve virtually any desired result. In another embodiment, separate adhesive and sealant channels are used, wherein the sealant is first introduced in the sealant channel to form a border around the different adhesive bond areas, and after curing of the sealant, the adhesive can then be introduced to fill the adhesive channels securely within a perimeter define by the cured adhesive. Once these structures are completed, they can be further assembled into vehicles and other transport structures.

Figure 32:
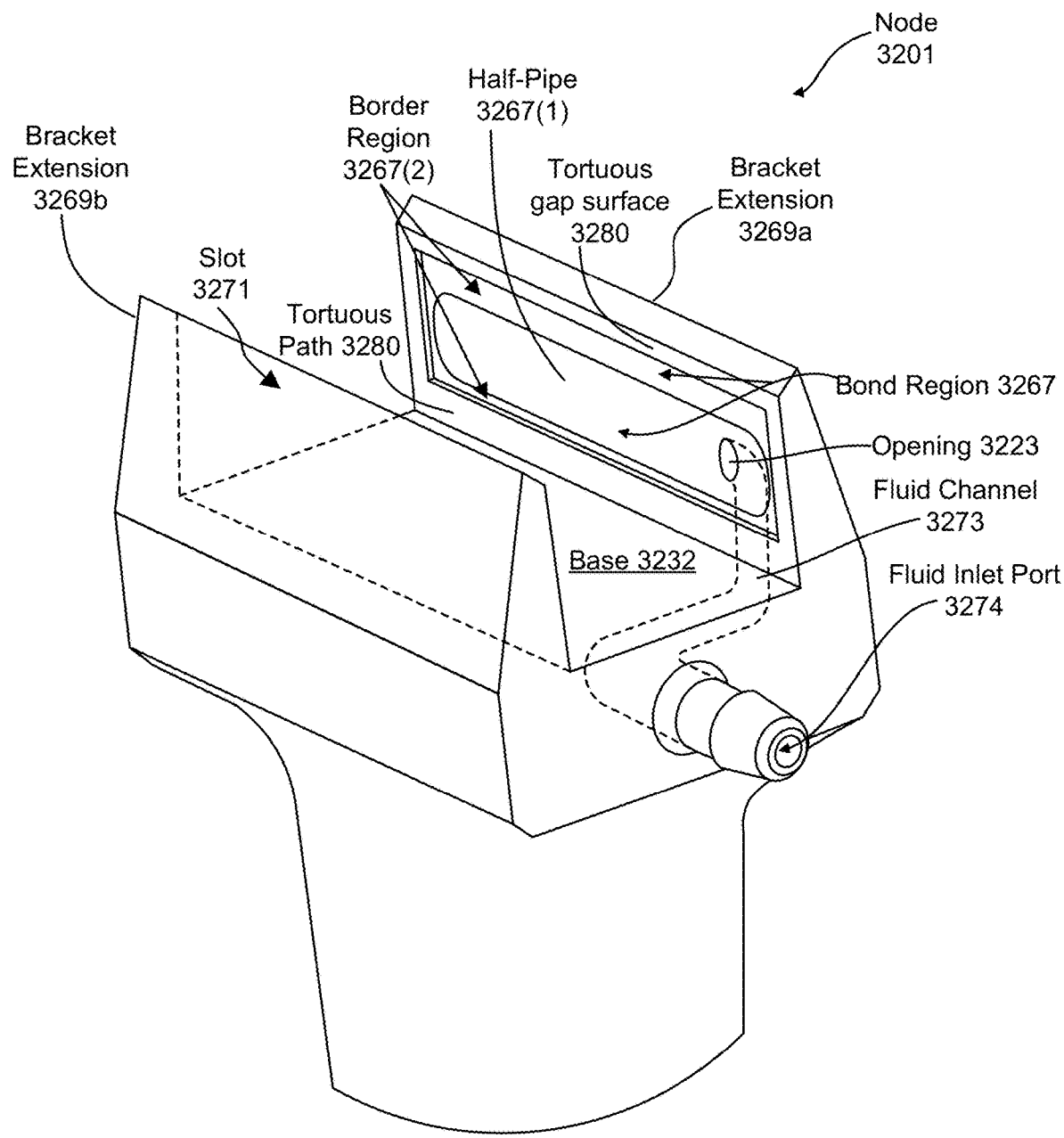
FIG. 32 illustrates a perspective view of a node having an injection inlet port and opposing bracket extensions.

Alternative embodiments may use injection ports and brackets for mounting or otherwise engaging external structures. FIG. 32 is a perspective view of a node 3201 having an injection inlet port 3274 and opposing bracket extensions 3269*a-b*. A slot 3271 is available between the bracket extensions 3269*a-b* for receiving a structure such as an extrusion, panel, another node, etc. While the shape of the base 3232 and the bracket extensions 3269*a-b* may be used to accommodate a structure with flat surfaces, in other embodiments, the base 3232 and bracket extensions 3269*a-b* may alternatively be curved or otherwise may take on a shape configured to receive a more complex geometrical structure. A rectangular structure is illustrated in this example (see FIG. 33) for clarity.

In FIG. 32, the fluid inlet injection port 3274 is coupled to a fluid channel 3273 for delivering fluid to the relevant regions of the bracket extension 3269*b*. A similar mechanism can be used for delivering fluid to the relevant regions of bracket extension 3269*a*. In an exemplary embodiment, fluid channel may split into two channels, one of which is configured to deliver fluid to regions in bracket extension 2369*a*. In another exemplary embodiment, a separate fluid inlet injection port may be associated with fluid delivery to bracket extension 3269*a*. For convenience and to avoid unduly obscuring the disclosure, only the fluid path relative to bracket extension 3269*a* is shown in detail.

The fluid channel 3273 may be routed through the node 3201 underneath base 3232 and extend up into bracket extension 3269, where it provides fluid via opening 3223 into adhesive bond area 3267. As noted at length above, the fluid need not necessarily be an adhesive (or exclusively an adhesive) and may include other types of fluids. For purposes of this example it is assumed that the fluid is an adhesive. In other embodiments, sealant may initially be provided to desired portions of the bracket extension 3269*a-b* prior to the adhesive injection. In another embodiment (not shown), the sealants are premanufactured O-rings or similar structures that are inserted manually or by an automated mechanism into the node 3201 prior to adhesive application. In yet another embodiment, such as where slot 3271 is operable to receive a moving part that may movably engage with slot 3271, the fluid may include a lubricant to facilitate movement of the part within slot 3271.

Figure 34:
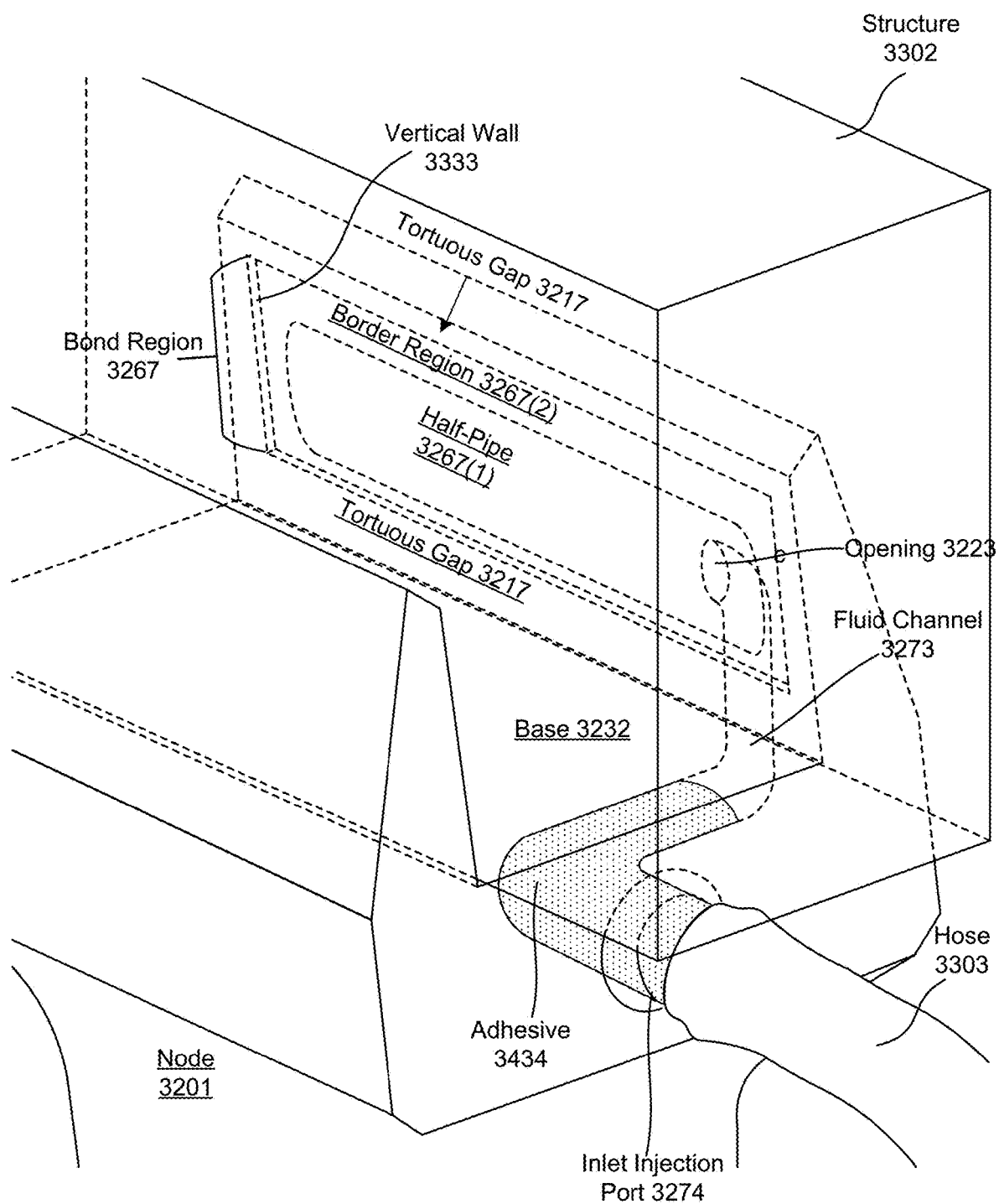
FIG. 34 illustrates a closer perspective view of the node of FIG. 32 having a structure inserted therein and a hose applying a fluid at the inlet injection port.

The adhesive bond area is defined by the rectangular inset generally referenced by the bracket 3267 (see FIG. 34). The inset includes a flat rectangular-bounded border region 3267(2) which is inset relative to a surface 3280 of the bracket extension 3269*a*. The inset further includes a half-pipe 3267(1) which is inset further into the bracket extension 3269*a* using a curved geometry, as shown in the cross-sectional view of FIGS. 36-40.

The surface 3280 of the bracket extension 3269*a* into which the adhesive bond region 3267 is inset also acts in an embodiment as a tortuous path surface 3280, because surface 3280 defines a tortuous gap 3217 (see FIG. 33 et al.) with a surface of another structure when the structure is introduced into slot 3271. Tortuous gap surface 3280 is another rectangular region defining the border of this face of bracket extension 3269*a*. As with other embodiments, tortuous path 3280 protrudes farther out from the face of extension 3269*b* towards the slot region 3271. The adhesive bond region 3267 is then inset via border 3267(2) into extension 3269*b* deeper than tortuous path 3280 (i.e., farther away from slot area 3271). The adhesive bond region further includes half-pipe 3267(2) which is a curved region bounded by border 3267(2) and is inset still deeper into bracket extension 3269*b*, as shown more easily in FIG. 36 et al. In an embodiment, the inner face of bracket extension 3269*a* has a similar structural configuration.

Figure 33:
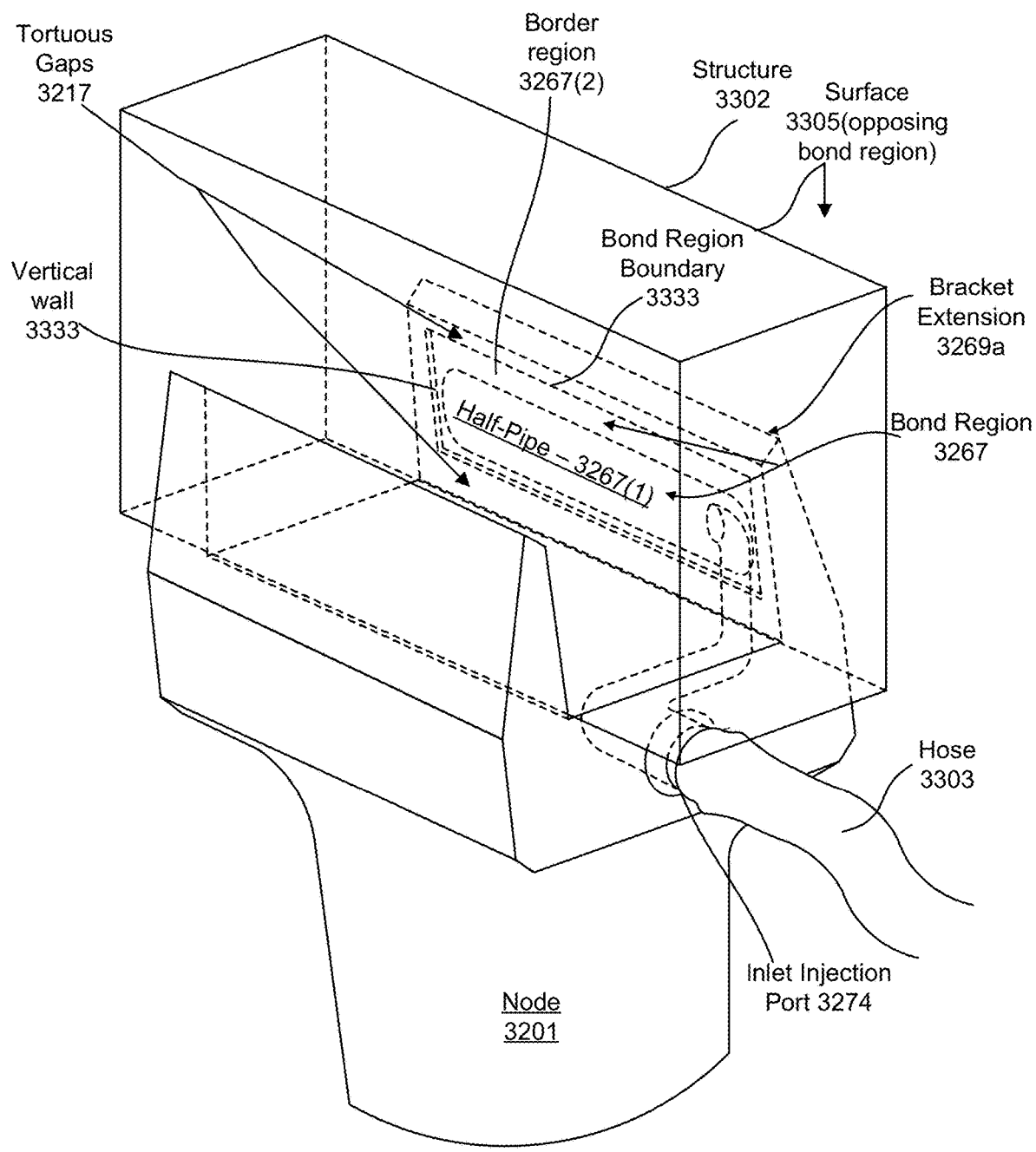
FIG. 33 illustrates a perspective view of the node of FIG. 32 having a structure inserted therein and a hose applied to the inlet injection port.

FIG. 33 is a perspective view of the node 3201 having a structure 3302 inserted into the slot region 3271 of node 3201 and a hose 3303 applied to the inlet injection port 3274. It is assumed in this example that an adhesive is being applied, although as discussed above, in other embodiments a sealant can first be applied to secure the integrity of the adhesive connection, whether through a different inlet network (not shown) or the same network, and whether through the insertion of pre-processed sealant materials (e.g., O-rings) or through the use of a fluid that is subsequently cured as described herein. Adhesive bond region 3267 is defined by the border region 3267(2) and half pipe 3267(1) and is circumscribed by surface 3305 of structure 3302 to generally form a volume with these boundaries. In an embodiment, the structure 3302 is secured relative to the bracket extensions 3269*a-b* to provide tortuous gaps 3217 defined by the distance between tortuous gap surface 3280 (FIG. 32) of bracket extension 3269*b* and the surface 3305 of structure 3302.

Thus, the adhesive bond region may take into account the tortuous gap distance 3217 such that the inner face of bracket extension 3269*b* need not be flush against the surface 3305 of the structure 3302. Positioning the parts in this manner may accommodate tolerance variations and eliminate contact between dissimilar materials as noted in certain embodiments throughout the disclosure. FIG. 33 further shows a set of vertical dashed lines 3333 surrounding the outer perimeter of the adhesive bond region 3267 and the inner perimeter of the tortuous gap surface 3280. These dashed lines 3333 in this embodiment constitute a rectangular vertical wall that demarcates the separation between the tortuous gap region 3217 and the border region 3267(2) that in turn, defines the outer portion of the adhesive bond region 3267. In an embodiment, the inner face of bracket extension 3269a and the wall 3305 of structure 3302 is similarly or identically configured to the inner face of bracket extension 3269b and the opposite surface of structure 3302.

FIG. 34 illustrates a closer perspective view of the node 3201 having a structure 3302 inserted in slot 3271 and a hose 3303 applying a fluid at the inlet injection port 3274. In an exemplary embodiment, the fluid is an adhesive 3434. The adhesive 3434 begins to flow down the fluid channel 3273. In alternative embodiments, a vacuum can initially be drawn prior to adhesive injection into fluid inlet injection port 3274. For example, a vacuum port similar in appearance to inlet injection port 3274 may be disposed on an opposite side (obscured from view), and the vacuum port may in turn be connected to a vacuum channel (similar to fluid channel 3273) which is fed into another opening (not shown) similar to the opening 3223 but on the opposite side of the half-pipe 3267(1). In this manner, vacuum can be drawn prior to adhesive injection to increase flow and ensure adhesive 3434 is distributed uniformly throughout each of the necessary regions. It will be appreciated that, prior to a vacuum operation as described above, a sealant should first be used to seal the tortuous gap 3217 (FIG. 3) to enable negative pressure to be drawn. Thus, in various embodiments, the seal can be realized using the principles described herein, or it can be implemented by manual or machine insertion of sealant strips, O-rings, etc., along an edge of the tortuous path region 3217 to completely enclose the adhesive bond region 3267 from external surroundings. In FIG. 34, it is assumed that the adhesive 3434 is being applied via the use of positive pressure.

In another embodiment, a dedicated sealant inlet port (not shown) is built into the structure adjacent the fluid inlet port 3274, and is also directed into the adhesive bond region 3267, e.g., via another opening in the half-pipe 3267(1) on the opposite side of opening 3223. The sealant can travel to the outer perimeter of the adhesive bond region 3267, including in the tortuous path gap 3217. However, instead of filling the adhesive bond region 3267 completely with adhesive, the sealant can be allowed to cure to form a fortified border around the periphery of the adhesive bond region 3267. Next, the adhesive can be injected to populate the remainder of the adhesive bond region 3267. The sealant in this embodiment protects the adhesive from the influence of contaminants and may act further to solidify the connection to the structure, along with the adhesive.

Figure 35:
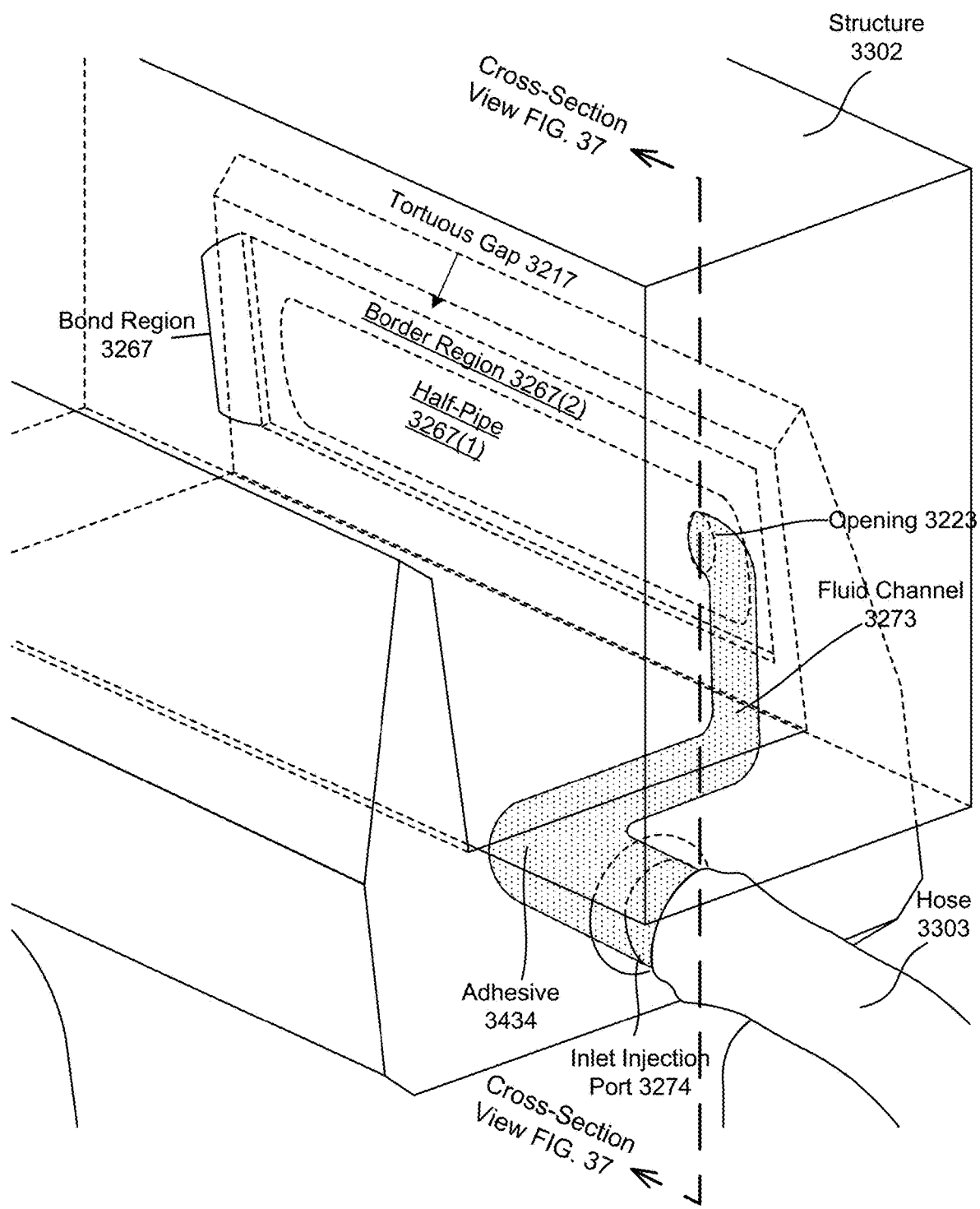
FIG. 35 illustrates a perspective view of the node of FIG. 32 having a structure inserted therein, wherein the injected fluid has reached the opening at the half-pipe.

FIG. 35 illustrates a perspective view of the node 3201 having a structure 3250 inserted therein, wherein the injected adhesive 3434 has reached the opening 3223 at the half-pipe 3267(1). FIG. 35 also identifies a plane running through a cross-section of the drawing in order to provide a further understanding of the half-pipe configuration.

It should also be noted that there are numerous techniques for positioning the node relative to the structure in the embodiments described above. Automated mechanisms, such as automated constructors or robots, may use various effectors to secure the structures in place at the right distance adjacent each other. Less sophisticated methods of positioning the structures involving using a substrate or flat space in which a first structure is placed, employing a micrometer to determine relevant distances such as the desired tortuous path distance, and using a tool to securely position the structure relative to the node in accordance with the position read from the micrometer. Numerous techniques may be used to accomplish both the measurements and the positioning of the devices to comply with tuned values.

Figure 36:
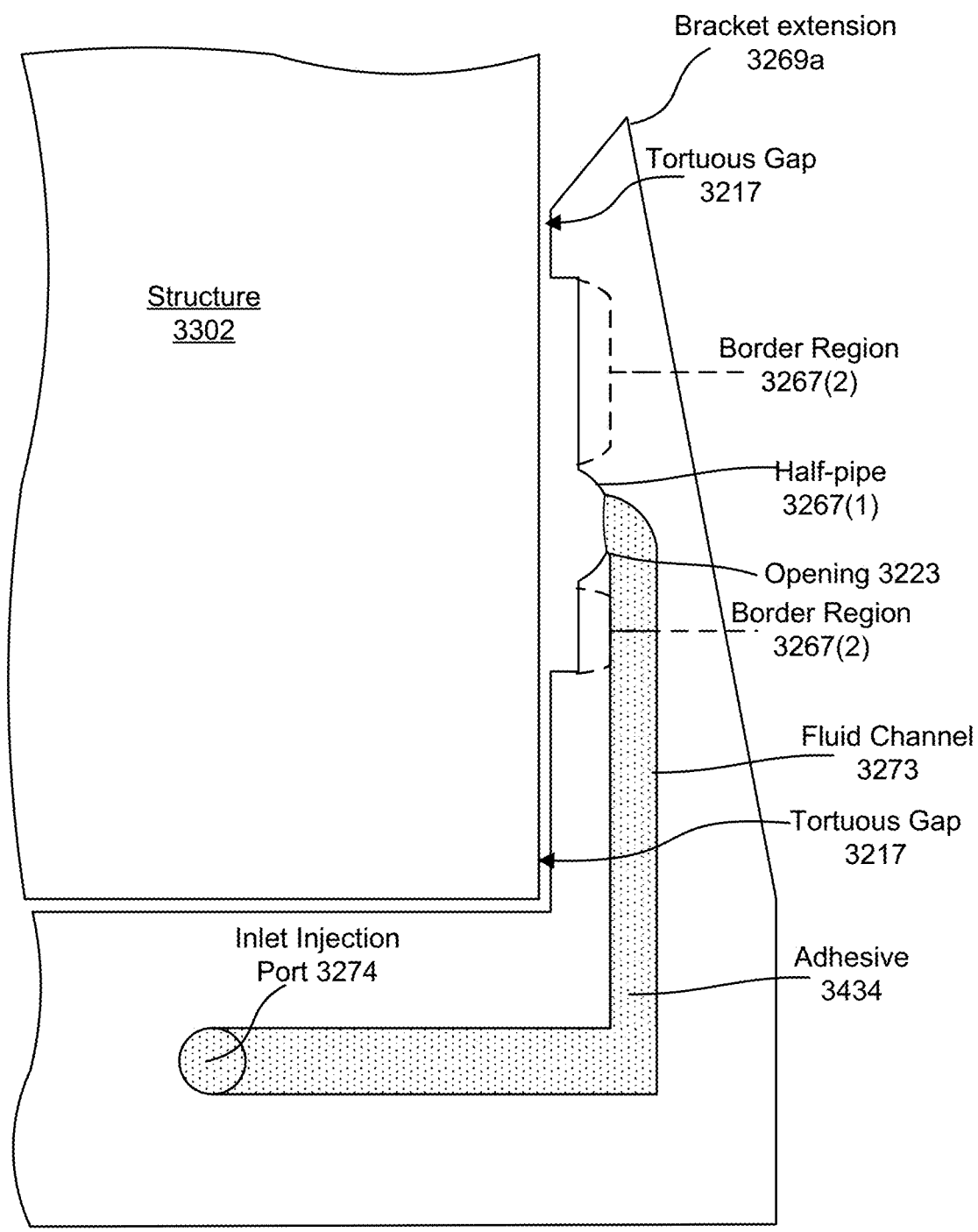
FIG. 36 illustrates a cross sectional view of the node/structure combination of FIG. 35, taken along the plane of FIG. 35, at a point in time where the adhesive has reached the opening of the adhesive bond region.

FIG. 36 illustrates a cross sectional view of the node/structure combination of FIG. 35, taken along the plane of FIG. 35, at a point in time where fluid has reached the opening 3223. A side view of the node/structure interface can be seen. Here, positive pressure has caused the adhesive 3434 to travel from inlet port 3274 through fluid channel 3273 out to opening 3223, which is the entry to the half-pipe region 3267(1) of the adhesive bond region 3267, the former so-called because of the semi-circular nature of the region in this embodiment. The tortuous path gaps 3217 between bracket extension 3269a of node 3201 and structure 3302 can clearly be seen in this figure. A side region of border 3267(2) is also visible along with the vertical wall 3333 (FIG. 34) used along with the tortuous path surface 3280 (FIG. 32) to define the width of the tortuous path 3217. It should be noted that the dashed brackets in FIGS. 36-40 labeled 3267(2) are not part of the illustrated structure, but is merely used to identify border region 3267(2).

It is noteworthy that, as in previous embodiments, structure 3302 may be positioned by external equipment such that they do not come into direct contact with node 3201. In some embodiments, isolation features like nylon washers or sealant features like O-rings and rubber tubes may be inserted in the tortuous paths prior to the adhesive injection step. If the gap is tuned precisely to an adjacent fluid region, care must be taken to ensure that any structures inserted in the tortuous path gap are of the right size and that they do not appreciably change the width of the gap. In other embodiments, manufacturing tolerances dictate that it would be undesirable to place isolation features or other features into the tortuous gaps. Rather, the gaps should be configured so that potential geometrical variations in the structure 3302 or node 3201 can be accounted for by tuning the gap appropriately as described above.

Figure 37:
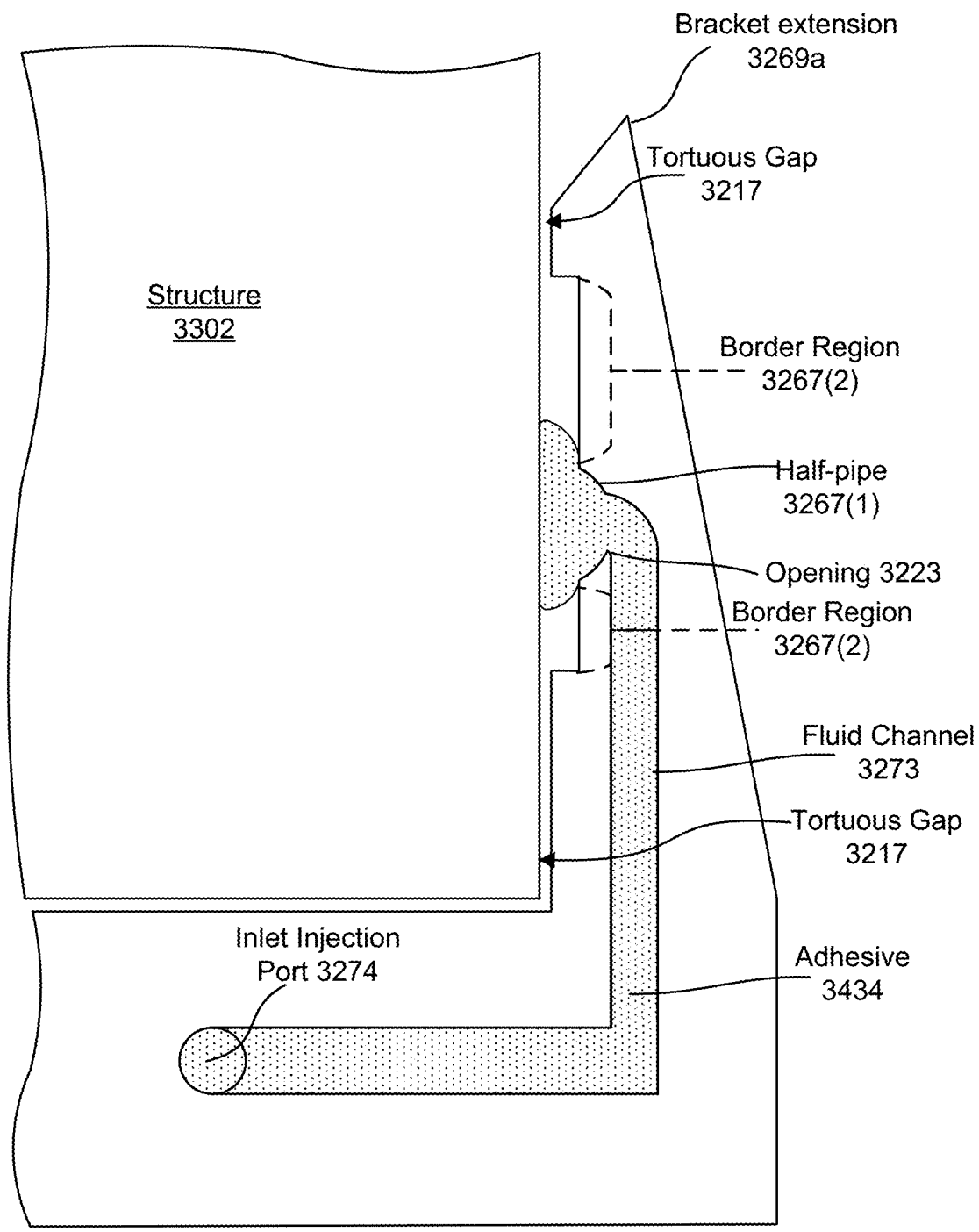
FIG. 37 illustrates a cross sectional view of the node/structure combination of FIG. 35, taken along the plane of FIG. 35, at a point in time where the adhesive has begun to spread into the adhesive bond region and has contacted the structure.

FIG. 37 illustrates a cross sectional view of the node/structure combination of FIG. 35, taken along the plane of FIG. 35, at a point in time where the adhesive 3434 has begun to spread in the adhesive bond region 3268 and has contacted structure 3302. At this point in time, the half pipe 3268 has filled in at least a region, but this does not mean that the entire half-pipe 3267(1) is full, since the adhesive must also traverse a horizontal distance across the bond region 3267. The half pipe 3267(1) also need not be completely filled prior to the border areas 3267(2) beginning to fill. Instead, in the embodiment shown, the adhesive 3434 exiting the opening 3223 will fill the adhesive bond region 3267 based on factors like (1) the outward direction and speed of flow from opening 3223, (2) the geometrical features that the adhesive encounters as it begins to fill the region, (3) properties of the adhesive such as viscosity, and (4) the force of gravity, which may play a more pronounced role as the viscosity of the adhesive decreases. In an embodiment, one or more of these factors are taken into account when determining a ratio for the tortuous gap 3217.

Figure 38:
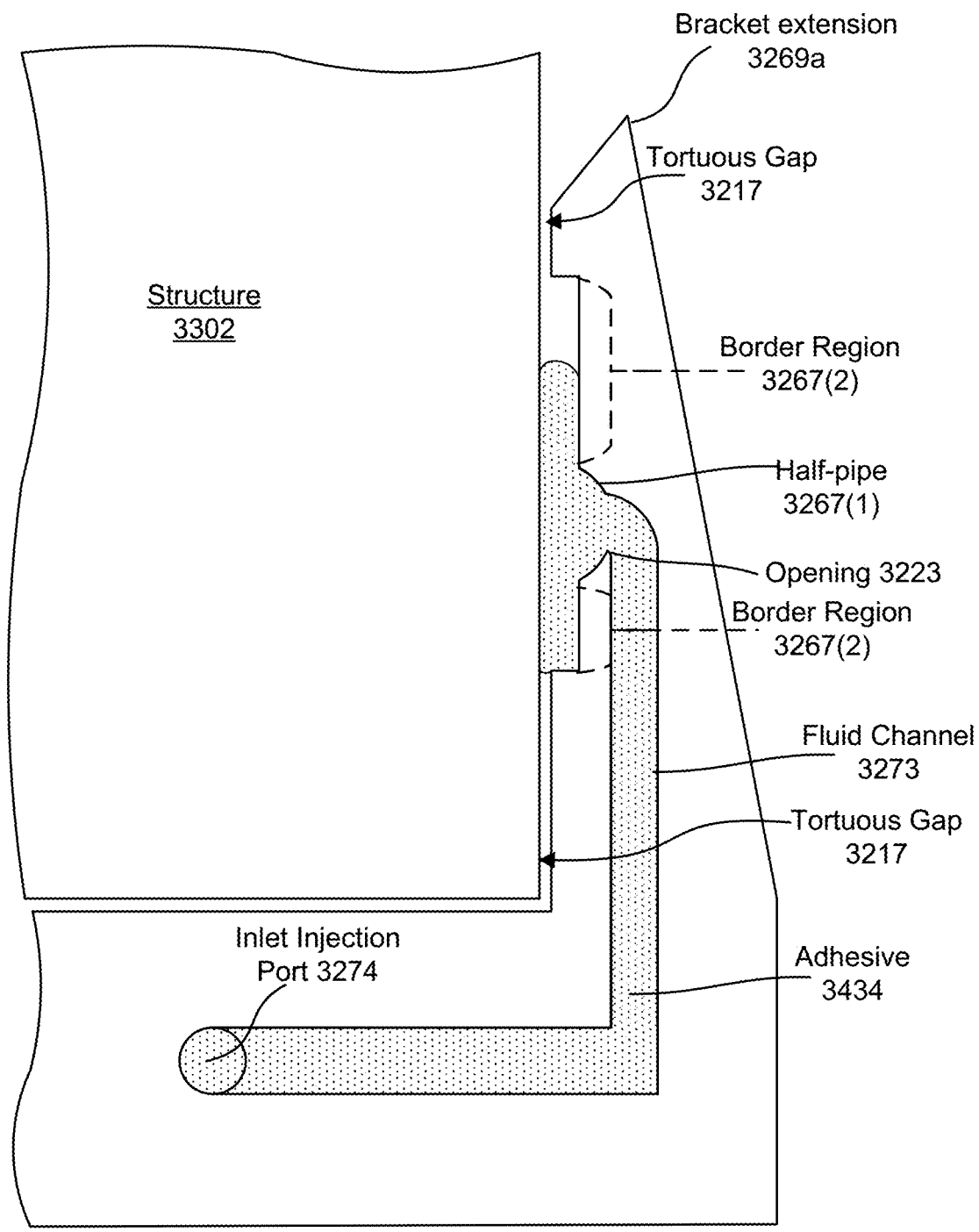
FIG. 38 illustrates a cross sectional view of the node-structure combination of FIG. 35, taken along the plane of FIG. 35, at a point in time where the adhesive has filled a lower portion of the border region, the half-pipe, and a small region of the lower tortuous gap.

FIG. 38 illustrates a cross sectional view of the node-structure combination of FIG. 35, taken along the plane of FIG. 35, at a point in time where the adhesive 3434 has filled a lower portion of border 3267(2), the half-pipe 3267(1), about half of the upper portion of border region 3267(2), and a small region of the lower tortuous gap 3217b. In this example, after the adhesive 3434 is expelled out of opening 3223, the force of gravity tends to cause the adhesive to initially flow downward until it has essentially filled the lower border region 3209b of the adhesive bond region 3267. A small amount of adhesive 3434 may encroach into the lower tortuous gap 3217b. However, the overall amount is relatively insignificant because the ratio of the wall 3333b to the tortuous gap 3217b is made large enough to prevent significant bleeding. In addition, as noted above, the viscosity of the adhesive 3434 may be selected to facilitate the containment of the adhesive 3434 in the adhesive bond region 3267. After lower portions of the bond region 3267 are filled, pressure may cause the adhesive 3434 to begin to fill the upper portions of the bond region 3267 as shown. This overall process allows the manufacturer to fill adhesive bond region 3267 while allowing for minor process variations which may cause positional differences in the widths of the tortuous gaps 3217a-b.

While these positional differences resulting from process variations may slightly change the amount of bleeding, generally the manufacturing tolerances are low enough such that the variations in adhesive flow do not change appreciably. In cases where manufacturing tolerances are more significant, the ratios can be adjusted, including adjusting the tortuous gap width upward to accommodate larger positional differences while concurrently increasing the depth of border regions 3267(2) such that a higher ratio of the adhesive bond region depth to tortuous gap depth is present. Also, the viscosity of the adhesive 3434 may be increased to accommodate larger tolerance variations. Advantageously, many additive manufacturing processes that may be used to 3-D print the node 3201 and/or structure 3302 are very precise and have comparatively small tolerance variations. Thus, the selection of higher precision additive manufacturing processes to make one or both of the base components may be considered in limiting process variations.

Figure 39:
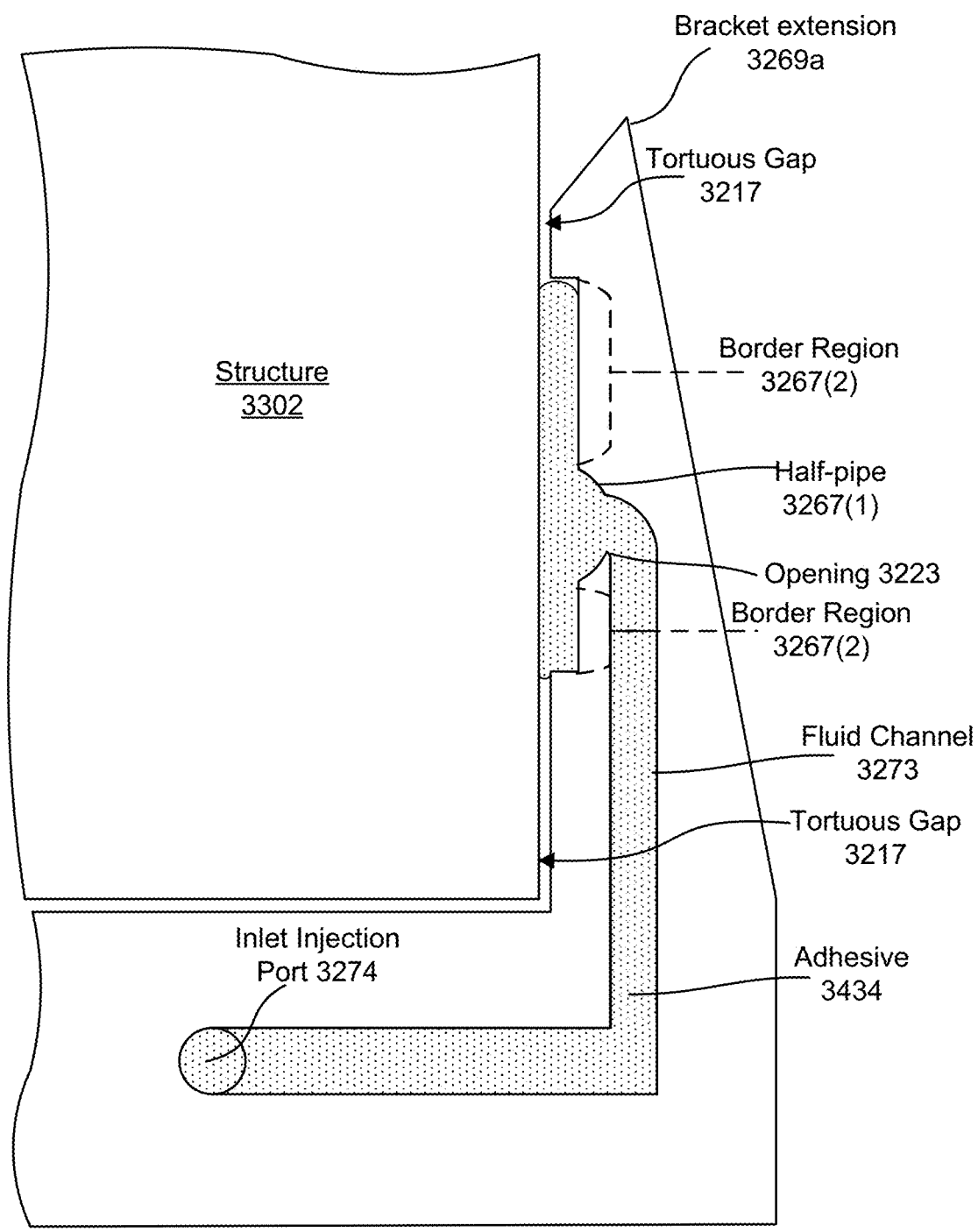
FIG. 39 illustrates a cross sectional view of the node/structure combination of FIG. 35, taken along the plane of FIG. 35, at a point in time where the adhesive has substantially filed the adhesive bond region.

FIG. 39 illustrates a cross sectional view of the node/structure combination of FIG. 35, taken along the plane of FIG. 35, at a point in time where the adhesive 3434 has substantially filed the adhesive bond region 3267. Having filled the large portion of the lower border 3267(2) and the half-pipe 3267(1), the pressure from the continued flow of adhesive 3434 from the fluid source through inlet port 3274, fluid channel 3273 and opening 3223, the adhesive 3434 continues to encroach upward and leftward (since the opening 3223 is disposed on the right portion of the half-pipe 3267(1)). While only two tortuous path gaps 3217a-b are shown here, it is evident from FIG. 32 et al. that there are two additional tortuous path gaps 3217 extending horizontally due to the fact that the borders of the adhesive bond region 3267 are rectangular in shape. In short, the adhesive 3434 may flow upward and leftward relative to the drawing as the additional adhesive is pumped into the system.

Figure 40:
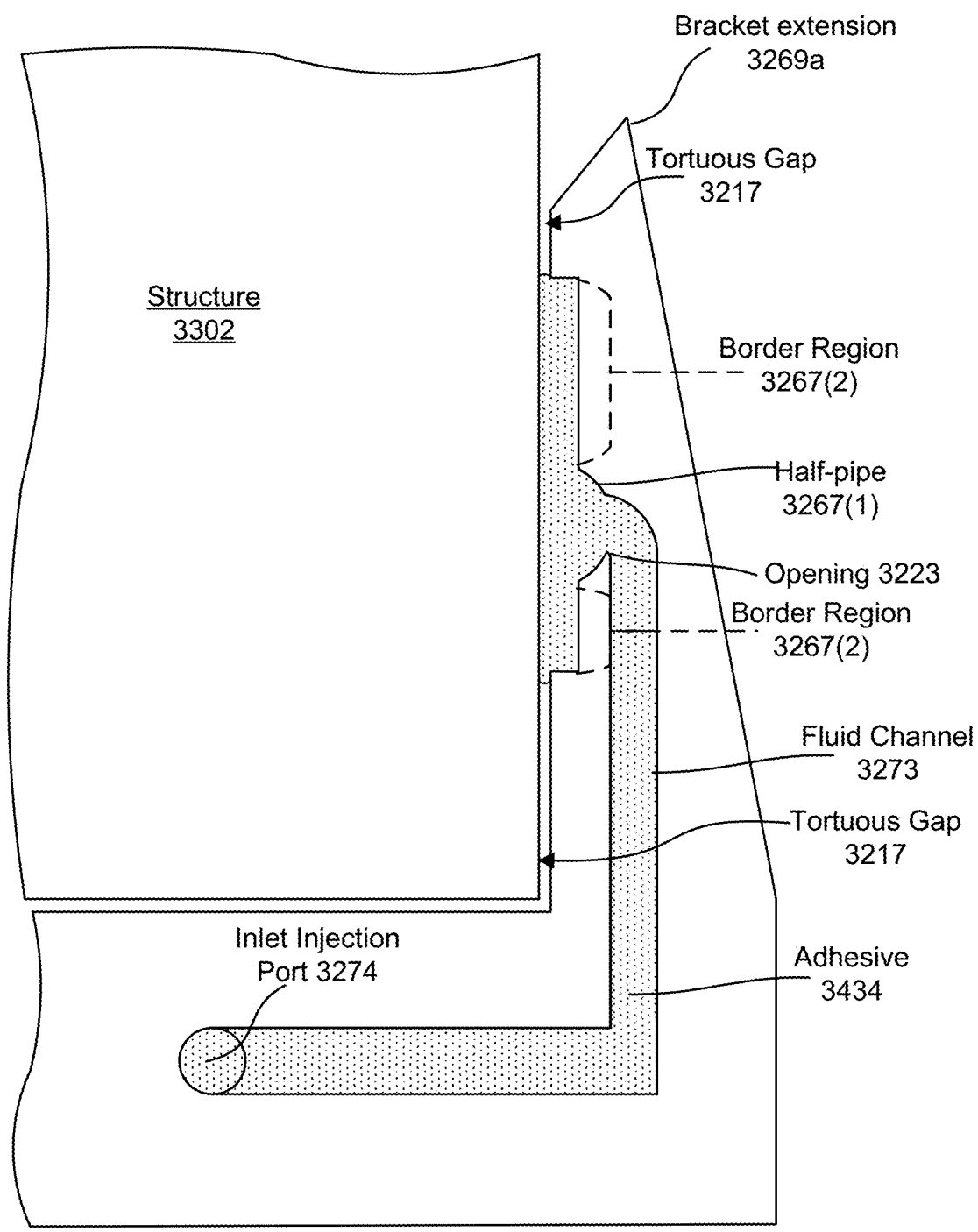
FIG. 40 illustrates a cross sectional view of FIG. 35, at a point when the adhesive fill has completed and the adhesive flow process has terminated.

FIG. 40 illustrates a cross sectional view of FIG. 35, at a point when the adhesive fill has completed and the adhesive flow process has terminated. Here, the adhesive 3434 abuts the upper and lower walls (and the side walls) of border region 3267(1). Adhesive 3434 slightly encroaches into tortuous gap 3217a. Thus, a node/structure interface having a strong bond that accommodates manufacturing tolerances may result. Further, the end product is built such that the two structures do not contact one another, and any problems with subsequent galvanic corrosion are solved.

The flow of adhesive 3434 from the fluid source may be monitored in different ways. In one way, an observer can simply visualize the presence of adhesive across all the edges and can then stop adhesive flow when the bond region 3267 is full. In another way, the fluid source can sense the increase in pressure resulting from the filling of the adhesive bond region 3267 and automatic shutoff can occur when pressure measurements indicate a fill. These same principles apply where the fluid is a sealant, lubricant, or another agent. In yet another way, a witness hole having a witness channel with a specifically designed configuration may be used to precisely match the adhesive flow. In embodiments using a witness hole, visual observations of the fluid, or automated measurements of pressure from the witness hole surface may indicate that the adhesive injection is complete.

In one embodiment, a small amount of sealant may be applied prior to adhesive application. The sealant may be forced into the fluid channel 3273 by air pressure, or by another fluid. The air pressure or other fluid may force the sealant to disperse against the edges of the adhesive bond region 3267 and may cause slight protrusion into the tortuous gaps. In some embodiments, the sealant may have a lower viscosity in order to penetrate the tortuous gaps more fully. Thereafter, the sealant may be cured, any excess fluid or air removed, e.g., by a vacuum step, and an adhesive step may be applied.

Based on the above disclosure, numerous embodiments and variations may be contemplated by those skilled in the art.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, and/or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A node comprising:
a first surface that provides a boundary of a first channel, the first channel being configured to provide a path for a fluid, wherein the fluid is an adhesive; and
a second surface that provides a boundary of a second channel, the second channel being connected to the first channel and configured to provide a tortuous path for the fluid relative to the first channel.

2. The node of claim 1, wherein the first surface is an interior surface of the node.

3. The node of claim 2, further comprising:
a third surface with an opening to the first channel, the third surface being an exterior surface of the node; and
a fourth surface with an opening to the second channel.

4. The node of claim 3, wherein the fourth surface is an exterior surface of the node.

5. The node of claim 1, wherein the second surface is an exterior surface of the node, and the second surface is configured to provide the tortuous path based on an arrangement of the second surface in proximity to a surface of a structure, the node configured to be connected to the structure.

6. The node of claim 5, wherein the first surface is an exterior surface of the node.

7. The node of claim 6, wherein the first surface is a recessed surface of the node.

8. The node of claim 1, wherein the node includes a plurality of surfaces providing boundaries of a plurality of channels, including the second channel, each of the plurality of channels configured to provide a corresponding tortuous path for the fluid.

9. The node of claim 8, wherein the first channel is configured to maximize fluid flow relative to the plurality of channels.

10. The node of claim 9, wherein the plurality of channels is configured to restrict the fluid from flowing through each channel of the plurality of channels before flowing through the first channel.

11. An additively manufactured node comprising:
a first surface with an opening to a first channel through the node, the first channel configured to provide a fluid;
a second surface with a plurality of openings to an array of second channels, each of the second channels extending through the node and connecting to the first channel,
wherein the second channels are configured to provide a tortuous path for the fluid relative to the first channel, and wherein a cross-sectional area of, and a distance of separation between, the second channels are tunable in accordance with a required distribution of fluid.

12. The node of claim 11, further comprising:
a third surface extending from the second surface.

13. The node of claim 11, wherein a length of each of the second channels is the same.

14. The node of claim 11, wherein a cross-sectional area of each of the second channels is less than a cross-sectional area of the first channel.

15. The node of claim 14, wherein a ratio of the cross-sectional area of each second channel to the cross-sectional area of the first channel is approximately 1:50.

16. The node of claim 11, wherein the first channel and the second channels are configured such that an uncured fluid injected into the opening on the first surface will flow through the first channel and the second channels to arrive at the openings on the second surface at approximately the same instant.

17. The node of claim 11, further comprising:
a fourth surface with an opening to a third channel that extends through the node and connects to the first channel, wherein the third channel is longer than each of the second channels.

18. An apparatus comprising:
an additively manufactured node including
a first surface with an opening to a first channel through the node,
a second surface with a plurality of openings to an array of second channels, each of the second channels extending through the node and connecting to the first channel, and
a third surface;
a structure including a fourth surface that opposes the second surface at a first distance, and a fifth surface that opposes the third surface at a second distance that is less than the first distance;
a sealant extending through the first channel and the second channels, wherein the sealant seals the second surface to the fourth surface; and
an adhesive adhering the third surface to the fifth surface.

19. The apparatus of claim 18, wherein the third surface extends from the second surface.

20. The apparatus of claim 18, wherein a cross-sectional area of, and a distance of separation between, the second channels are tunable in accordance with a required distribution of the sealant.

21. The apparatus of claim 18, wherein a length of each of the second channels is the same.

22. The apparatus of claim 18, wherein a cross-sectional area of each of the second channels is less than a cross-sectional area of the first channel.

23. The apparatus of claim 22, wherein a ratio of the cross-sectional area of each second channel to the cross-sectional area of the first channel is approximately 1:50.

24. The apparatus of claim 18, wherein the first and second distances are average distances.

25. The apparatus of claim 18, wherein the node further includes a fourth surface with an opening to a third channel that extends through the node and connects to the first channel, wherein the third channel is longer than each of the second channels.

* * * * *